US012140889B2

(12) United States Patent
Matsuzaki

(10) Patent No.: US 12,140,889 B2
(45) Date of Patent: Nov. 12, 2024

(54) IMAGE FORMING APPARATUS

(71) Applicant: CANON KABUSHIKI KAISHA, Tokyo (JP)

(72) Inventor: Kenta Matsuzaki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/235,208

(22) Filed: Aug. 17, 2023

(65) Prior Publication Data

US 2024/0061364 A1 Feb. 22, 2024

(30) Foreign Application Priority Data

Aug. 18, 2022 (JP) ................................ 2022-130820
Aug. 18, 2022 (JP) ................................ 2022-130821

(51) Int. Cl.
*G03G 15/16* (2006.01)
*G03G 15/00* (2006.01)

(52) U.S. Cl.
CPC ..... *G03G 15/1675* (2013.01); *G03G 15/1605* (2013.01); *G03G 15/5004* (2013.01); *G03G 15/5037* (2013.01); *G03G 15/5058* (2013.01); *G03G 2215/1623* (2013.01)

(58) Field of Classification Search
CPC ........... G03G 15/1605; G03G 15/1675; G03G 15/5033; G03G 15/5038
USPC ........................................................... 399/66
See application file for complete search history.

(56) References Cited

U.S. PATENT DOCUMENTS

| | | | |
|---|---|---|---|
| 8,346,114 | B2 | 1/2013 | Sakata |
| 10,712,690 | B2 | 7/2020 | Miyamoto et al. |
| 10,928,772 | B2 | 2/2021 | Tominaga et al. |
| 10,955,773 | B2 | 3/2021 | Yamaura et al. |

FOREIGN PATENT DOCUMENTS

| | | | |
|---|---|---|---|
| JP | 2002-082496 | A | 3/2002 |
| JP | 2009-069815 | A | 4/2009 |
| JP | 2018-060072 | A | 4/2018 |
| JP | 2019-070769 | A | 5/2019 |
| JP | 2019-090888 | A | 6/2019 |
| JP | 2019200283 | * | 11/2019 |
| JP | 2020086107 | * | 6/2020 |
| JP | 2020-148945 | A | 9/2020 |
| JP | 2020-154059 | A | 9/2020 |
| JP | 2021-009346 | A | 1/2021 |

* cited by examiner

*Primary Examiner* — Hoan H Tran
(74) *Attorney, Agent, or Firm* — Venable LLP

(57) ABSTRACT

An image forming apparatus includes an image bearing member, a rotatable endless intermediary transfer belt, an inner roller, an outer roller, a power source, a detecting portion, and a controller. On the basis of a result of detection by the detecting portion when a voltage is applied to the inner roller so as to form a chart on a recording material of a predetermined kind in an operation in an adjusting mode, the controller determines whether a transfer voltage when a toner image is transferred onto the recording material of the predetermined kind is subjected to constant-voltage control so that the voltage applied to the inner roller by the power source becomes a target value or is subjected to constant-current control so that a current supplied to the inner roller becomes a target value.

10 Claims, 37 Drawing Sheets

| | | AMBIENT WATER CONTENT (g/kg) | | | | |
|---|---|---|---|---|---|---|
| | | 0.9 ≥ | ··· | 8.9 | ··· | 21.5 ≤ |
| BASIS WEIGHT (g/m²) | · | · | | · | | · |
| | · | · | | · | | · |
| | 81～100 | 1000V | ··· | 500V | ··· | 200V |
| | 101～125 | 1150V | ··· | 600V | ··· | 250V |
| | 126～150 | 1300V | ··· | 700V | ··· | 300V |
| | · | · | | · | | · |
| | · | · | | · | | · |

FIG. 5

| SHEET CATEGORY | BASIS WEIGHT($g/m^2$) | Vp(n) UPPER LIMIT |
|---|---|---|
| · | · | · |
| · | · | · |
| P.P. | 81～100 | 1200V |
| T.P.1 | 101～125 | 1350V |
| T.P.2 | 126～150 | 1500V |
| | · | · |
| | · | · |

FIG. 15

IMAGE FORMING APPARATUS

FIELD OF THE INVENTION AND RELATED ART

The present invention relates to an image forming apparatus such as a copying machine, a laser printer, a facsimile machine, a printing machine, or a multi-function machine having a plurality of functions of these machines, of an electrophotographic type or an electrostatic recording type.

Conventionally, for example, in an image forming apparatus such as the copying machine of the electrophotographic type or the like, a toner image formed on an image bearing member such as a photosensitive member or an intermediary transfer member is transferred onto a recording material. The transfer of a toner image from an image bearing member to a recording material is often performed by applying a transfer voltage to a transfer member such as a transfer roller which contacts the image bearing member to form a transfer portion. Transfer voltage can be determined based on a transfer portion part voltage corresponding to the electrical resistance of the transfer portion detected during the pre-rotation process before image formation, and a recording material part voltage depending on the kind of recording material set in advance. By this, an appropriate transfer voltage can be set according to the environmental fluctuations, the transfer member usage history, the kind of the recording material, and the like. In order to obtain a good transfer property, it becomes important to stably form a sufficient electric field in the transfer portion.

Japanese Laid-open Patent Application (JP-A) No. 2021-9346 proposes an image forming apparatus operable in an adjusting mode for adjusting a setting voltage (value) of the secondary transfer voltage. In this adjusting mode, a chart with multiple patches (test images) formed on one recording material is outputted while switching the secondary transfer voltage. And, a density of each patch is detected, and depending on a detection result thereof, an optimum secondary transfer voltage condition is selected.

Further, JP-A No. 2018-60072 proposes a constitution for transfer of a toner image in the case where a sheet including a metal layer is used for image formation. This constitution includes a first guiding member for guiding a sheet toward a transfer nip in which the toner image is transferred from an intermediary transfer belt onto the sheet and includes a contact member which is grounded and which contacts the sheet. Further, a distance from the transfer nip to the contact member is made shorter than a distance from the transfer nip to the first guiding member.

However, in the conventional image forming apparatus, in the case where a recording material having a low electric resistance value (hereinafter, simply referred to as "low-resistance paper") is used for image formation, an image defect such as a lowering in image density occurs in some instances. This is because in the case where the low-resistance paper is used for the image formation, a transfer current flows through the recording material into a contact member, such as a conveying roller or a guiding member, which exists in a conveying passage of the recording material and which contacts the recording material, and thus a proper transfer current cannot be supplied to the recording material. For example, in the case where the low-resistance paper such as metallized paper including a metal layer on one side is used for the image formation, during conveyance of the recording material, flowing of the transfer current into the contact member such as the conveying roller or the guiding member occurs in some instances. Further, by this, an optimum transfer current does not flow through the recording material, and therefore, the image defect such as the density lowering occurs in some instances. Incidentally, the "low-resistance paper" or the like and the "recording material" are referred to as "paper" in some instances. However, in such a case, the "paper" includes a recording material constituted by a material other than the paper and includes a recording material constituted by including a material containing the material other than the paper (for example, a recording material including the metal layer, such as the metallized paper).

The constitution disclosed in JP-A No. 2018-60072 is intended to stabilize a flowing-in current even when a contact state of the recording material to the guiding member during the conveyance of the recording material is effected, by disposing the contact member in the neighborhood of the transfer nip and by causing the transfer current to flow into this control member. However, due to various factors such as a conveying position of the recording material and rigidity of the recording material, a contact status of a member contacting the recording material changes in some instances. Further, in the case where the transfer voltage is applied through constant-voltage control, a flowing current largely changes every change of a portion contacting the recording material in some instances. For that reason, the transfer current flowing into the toner is not stabilized, and therefore, it is difficult in some instances to maintain a good transfer property.

Further, in a situation in which such a phenomenon occurs, it is difficult in some instances to set a proper transfer voltage in an operation in the conventional adjusting mode as disclosed in JP-A No. 2021-9346.

SUMMARY OF THE INVENTION

A principal object of the present invention is to enable setting of control of a transfer voltage advantageous in transfer property for low-resistance paper, which can cause flowing of a transfer current into a member existing in a conveying passage, simply without increasing an operation load on an operator.

This object is accomplished by an image forming apparatus according to the present invention.

According to an aspect of the present invention, there is provided an image forming apparatus comprising: an image bearing member configured to bear a toner image; a rotatable endless intermediary transfer belt configured to receive the toner image transferred from the image bearing member; an inner roller configured to form a transfer portion in contact with an inner peripheral surface of the intermediary transfer belt; an outer roller provided so as to nip the intermediary transfer belt between itself and the inner roller and configured to form the transfer portion in cooperation with the inner roller; a power source configured to apply, to the inner roller, a transfer voltage for transferring the toner image onto a recording material; a detecting portion configured to detect a value of a current supplied when a voltage is applied to the inner roller by the power source; and a controller capable of carrying out control so that an operation in an adjusting mode in which a chart prepared by transferring a plurality of test images onto a recording material under application of a plurality of test voltages to the inner roller by the power source is formed is executed to adjust the transfer voltage, wherein on the basis of a result of detection by the detecting portion when the voltage is applied to the inner roller by the power source so as to form the chart on a recording material of a predetermined kind in the operation in the adjusting mode, the controller determines whether the transfer voltage when the toner image is transferred onto the recording material of the predetermined kind is subjected to constant-voltage control so that the voltage applied to the inner roller by the power source becomes a target value or is subjected to constant-current control so that a current supplied to the inner roller by the power source becomes a target value.

According to another aspect of the present invention, there is provided an image forming apparatus comprising: an image bearing member configured to bear a toner image; a rotatable endless intermediary transfer belt configured to receive the toner image transferred from the image bearing member; an inner roller configured to form a transfer portion in contact with an inner peripheral surface of the intermediary transfer belt; an outer roller provided so as to nip the intermediary transfer belt between itself and the inner roller and configured to form the transfer portion in cooperation with the inner roller; a power source configured to apply, to the inner roller, a transfer voltage for transferring the toner image onto a recording material; and a controller configured to carry out control so that a voltage applied to the inner roller by the power source is subjected to constant-voltage control so as to become a target value in a case that the toner image is transferred onto plain paper and so that a current supplied to the inner roller by the power source is subjected to constant-current control so as to become a target value in a case that the toner image is transferred onto a predetermined recording material including a metal layer, wherein in the case that the toner image is transferred onto the predetermined recording material of which length is a first length or a second length shorter than the first length in a direction substantially perpendicular to a feeding direction of the predetermined recording material, the controller carries out control so that the target value in the constant-current control in a case that the length of the predetermined recording material is the second length is smaller than the target value in the constant-current control in a case that the length of the predetermined recording material is the first length.

Further features of the present invention will become apparent from the following description of exemplary embodiments with reference to the attached drawings.

BRIEF DESCRIPTION OF THE DRAWINGS

FIG. 5 is a schematic view showing an example of table data of a recording material (sheet) part voltage.

Figure 7:
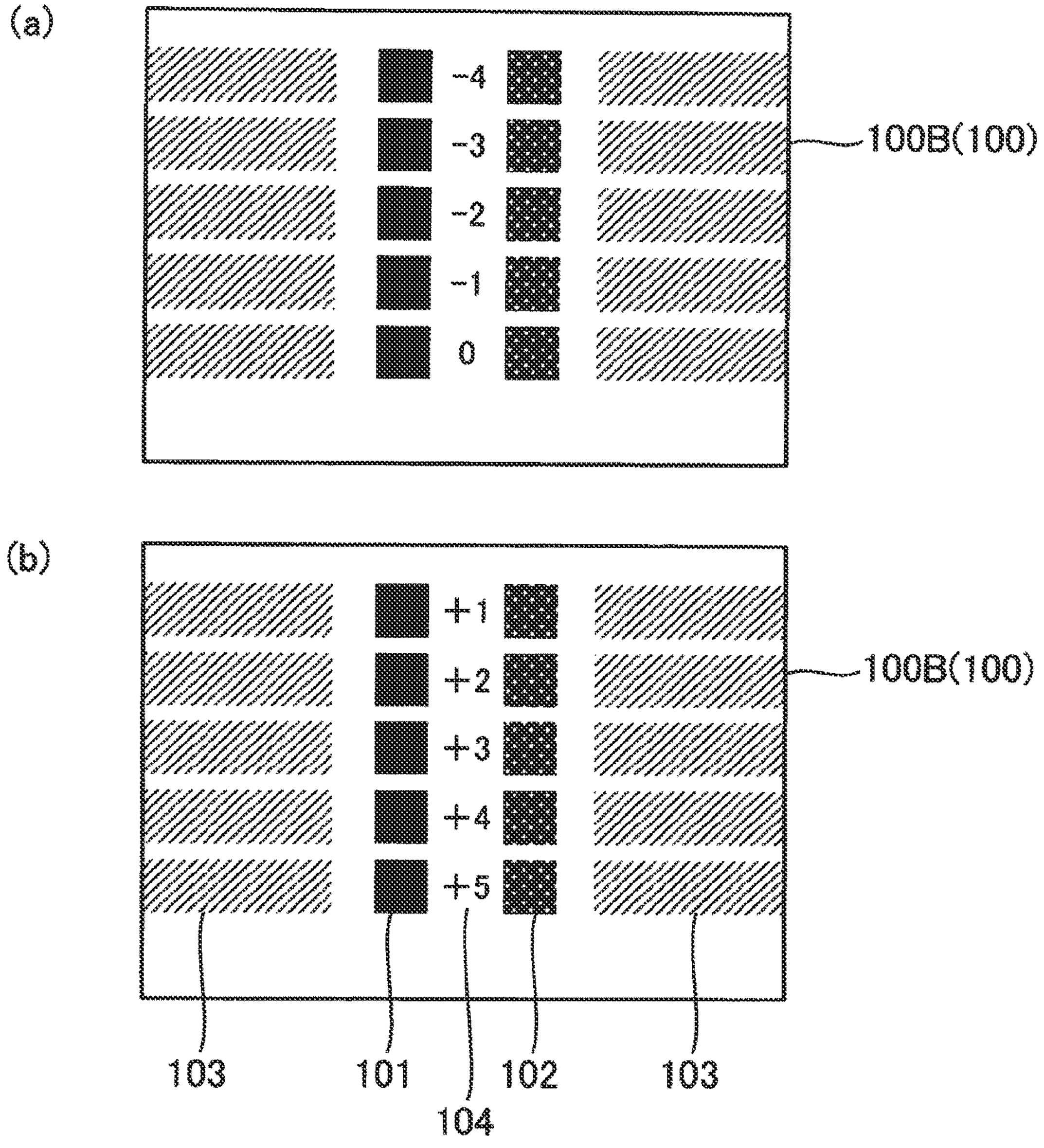

Parts (a) and (b) of FIG. 7 are schematic views of chart image data outputted in the operation in the adjusting mode.

Figure 8:
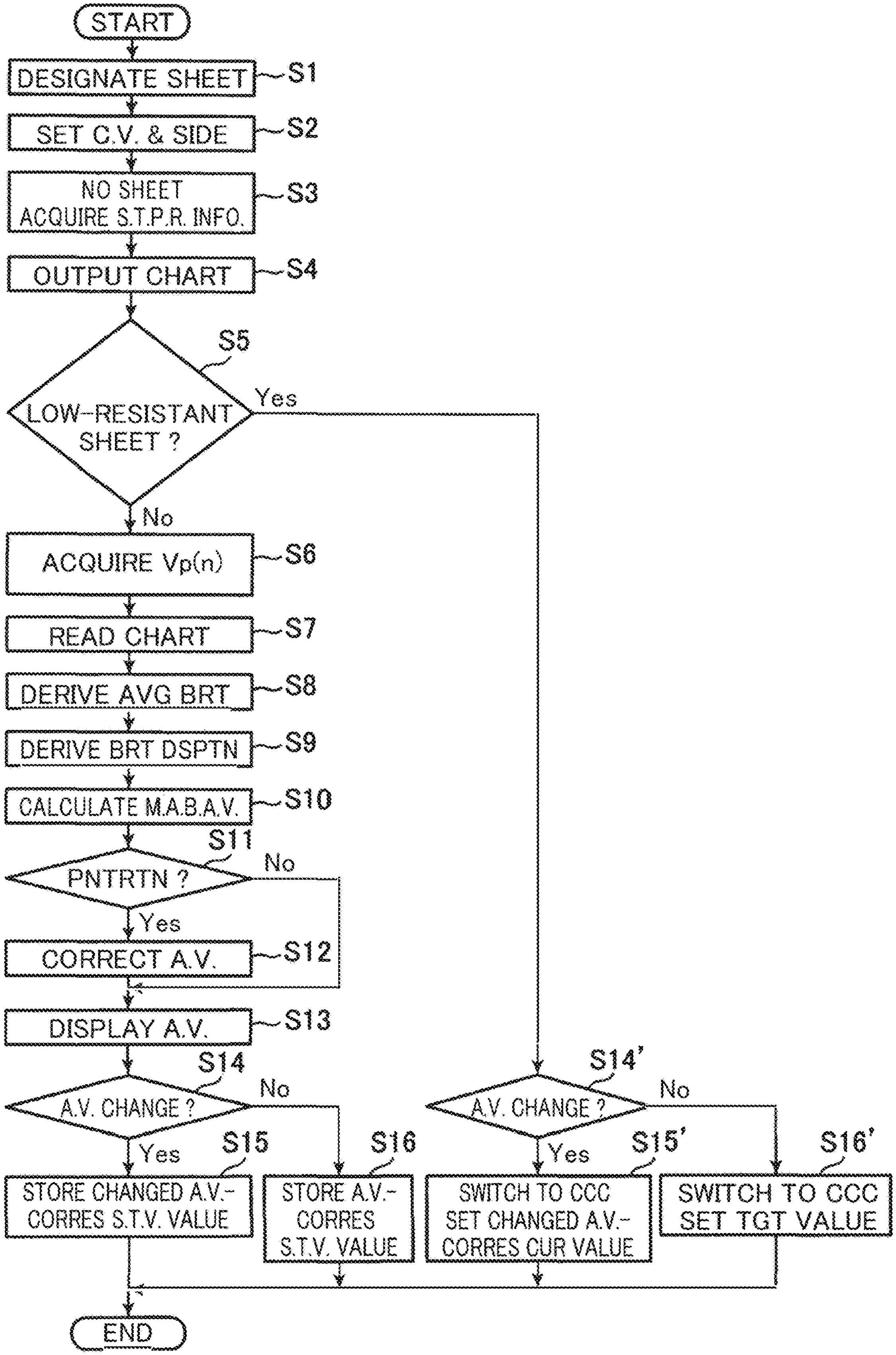

FIG. 8 is a flowchart showing an outline of an operation in an adjusting mode in an embodiment 1.

Figure 9:
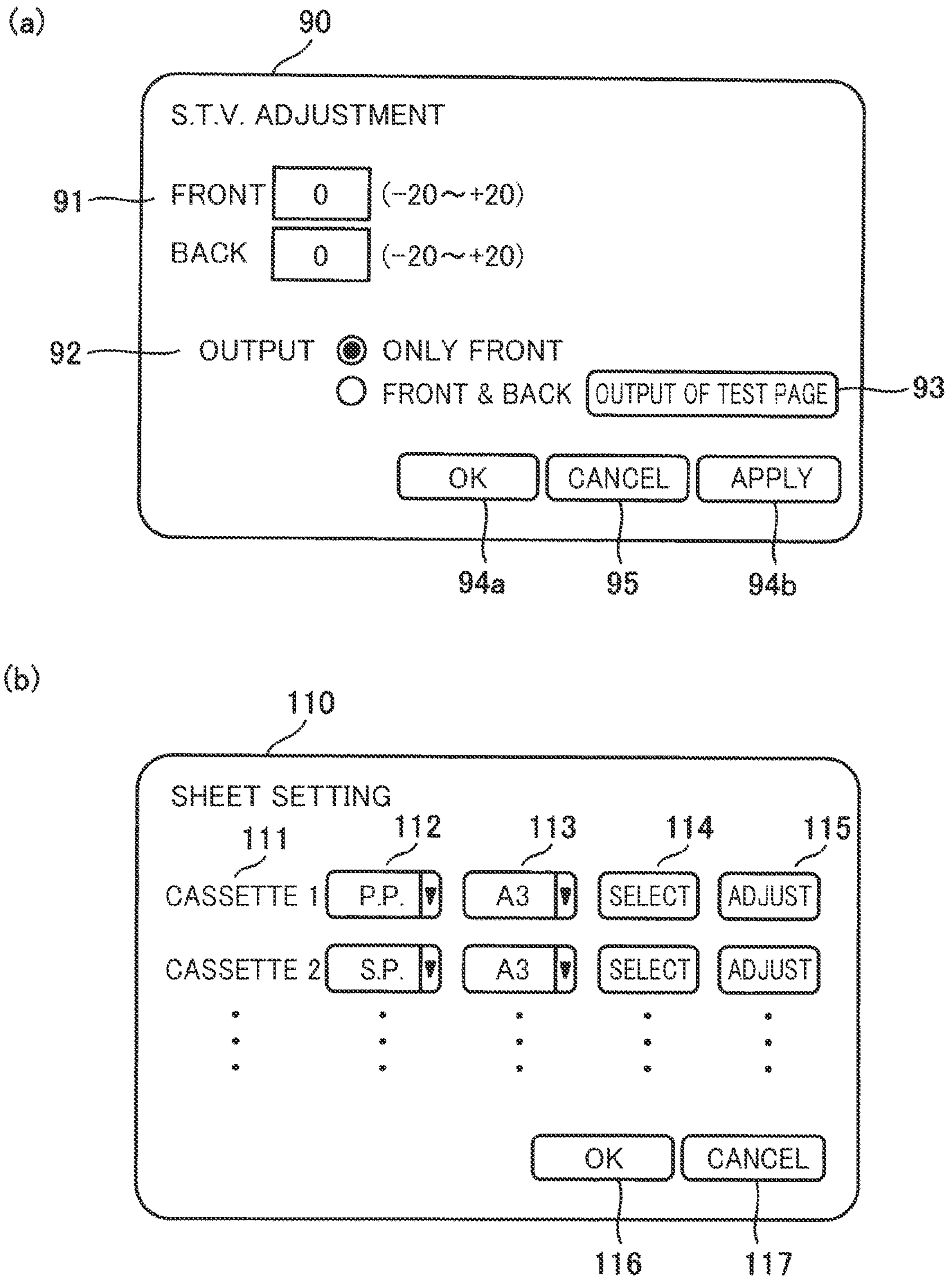

Parts (a) and (b) of FIG. 9 are schematic views of an adjusting mode setting screen and a recording material setting screen, respectively.

Figure 10:
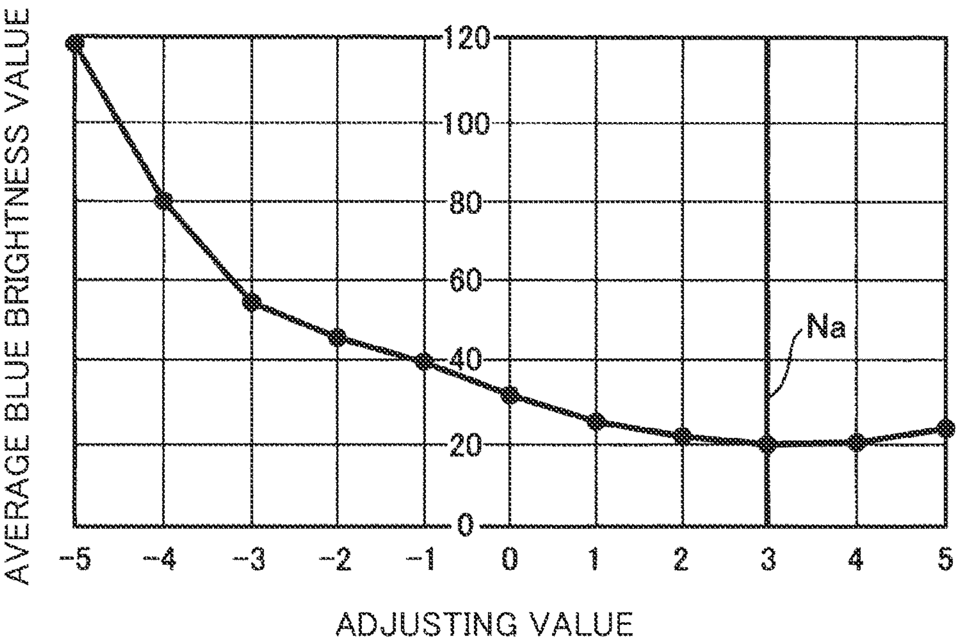

FIG. 10 is a graph showing an example of a relationship between an average of brightness of a patch and an adjusting value of the secondary transfer voltage in the case where normal paper is used.

Figure 11:
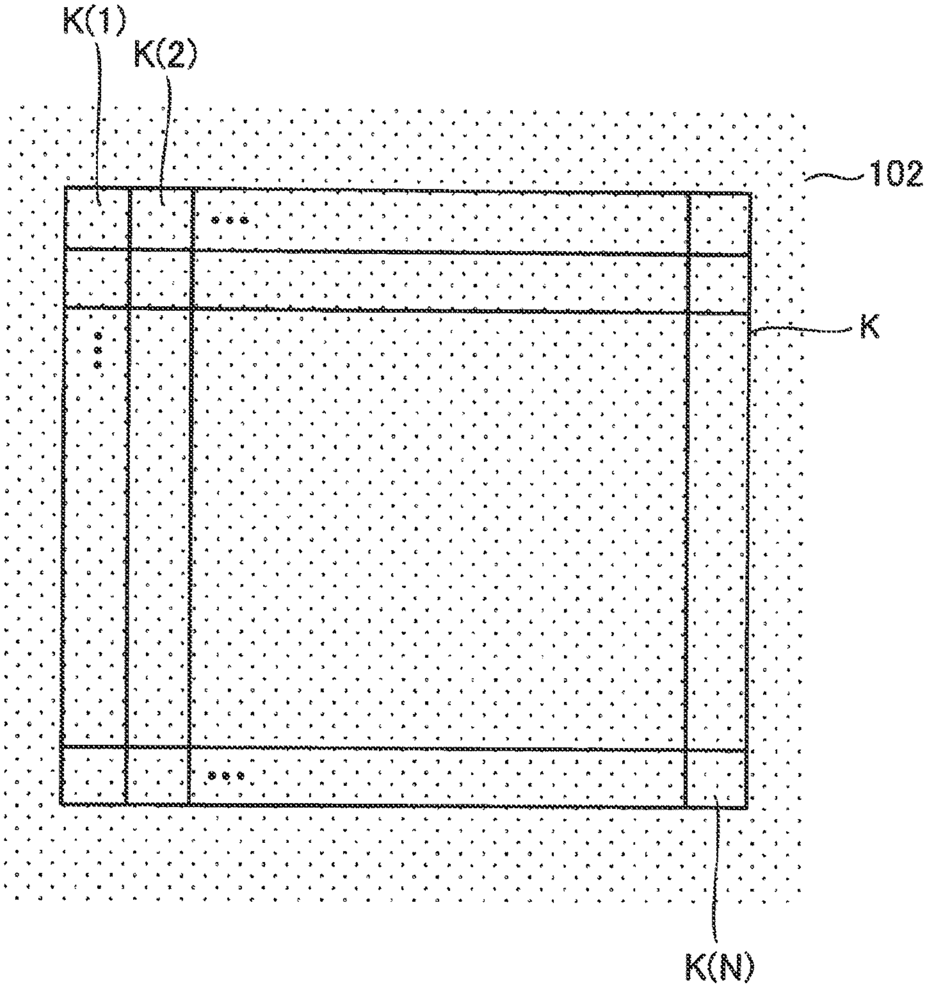

FIG. 11 is a schematic view for illustrating a patch brightness reading method.

Figure 12:
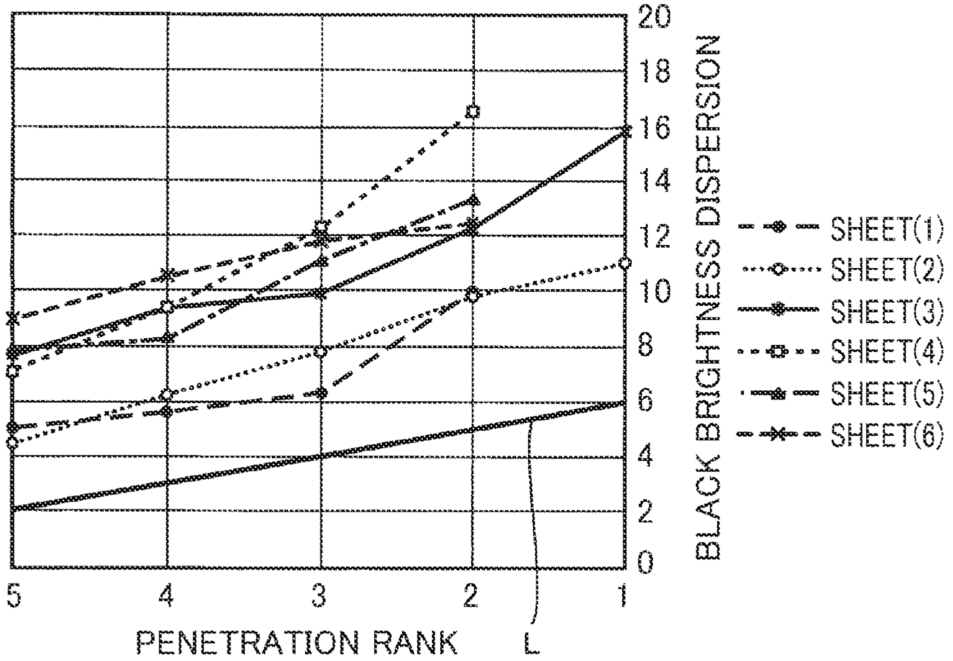

FIG. 12 is a graph for illustrating a relationship between "penetration" and a brightness dispersion value.

Figure 13:
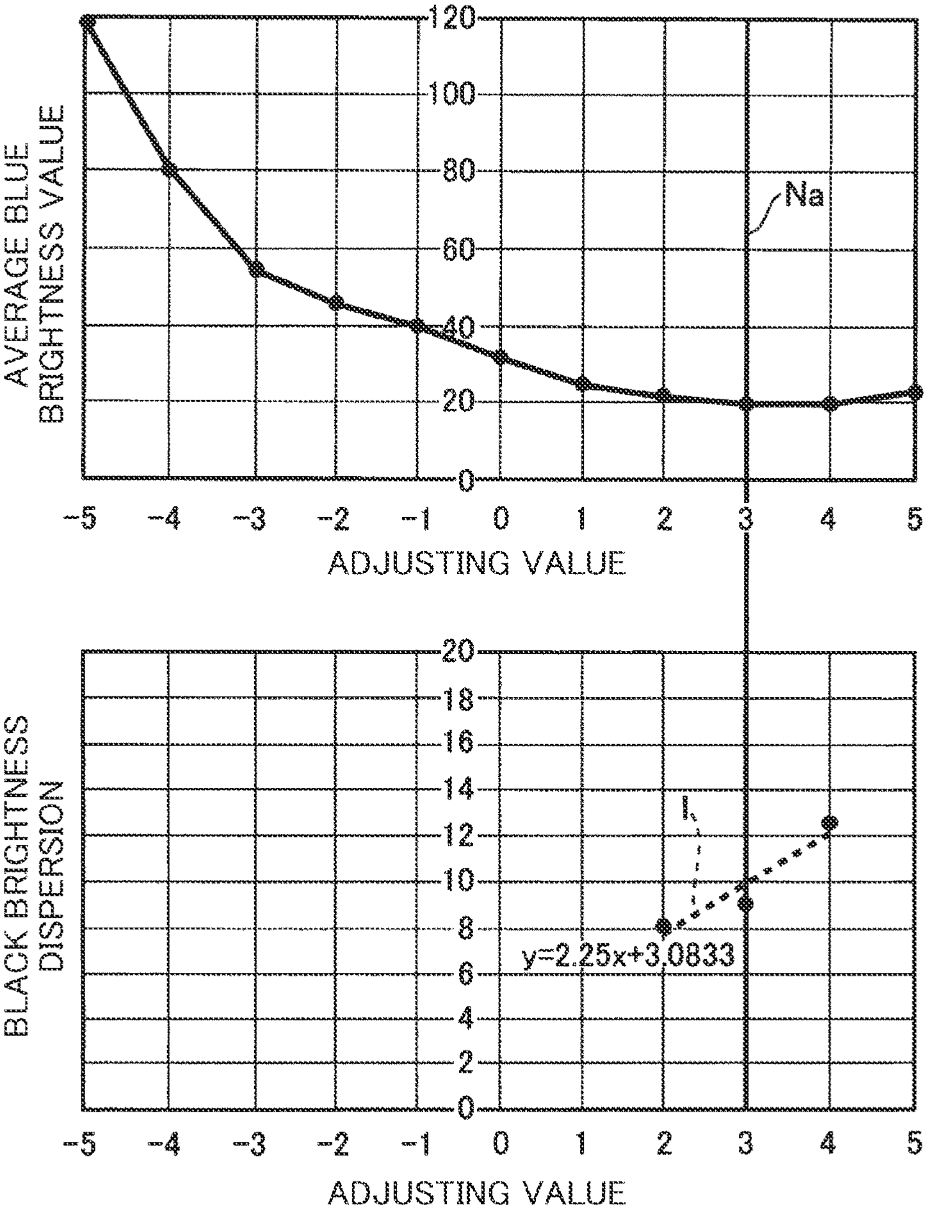

FIG. 13 comprises graphs for illustrating a method of discriminating occurrence or non-occurrence of the "penetration".

Figure 14:
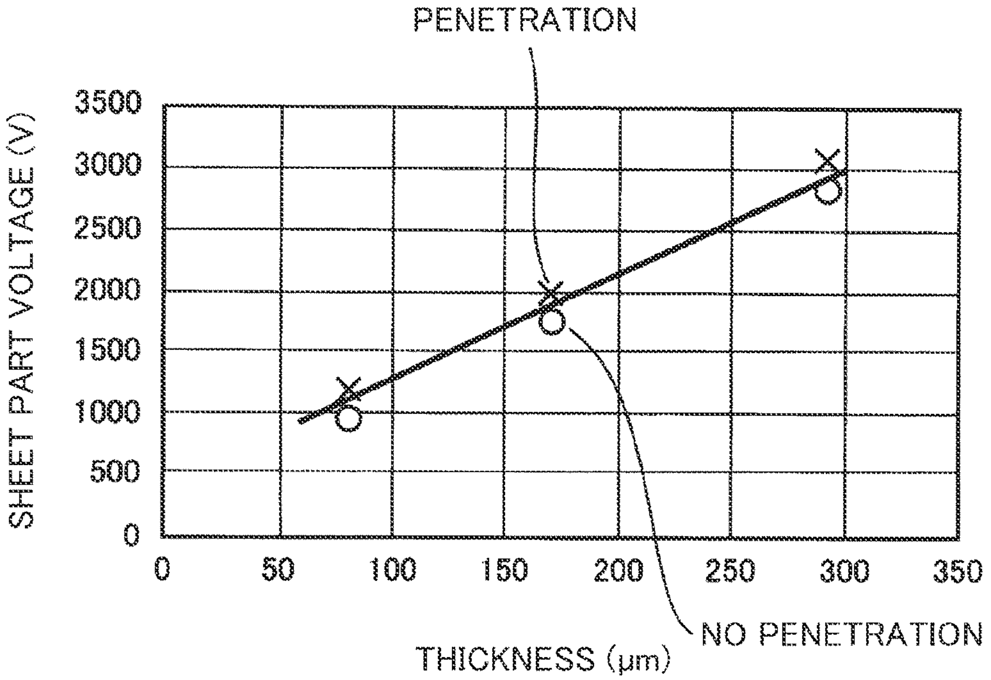

FIG. 14 is a graph for illustrating a relationship between the sheet part voltage and ease of the occurrence of the "penetration".

FIG. 15 is a schematic view showing an example of table data of upper-limit values of sheet part voltages.

Figure 16:
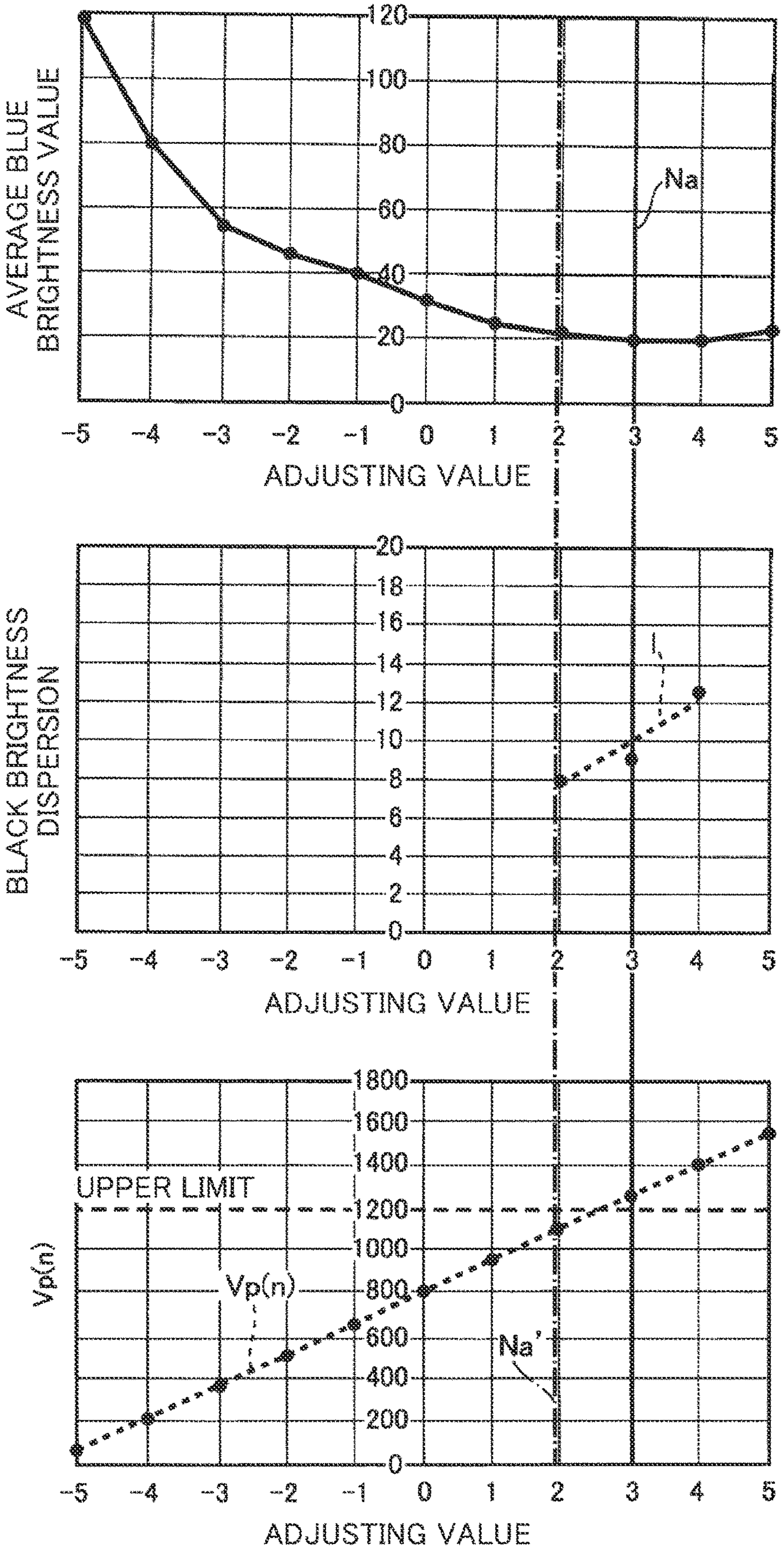

FIG. 16 comprises graphs for illustrating a method of correcting the adjusting value in the case where the "penetration" occurred.

Figure 17:
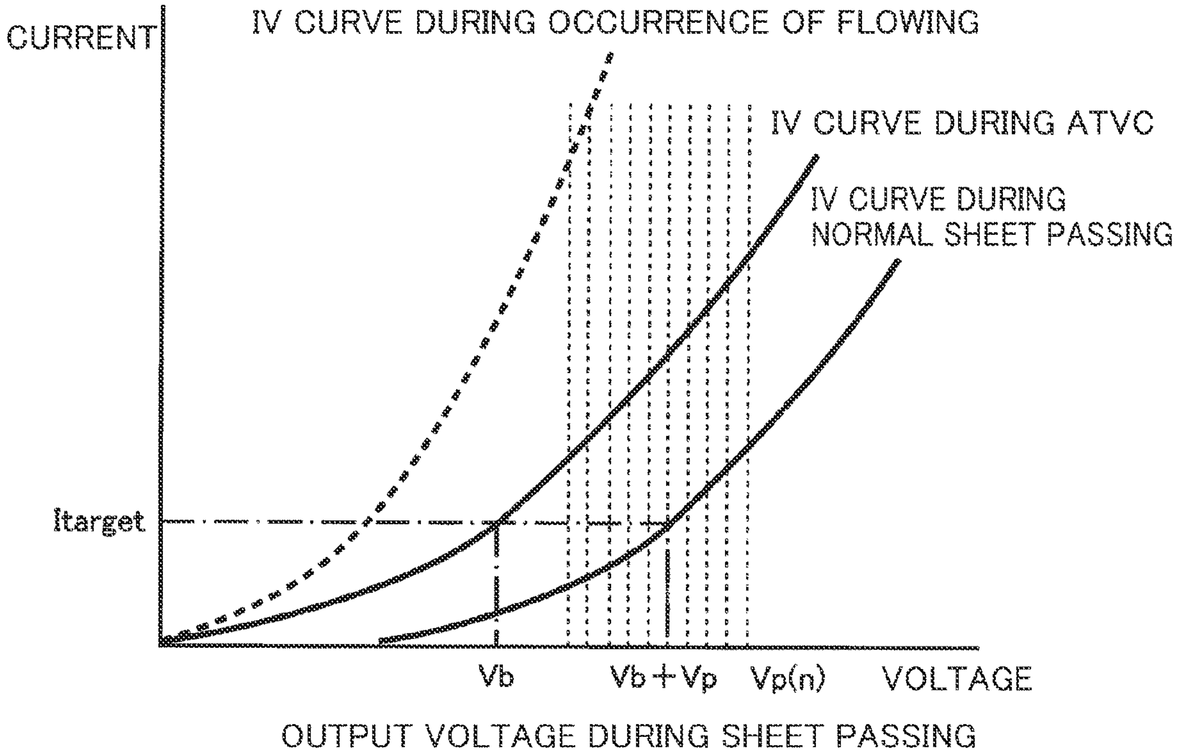

FIG. 17 is a graph showing a voltage-current characteristic acquired each in the control of the secondary transfer voltage, during sheet passing of low-resistance paper, and during sheet passing of normal paper.

Figure 18:
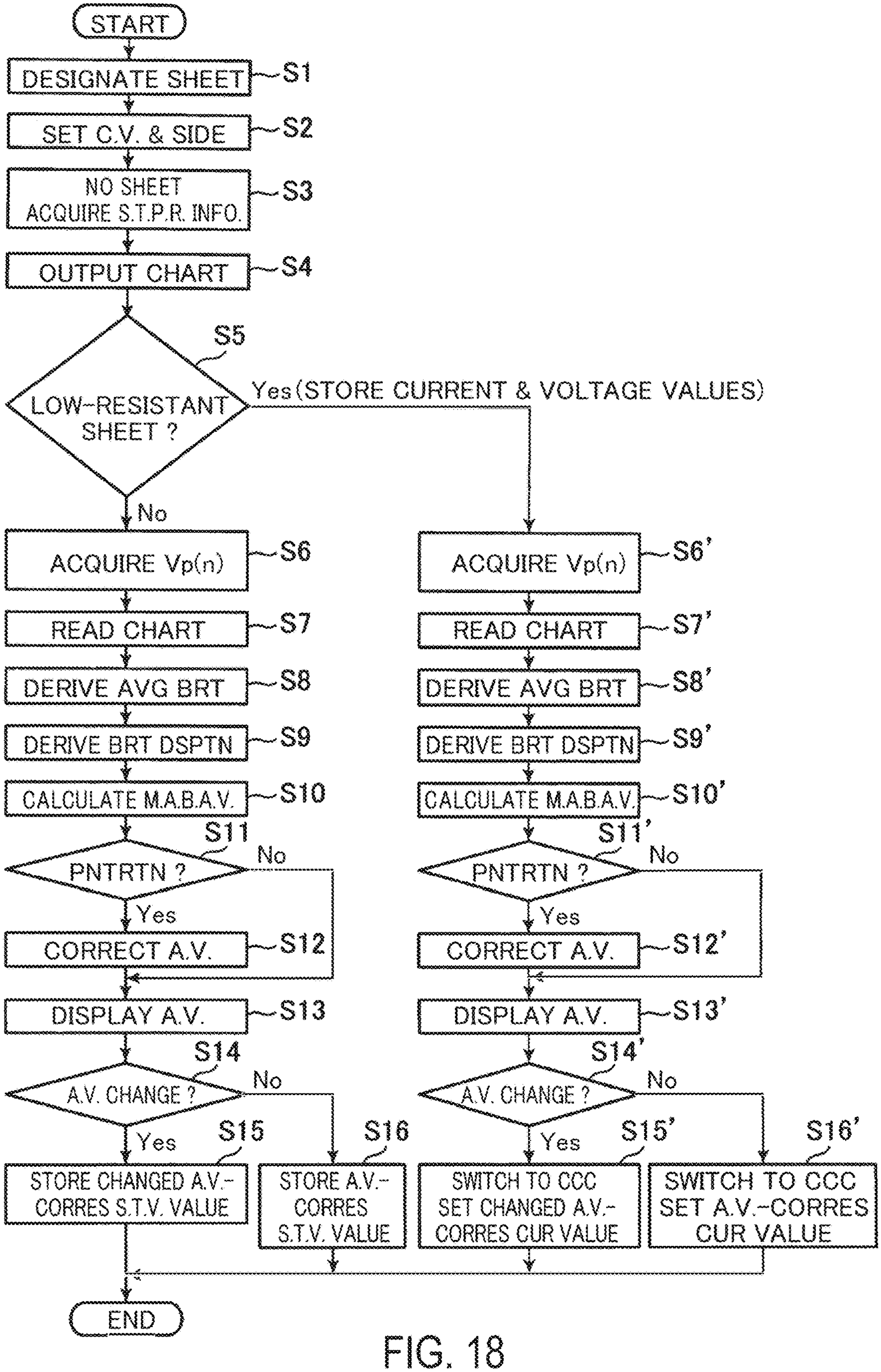

FIG. 18 is a flowchart showing an outline of an operation in an adjusting mode in an embodiment 2.

Figure 19:
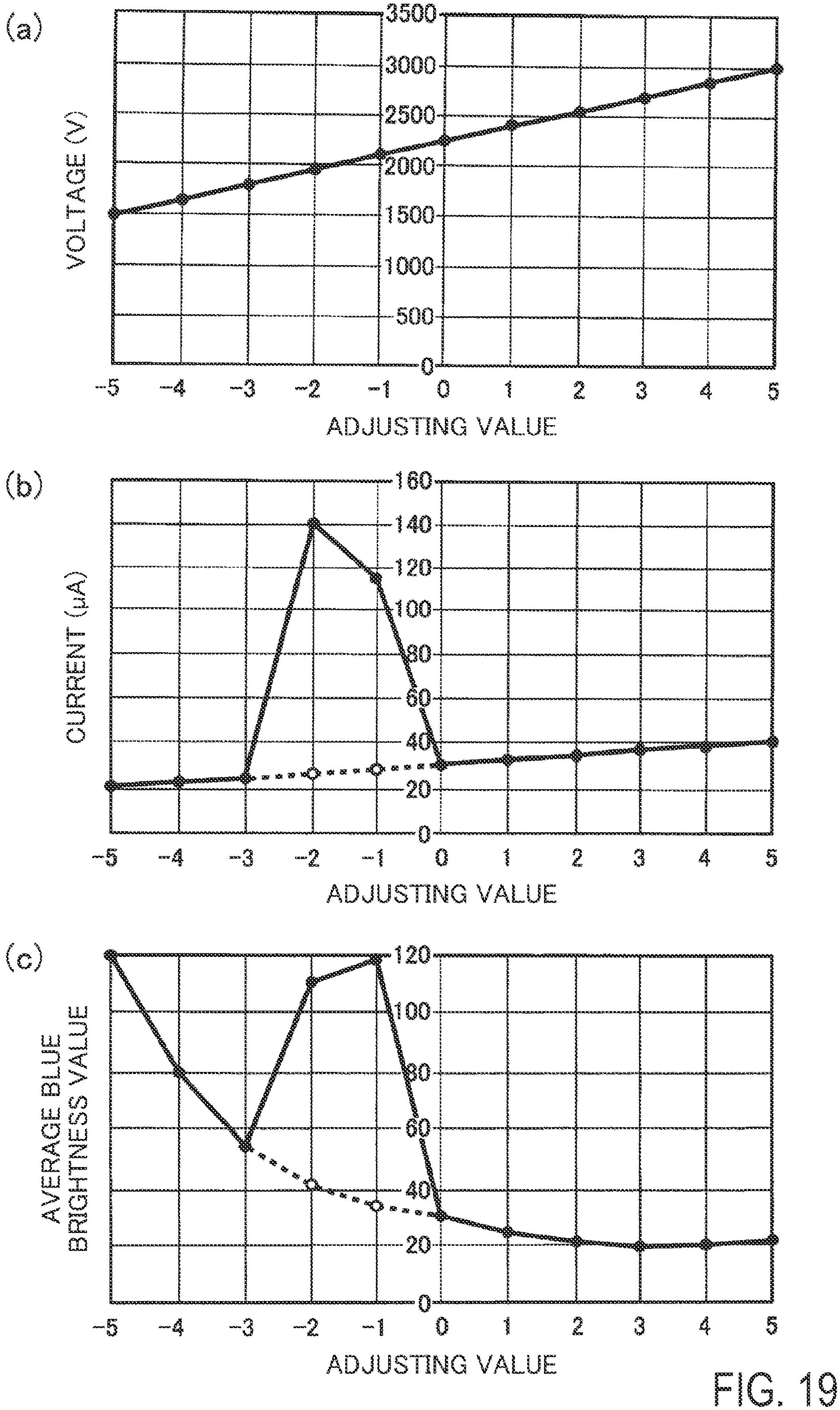

Parts (a), (b), and (c) of FIG. 19 are graphs showing relationships between the secondary transfer voltage adjusting value and the voltage, between the secondary transfer voltage adjusting value and the current, and between the secondary transfer voltage adjusting value and an average brightness value of the patch, respectively.

Figure 20:
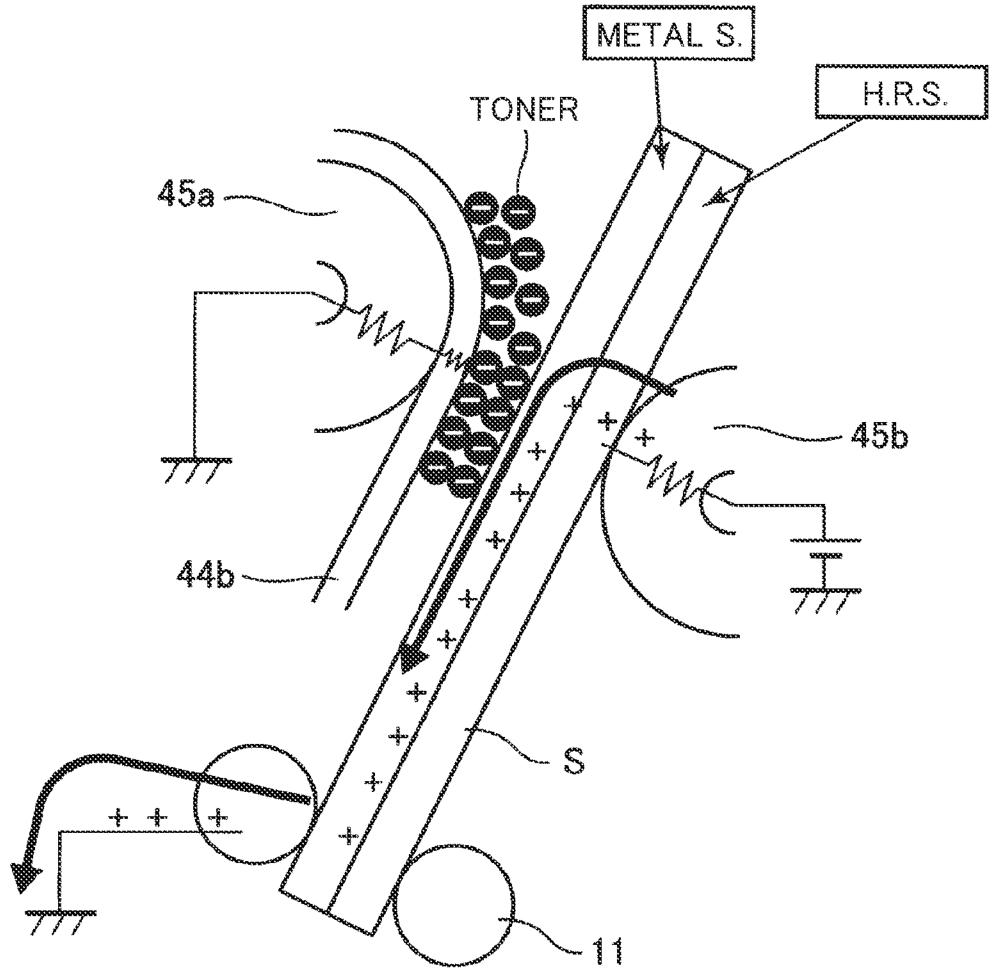

FIG. 20 is a schematic view for illustrating a transfer property in an energization type from an outer secondary transfer roller side.

Figure 21:
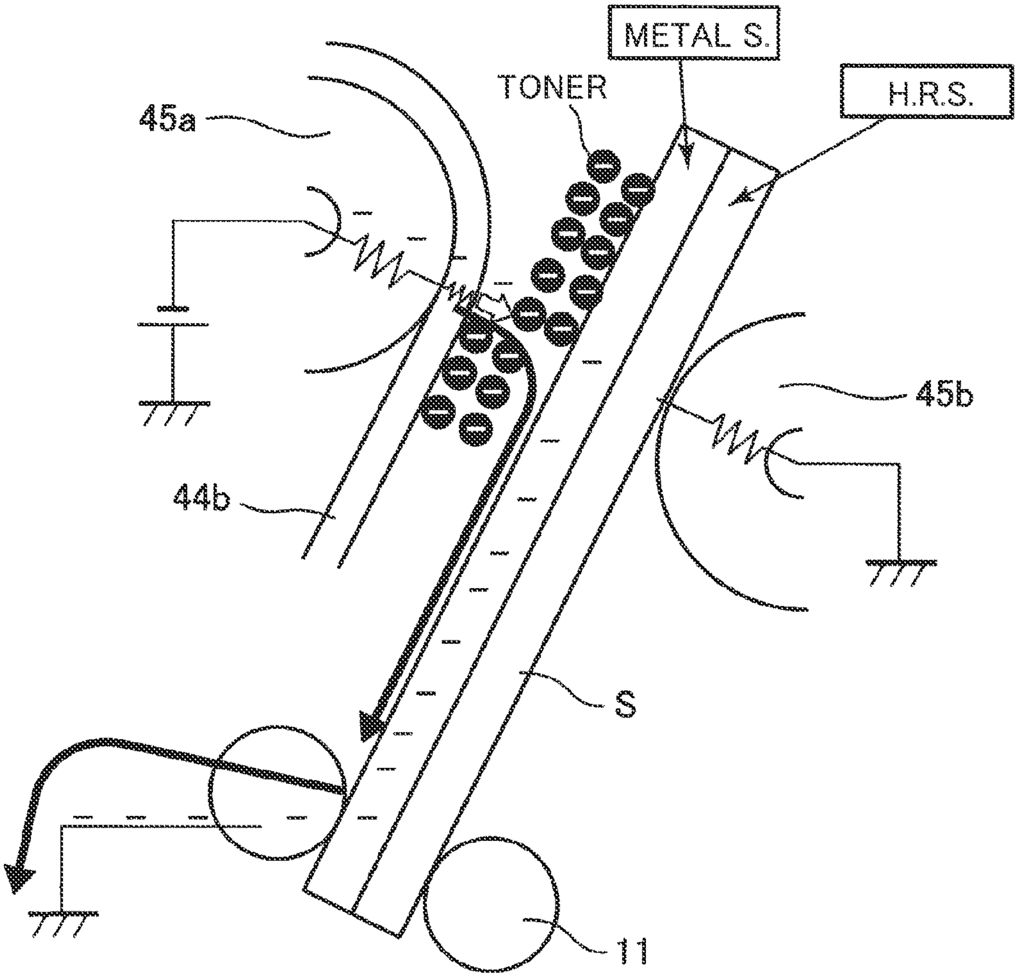

FIG. 21 is a schematic view for illustrating a transfer property in the energization type from an inner secondary transfer roller side.

Figure 22:
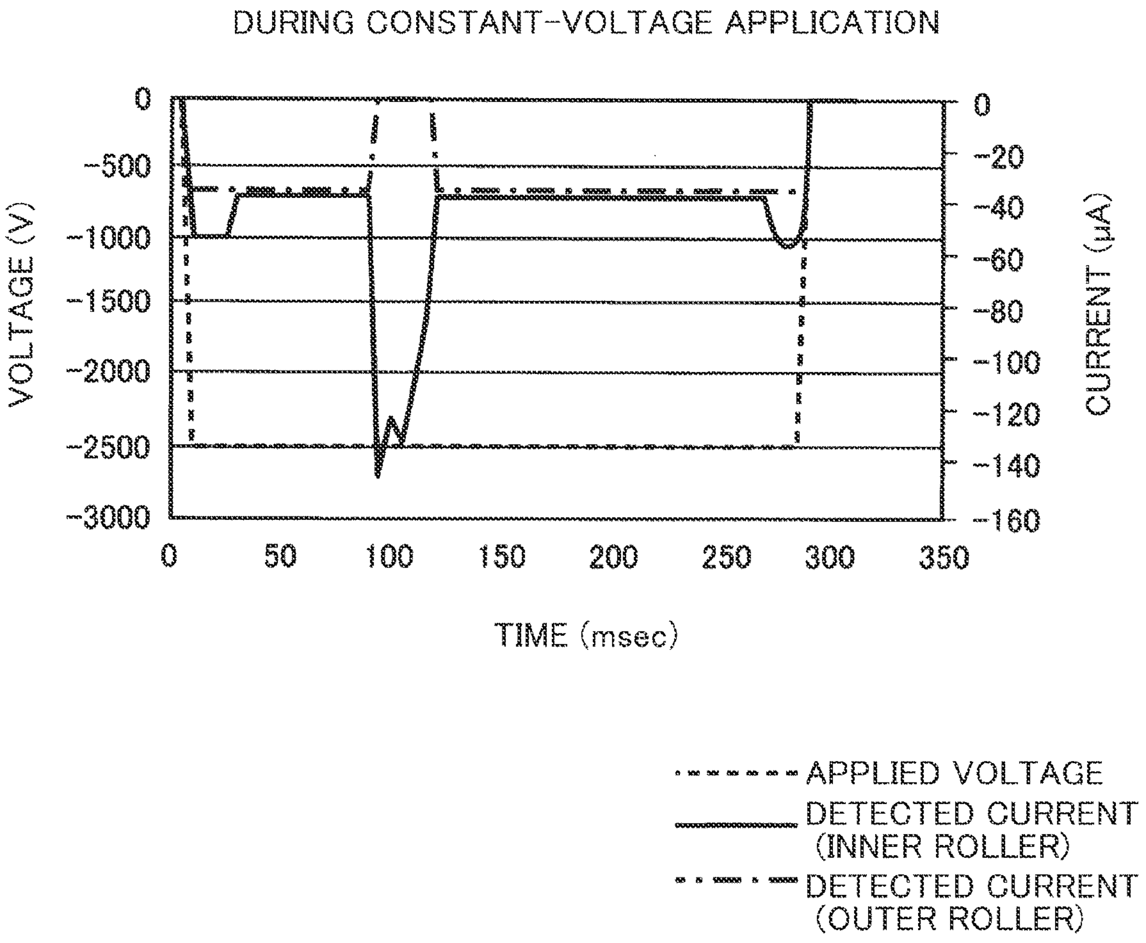

FIG. 22 is a graph for illustrating a secondary transfer current during constant-voltage control.

Figure 23:
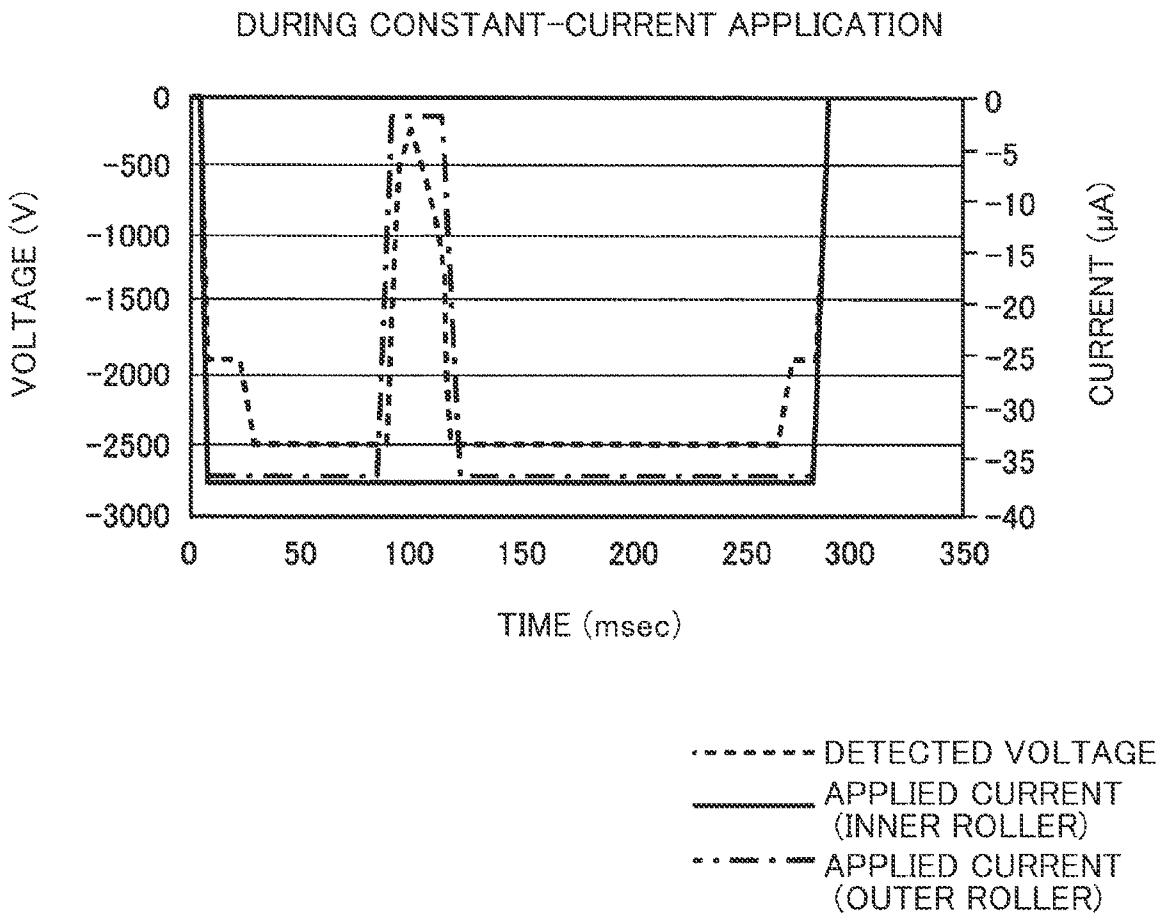

FIG. 23 is a graph for illustrating a secondary transfer current during constant-current control.

Figure 24:
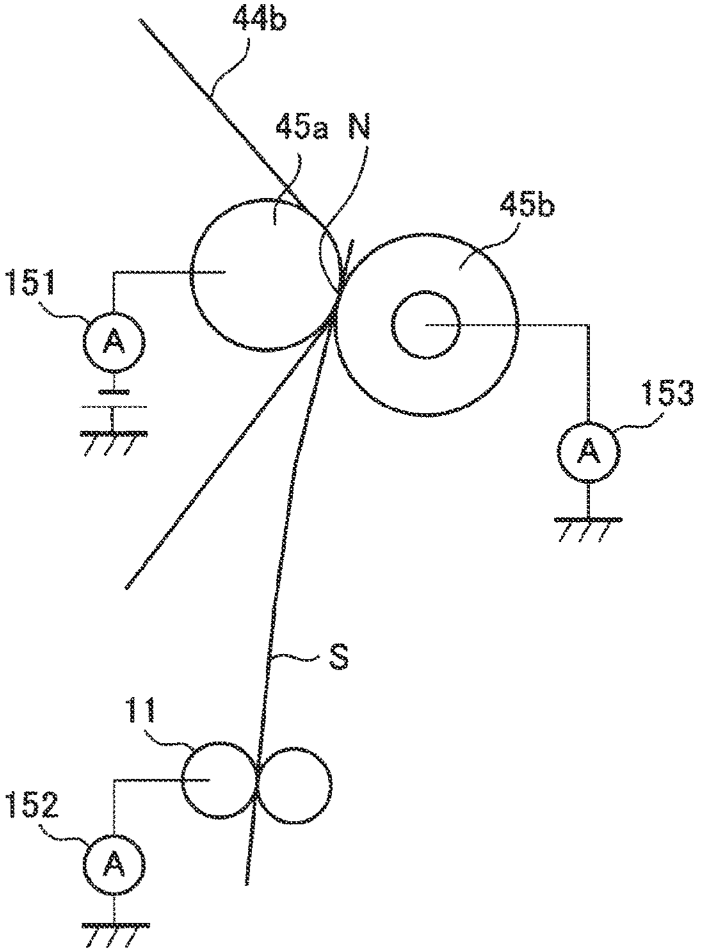

FIG. 24 is a schematic view for illustrating an example of a low-resistance paper detecting method.

Figure 25:
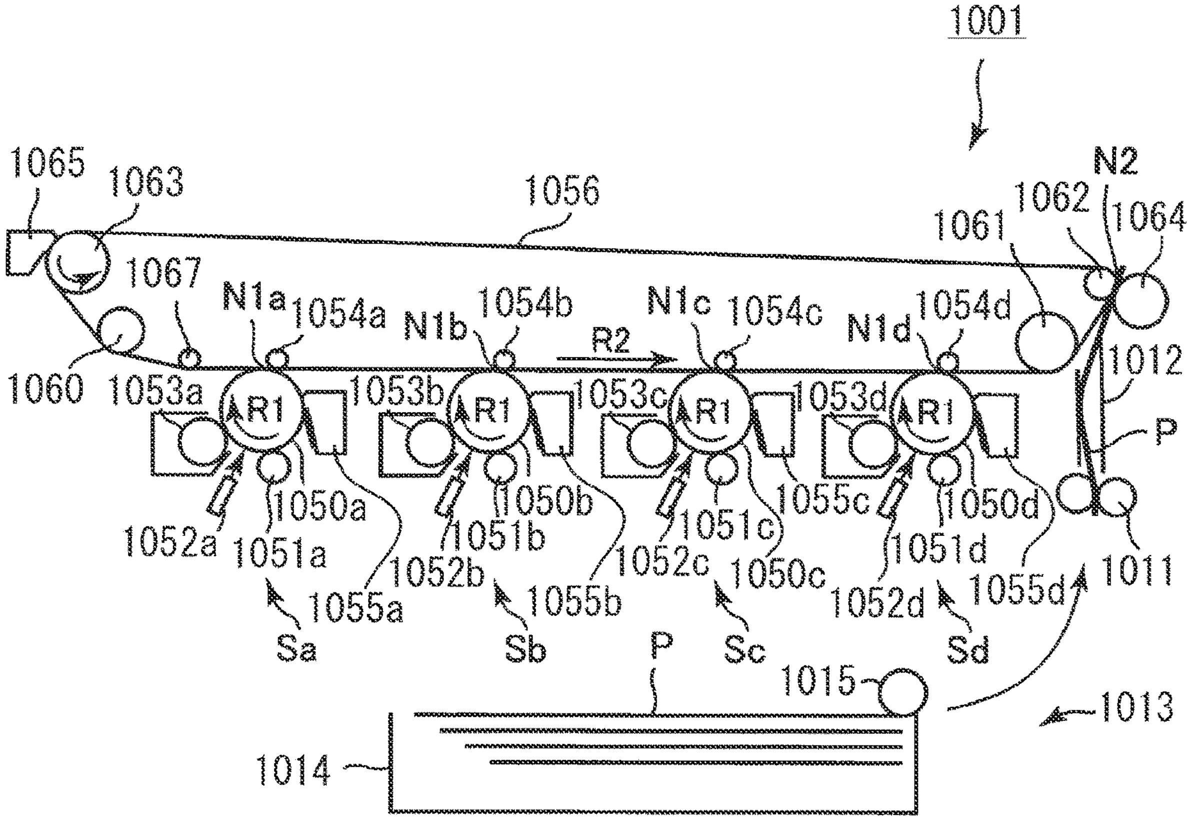

FIG. 25 is a schematic sectional view of an image forming apparatus.

Figure 26:
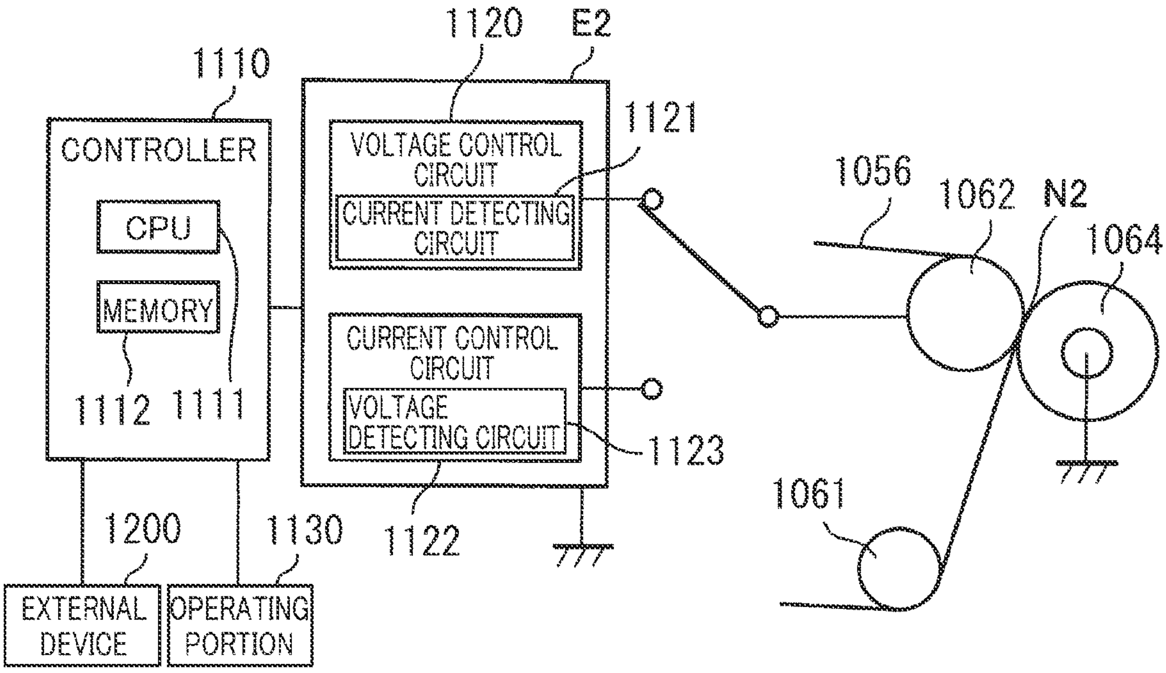

FIG. 26 is a schematic view showing a schematic control mode of the image forming apparatus.

Figure 27:
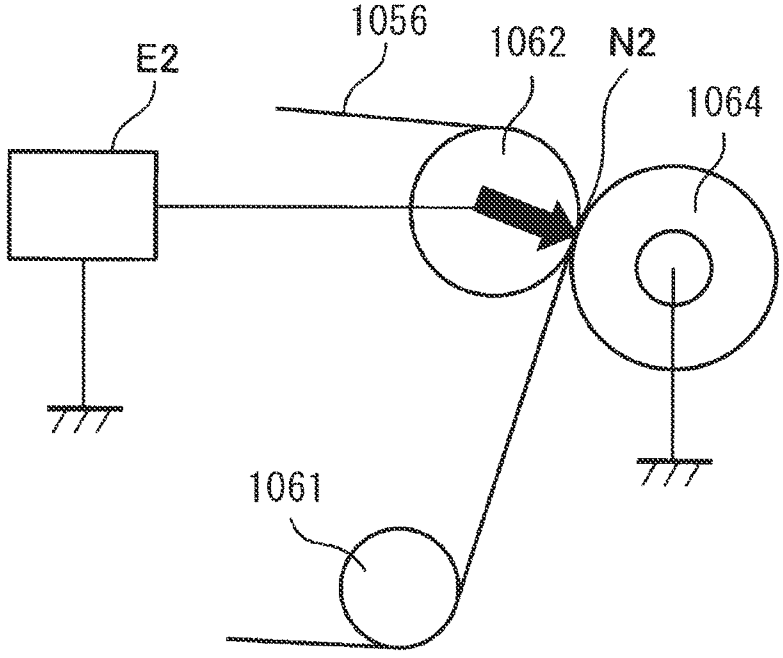

FIG. 27 is a schematic view showing an electric path of a secondary transfer portion.

Figure 28:
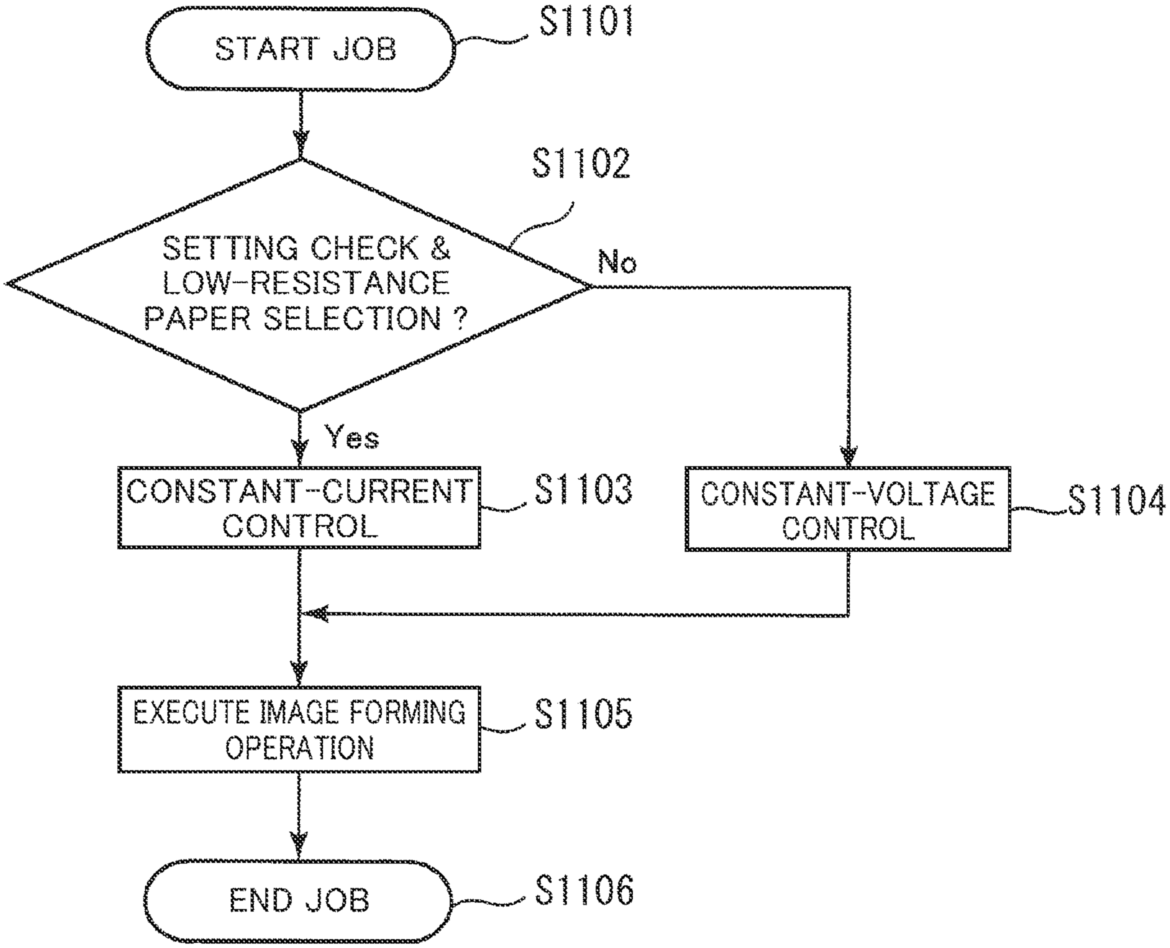

FIG. 28 is a flow chart of control in an embodiment 3.

Figure 29:
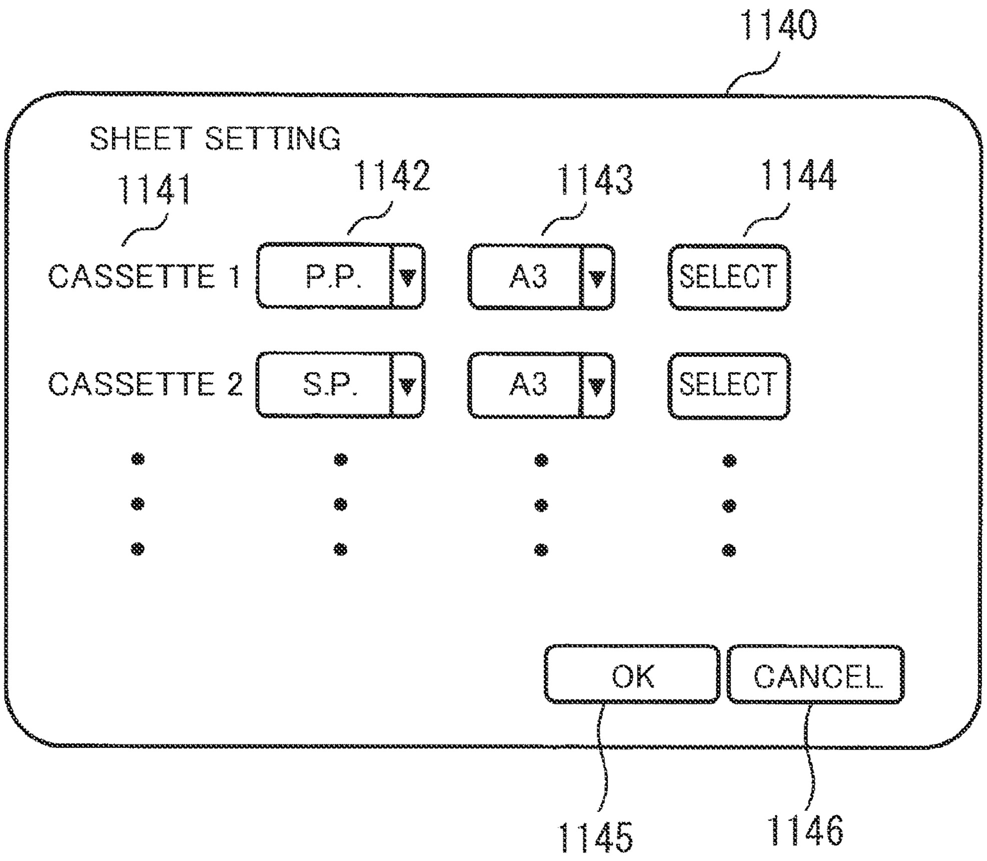

FIG. 29 is a schematic view of a sheet setting screen.

Figure 30:
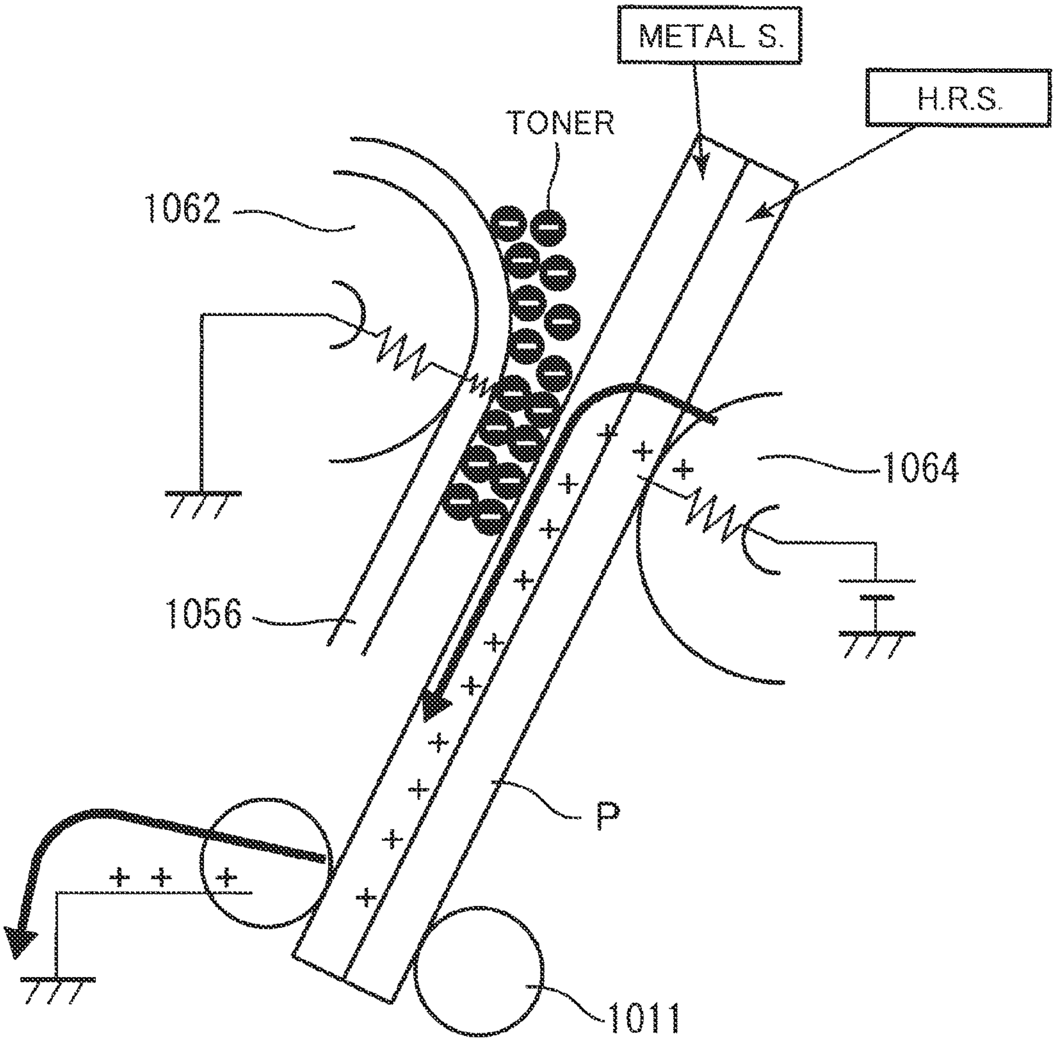

FIG. 30 is a schematic view for illustrating a transfer property in an energization type from an outer secondary transfer roller side.

Figure 31:
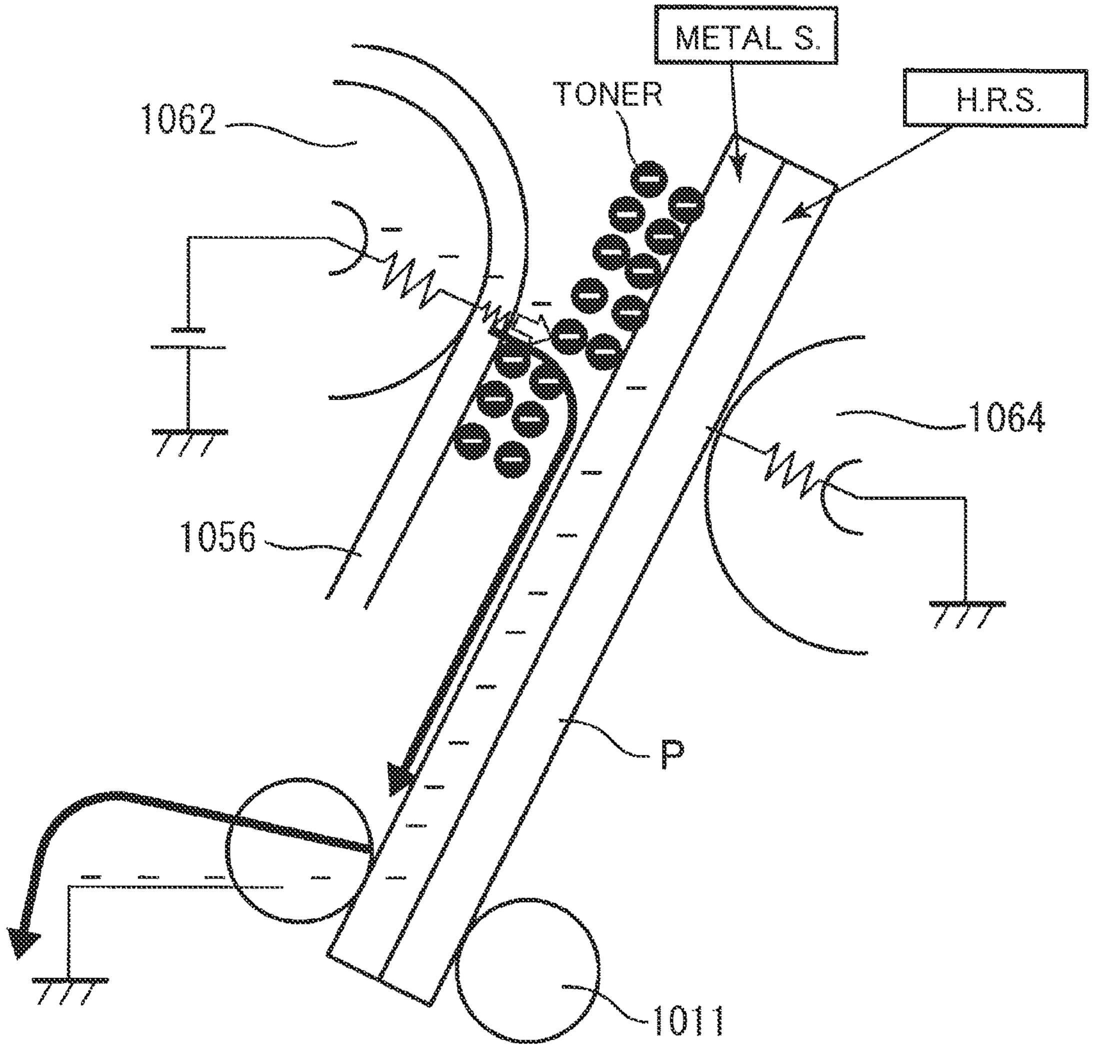

FIG. 31 is a schematic view for illustrating a transfer property in an energization type from an inner secondary transfer roller side.

Figure 32:
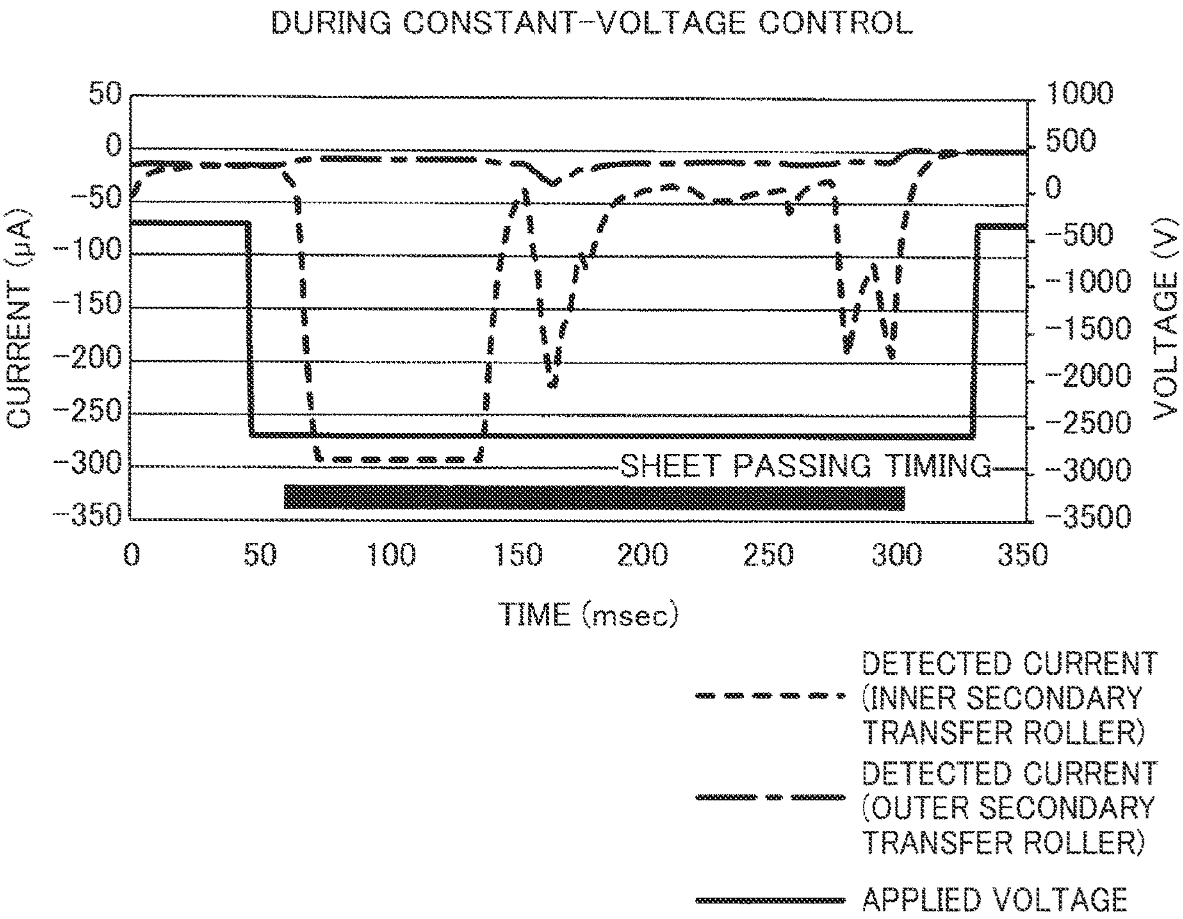

FIG. 32 is a graph for illustrating a secondary transfer current during constant-voltage control.

Figure 33:
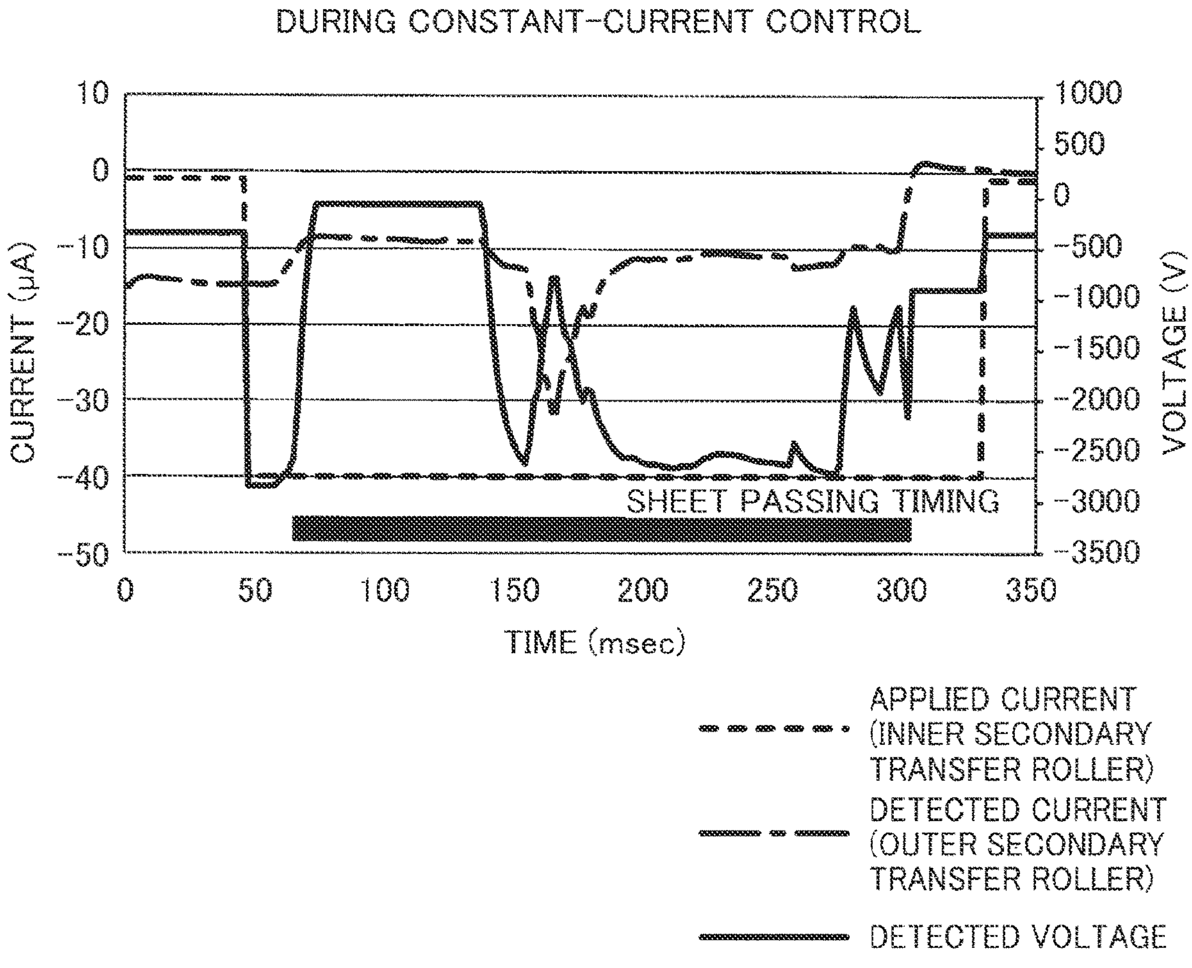

FIG. 33 is a graph for illustrating a secondary transfer current during constant-current control.

Figure 34:
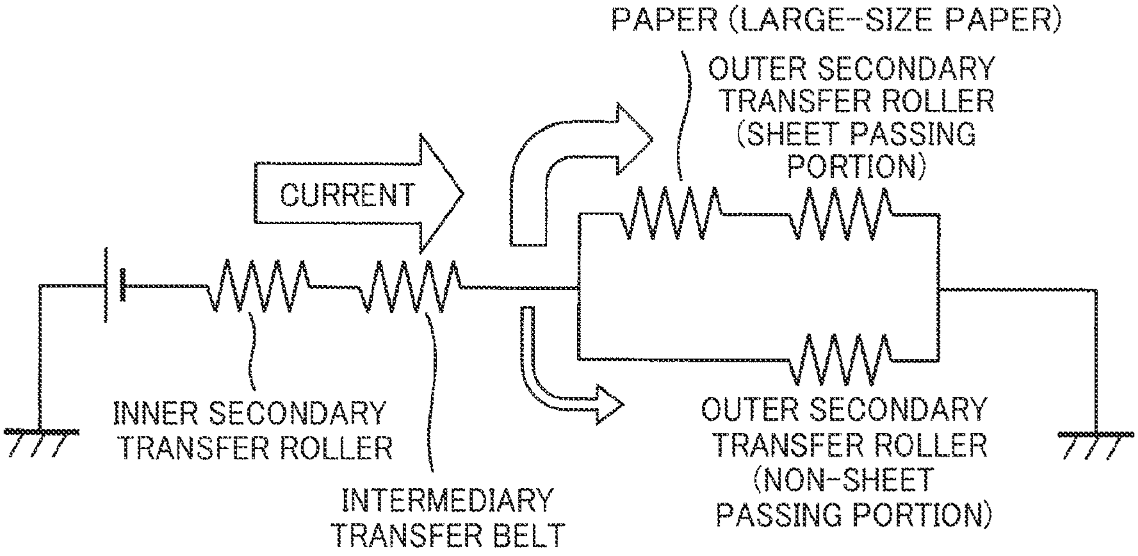

FIG. 34 is a schematic view of an electric circuit of a secondary transfer portion during sheet passing of normal paper.

Figure 35:
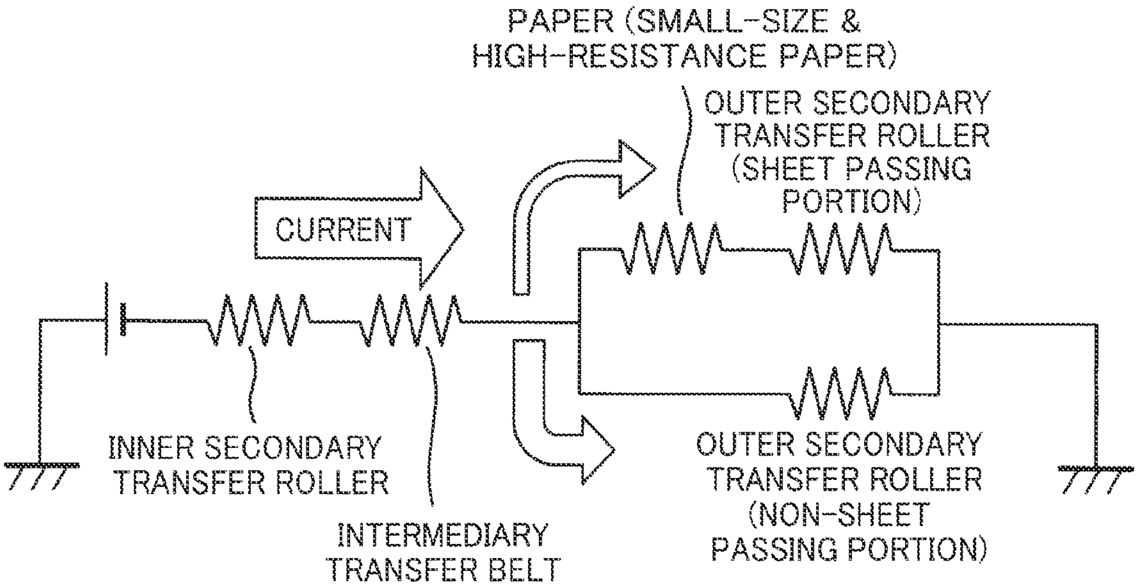

FIG. 35 is a schematic view of an electric circuit of the secondary transfer portion during sheet passing of normal paper.

Figure 36:
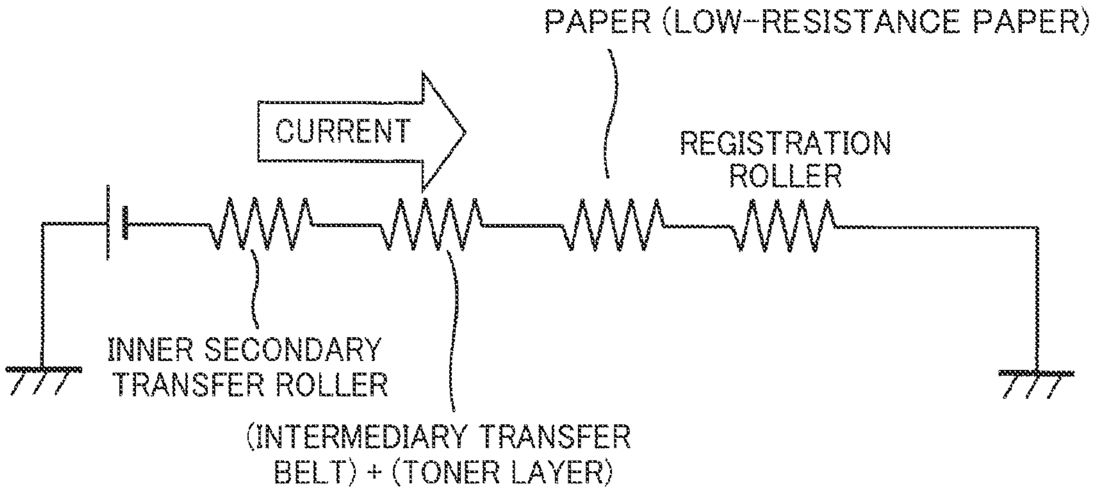

FIG. 36 is a schematic view of an electric circuit of the secondary transfer portion during sheet passing in the case where flowing of a current into a contact member during sheet passing of the low-resistance paper.

Figure 37:
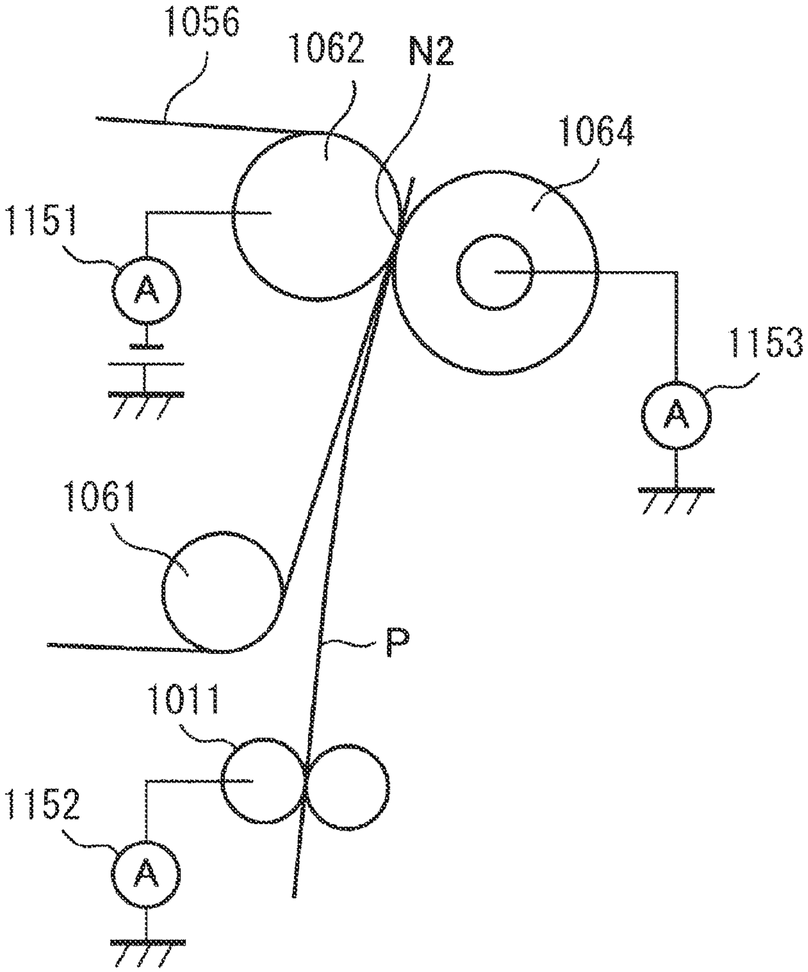

FIG. 37 is a schematic view for illustrating an example of a low-resistance paper detecting method.

DESCRIPTION OF EMBODIMENTS

In the following, the image forming apparatus according to the present invention will be described in more detail with reference to the drawings.

Embodiment 1

1. Structure of Image Forming Apparatus

Figure 1:
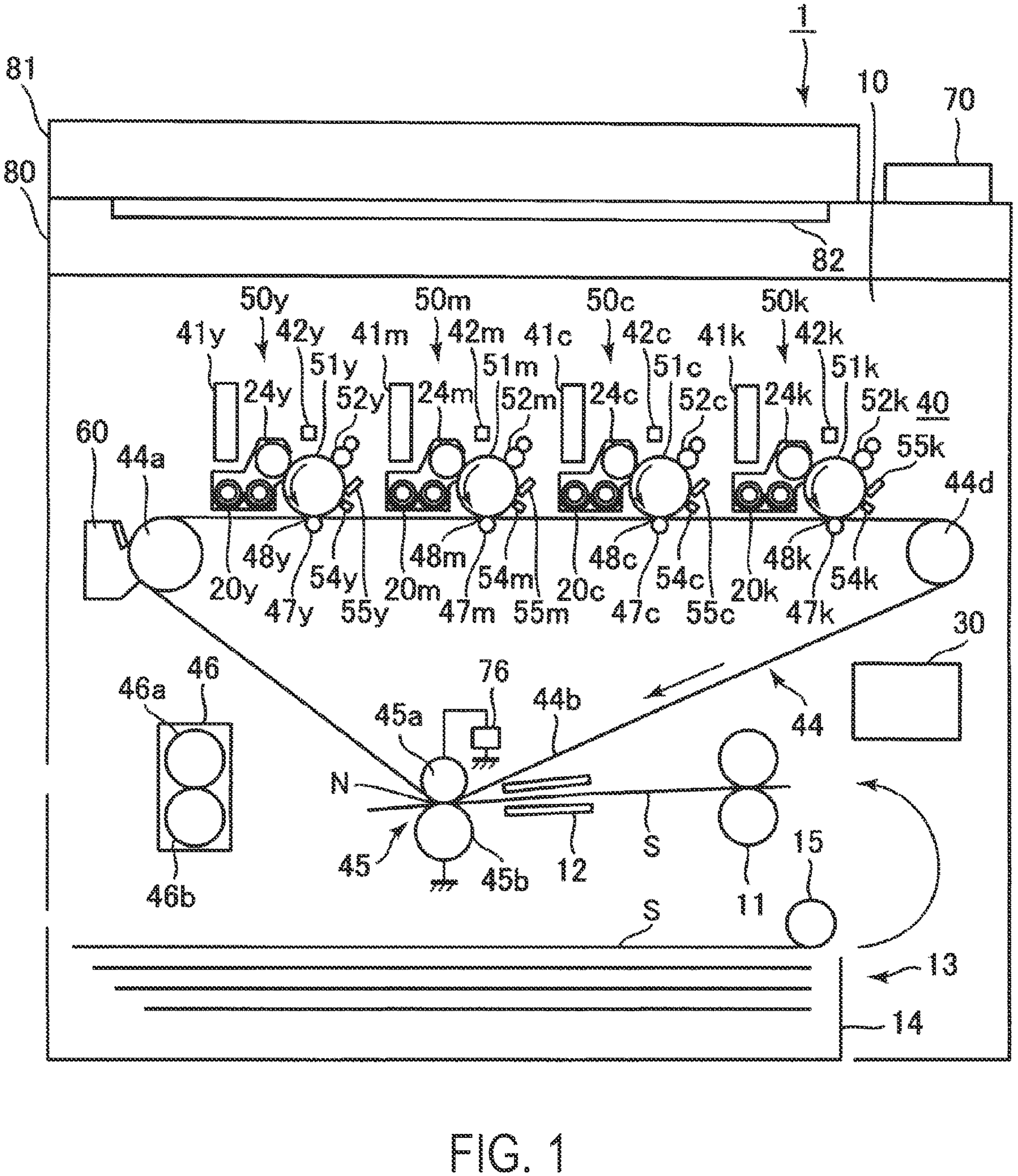
FIG. 1 is a schematic sectional view of an image forming apparatus.

FIG. 1 is a schematic cross-sectional view of an image forming apparatus 1 of this embodiment. The image forming apparatus 1 of this embodiment is a tandem type multi-function machine (having functions of a copying machine, a printer, and a facsimile machine) capable of forming a full-color image by using an electrophotographic type system and employing an intermediary transfer type method. However, the image forming apparatus of the present invention is not limited to a tandem type image forming apparatus, and may be an image forming apparatus of another type. In addition, the image forming apparatus is not limited to an image forming apparatus capable of forming the full-color image, and may be an image forming apparatus capable of forming only a monochromatic image. Further, the image forming apparatus may also be one of various-purpose image forming apparatuses such as printers, various printing machines, copying machines, facsimile machines and multi-function machines.

Figure 2:
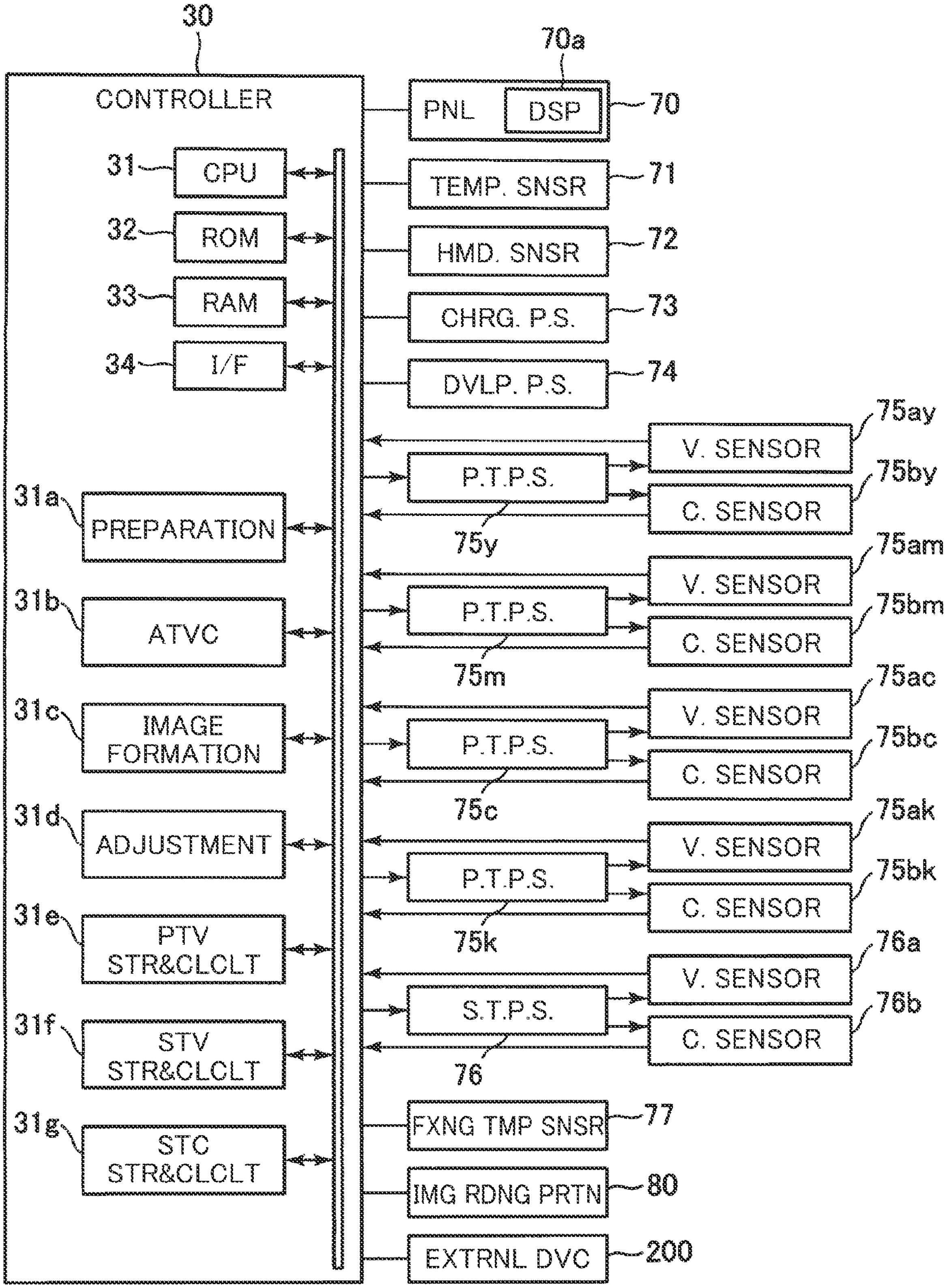
FIG. 2 is a block diagram showing a schematic structure of a control system of the image forming apparatus.

As shown in FIG. 1, the image forming apparatus 1 comprises an apparatus main assembly 10, a feeding portion (not shown), an image forming portion 40, a discharge portion 13, a controller 30, an operation portion 70 (FIG. 2). Inside the apparatus main assembly 10, a temperature sensor 71 (FIG. 2) capable of detecting the temperature inside the apparatus and a humidity sensor 72 (FIG. 2) capable of detecting the humidity inside the apparatus are provided. The image forming apparatus 1 can form 4—color full-color image on recording material (sheet, transfer material, recording medium, form) S, in accordance with image signals supplied from an image reading portion 80 as a reading means for reading an image on the sheet and an external device 200 (FIG. 2). In this embodiment, the image reading portion 80 is provided at an upper portion of the image forming apparatus 1. As the external device 200, it is possible to cite a host device, such as a personal computer, or a digital camera or a smartphone. Here, the recording material S is the material on which a toner image is formed, and specific examples thereof include plain paper, synthetic resin sheets which are substitutes for plain paper, cardboard, overhead projector sheets, and special paper (metallized paper or the like) including a metal layer.

The image forming portion 40 can form the image on the recording material S fed from the feeding portion 13 on the basis of the image information. The image forming portion 40 comprises image forming units 50*y*, 50*m*, 50*c*, 50*k*, toner bottles 41*y*, 41*m*, 41*c*, 41*k*, exposure devices 42*y*, 42*m*, 42*c*, 42*k*, an intermediary transfer unit 44, a secondary transfer device 45, and a fixing portion (fixing device) 46. The image forming units 50*y*, 50*m*, 50*c*, and 50*k* form yellow (y), magenta (m), cyan (c), and black (k) images, respectively. Elements having the same or corresponding functions or structures provided for these four image forming units 50*y*, 50*m*, 50*c*, and 50*k* may be referred to, with y, m, c and k omitted, in the case that the description applies to all colors. Here, the image forming apparatus 1 can also form a single-color or multi-color image by using an image forming unit 50 for a desired single color or some of four colors, such as a monochromatic black image.

The image forming unit 50 includes the following elements. First, a photosensitive drum 51 which is a drum-type (cylindrical) photosensitive member (electrophotographic photosensitive member) as an image bearing member is provided. In addition, a charging roller 52, which is a roller-type charging member, is used as charging means. In addition, a developing device 20 is provided as developing means. In addition, a pre-exposure device 54 is provided as a charge eliminating portion. In addition, a cleaning blade 55 which is a cleaning member as a photosensitive member cleaning member is provided. The image forming unit 50 forms a toner image on the intermediary transfer belt 44*b*, which will be described hereinafter. The image forming unit 50 is unitized as a process cartridge and may be made mountable to and dismountable from the apparatus main assembly 10.

The photosensitive drum 51 is movable (rotatable) carrying an electrostatic image (electrostatic latent image) or a toner image. In this embodiment, the photosensitive drum 51 is a negative charging property organic photosensitive member (OPC) having an outer diameter of 30 mm. The photosensitive drum 51 has an aluminum cylinder as a base material and a surface layer formed on the surface of the base material. In this embodiment, the surface layer comprises three layers of an undercoat layer, a photocharge generation layer, and a charge transportation layer, which are applied and laminated on the substrate in the order named. When the image forming operation is started, the photosensitive drum 51 is driven to rotate in a direction indicated by an arrow (counterclockwise direction) in the figure at a predetermined peripheral speed (process speed) by a motor (not shown) as a driving means.

The surface of the rotating photosensitive drum 51 is uniformly charged by the charging roller 52. In this embodiment, the charging roller 52 is a rubber roller which contacts the surface of the photosensitive drum 51 and is rotated by the rotation of the photosensitive drum 51. The charging roller 52 is connected with a charging power source 73 (FIG. 2). The charging power source 73 applies a charging voltage (charging bias) to the charging roller 52 during the charging process.

The surface of the charged photosensitive drum 51 is scanned and exposed by the exposure device 42 in accordance with the image information, so that an electrostatic image is formed on the photosensitive drum 51. The exposure device 42 includes a laser scanner in this embodiment. The exposure device 42 emits laser beam in accordance with the separated color image information outputted from the controller 30, and scans and exposes the surface (outer peripheral surface) of the photosensitive drum 51.

The electrostatic image formed on the photosensitive drum 51 is developed (visualized) by supplying the developer toner thereto by the developing device 20, so that a toner image is formed on the photosensitive drum 51. In this embodiment, the developing device 20 contains a two-component developer (also simply referred to as "developer") comprising non-magnetic toner particles (toner) and magnetic carrier particles (carrier). The toner is supplied from the toner bottle 41 to the developing device 20. The developing device 20 includes a developing sleeve 24 as a developer carrying member. The developing sleeve 24 is made of a nonmagnetic material such as aluminum or nonmagnetic stainless steel (aluminum in this embodiment). Inside the developing sleeve 24, a magnet roller, which is a roller-shaped magnet, is fixed and arranged so as not to rotate relative to the main body (developing container) of the developing device 20. The developing sleeve 24 carries a developer and conveys it to a developing zone facing the photosensitive drum 51. A developing power source 74 (FIG. 2) is connected to the developing sleeve 24. The developing power source 74 applies a developing voltage (developing bias) to the developing sleeve 24 during the developing process operation. In this embodiment, the normal charging polarity of the toner, which is a principal charging polarity of the toner during development, is negative.

An intermediary transfer unit 44 is arranged so as to face the four photosensitive drums 51*y*, 51*m*, 51*c*, 51*k*. The intermediary transfer unit 44 includes an intermediary transfer belt 44*b*, constituted by an endless belt, as an intermediary transfer member. The intermediary transfer belt 44*b* is wound around, and stretched by a plurality of stretching rollers, a driving roller 44*a*, a tension roller 44*d*, and an inner secondary transfer roller 45*a*. The intermediary transfer belt 44*b* is movable (rotatable) carrying the toner image. The driving roller 44*a* is rotationally driven by a motor (not shown) as driving means, and rotates (circulates) the intermediary transfer belt 44*b*. The tension roller 44*d* contacts the tension of the intermediary transfer belt 44*b* to be constant. The tension roller 44*d* is subjected to a force which pushes the intermediary transfer belt 44*b* from an inner peripheral surface side toward an outer peripheral surface side by the urging force of a spring (not shown) as a biasing means. By this force, the tension roller 44*d* imparts a tension of about 2 to 5 kgf to the intermediary transfer belt 44*b* in a process travelling direction (a surface movement direction of the intermediary transfer belt 44*b*). The inner secondary transfer roller 45*a* constitutes the secondary transfer device 45 as will be described hereinafter. The driving force is transmitted to the intermediary transfer belt 44*b* by the driving roller 44*a*, and the intermediary transfer belt 44*b* is rotated (circulated and moved) in the arrow direction (clockwise direction) in the drawing at a predetermined peripheral speed (process speed) corresponding to the peripheral speed of the photosensitive drum 51. On the inner peripheral surface side of the intermediary transfer belt 44*b*, correspondingly to the photosensitive drums 51*y*, 51*m*, 51*c*, and 51*k*, primary transfer rollers 47*y*, 47*m*, 47*c*, and 47*k* which are roller-type primary transfer members as primary transfer means are provided, respectively. The primary transfer rollers 47*y*, 47*m*, 47*c*, and 47*k* are disposed opposed to the photosensitive drums 51*y*, 51*m*, 51*c*, 51*k*, respectively. The primary transfer roller 47 contacts the photosensitive drum 51 through the intermediary transfer belt 44*b*. That is, the primary transfer roller 47 nips the intermediary transfer belt 44*b* between itself and the photosensitive drum 51. Further, the primary transfer roller 47 is pressed toward the photosensitive drum 51 through the intermediary transfer belt 44*b*. By this, the intermediary transfer belt 44*b* contacts the photosensitive drum 51 and forms a primary transfer portion (primary transfer nip) 48 between itself and the photosensitive drum 51. Incidentally, the stretching rollers, of the plurality of stretching rollers, other than the driving roller 44*a*, and the primary transfer rollers 47*y*, 47*m*, 47*c*, and 47*k* are rotated with rotation of the intermediary transfer belt 44*b*. Further, the intermediary transfer unit 44 includes a belt cleaning device 60 as an intermediary transfer member cleaning means.

The toner image formed on the photosensitive drum 51 is primarily transferred onto the intermediary transfer belt 44*b* by the action of the primary transfer roller 47 in the primary transfer portion 48. In this embodiment, by applying a positive primary transfer voltage to the primary transfer roller 47, a negative toner image on the photosensitive drum 51 is primarily transferred onto the rotating intermediary transfer belt 44*b*. For example, when forming a full-color image, the yellow, magenta, cyan, and black toner images formed on the photosensitive drums 51*y*, 51*m*, 51*c*, and 51*k* are transferred so as to be sequentially superimposed on the intermediary transfer belt 44*b*. A primary transfer power source 75 (FIG. 2) is connected to the primary transfer roller 47. The primary transfer power source 75 applies a DC voltage having a polarity opposite to the normal charging polarity of the toner (positive polarity in this embodiment) as a primary transfer voltage (primary transfer bias) to the primary transfer roller 47 during the primary transfer process operation. The primary transfer power source 75 is connected to a voltage detection sensor 75*a* which detects the output voltage and a current detection sensor 75*b* which detects the output current (FIG. 21). In this embodiment, the primary transfer power sources 75*y*, 75*m*, 75*c*, and 75*k* are provided for the primary transfer rollers 47*y*, 47*m*, 47*c*, and 47*k*, respectively, and the primary transfer voltages applied to the primary transfer rollers 47*y*, 47*m*, 47*c* and 47*k* can be individually controlled.

In this embodiment, the primary transfer roller 47 has an elastic layer of ion conductive foam rubber (NBR rubber) and a cored bar. The outer diameter of the primary transfer roller 47 is, for example, 15 to 20 mm. In addition, as the primary transfer roller 47, a roller having an electric resistance value of $1\times10^5$ to $1\times10^8\Omega$ (N/N (23° C., 50% RH) condition, 2 kV applied) can be preferably used.

In this embodiment, the intermediary transfer belt 44*b* is an endless belt having a two-layer structure including a base layer and a surface layer in the order named from the inner peripheral surface side to the outer peripheral surface side. As the resin material constituting the base layer, a resin such as polyimide or polycarbonate, or a material containing an appropriate amount of carbon black as an antistatic agent in various rubbers can be suitably used. The thickness of the base layer is, for example, 0.05 to 0.15 mm. As a material constituting the surface layer, a resin such as a fluororesin can be suitably used. The surface layer has small adhesive force of the toner to the surface of the intermediary transfer belt 44*b* and makes it easier to transfer the toner onto the recording material S at the secondary transfer portion N. The thickness of the surface layer is, for example, 0.0002 to 0.020 mm. In this embodiment, as a base material of the surface layer, one kind of resin material such as polyurethane, polyester, epoxy resin, or two or more kinds of elastic materials such as rubber, elastomer, butyl rubber, for example, are used. And, as a material for reducing the surface energy and improving the lubricity of this base material, powder or particles such as fluororesin, for example, with one kind or two kinds or different particle diameters are dispersed, so that a surface layer is formed. In this embodiment, the intermediary transfer belt 44*b* has a volume resistivity of $5\times10^8$ to $1\times10^{14}$ Ω·cm (23° C., 50% RH) and a static friction coefficient of 0.15 to 0.6 (23° C., 50% RH, type 94i manufactured by HEIDON). In this embodiment, the two-layer structure was employed for the intermediary transfer belt 44*b*, but a single-layer structure of a material corresponding to the material of the base layer may also be employed, for example.

On the outer peripheral surface side of the intermediary transfer belt 44*b*, an outer secondary transfer roller 45*b* which constitutes the secondary transfer device 45 in cooperation with the inner secondary transfer roller 45*a* is disposed. The outer secondary transfer roller 45*b* contacts the inner secondary transfer roller 45*a* through the intermediary transfer belt 44*b*. Further, the outer secondary transfer roller 45*b* is pressed toward the inner secondary transfer roller 45*a* through the intermediary transfer belt 44*b*. By this, the outer secondary transfer roller 45*b* contacts the intermediary transfer belt 44*b*, and forms a secondary transfer portion (secondary transfer nip) between itself and the intermediary transfer belt 44*b*. The toner image formed on the intermediary transfer belt 44*b* is secondarily transferred onto the recording material S by the action of the secondary transfer device 45 in the secondary transfer portion N. In this embodiment, a negative secondary transfer voltage is applied to the inner secondary transfer roller 45*a* so that the negative toner image on the intermediary transfer belt 44*b* is secondarily transferred onto the recording material S which is nipped and fed between the intermediary transfer belt 44*b* and the outer secondary transfer roller 45*b*. The recording material S is fed from the feeding portion 13 in parallel with the above-described toner image forming operation, and the toner image on the intermediary transfer belt 44*b* is fed by a registration roller pair 11 provided in the feeding path at the timing of the toner image. The sheet is then fed to the secondary transfer portion N. The feeding portion 13 is constituted by including a cassette 14 as a recording material accommodating portion for accommodating the recording material(s) S, a feeding roller 15 as a feeding member for feeding the recording material S, and the like. The recording materials S accommodated in the cassette 14 are separated and fed one by one from the cassette 14 by the feeding roller 15 or the like. This recording material S is conveyed to a registration roller pair 11 as a conveying member (conveying roller pair), and oblique movement of the recording material S is corrected by the registration roller pair 11. In addition, the recording material S is supplied to the secondary transfer portion N by controlling a conveying timing as described above. The recording material S conveyed by the registration roller pair 11 is guided to the secondary transfer portion N by a pre-transfer guiding member 12 as a guiding member (conveying guide). Incidentally, although omitted from illustration, a plurality of cassettes 14 are provided, and a recording material S designated in job information descried later may be fed from a corresponding cassette 14.

Further, the image forming apparatus 1 is not limited to an image forming apparatus in which the recording material S is fed from the cassette 14 as the recording material accommodating portion, but for example, the recording material S may also be made feedable from a manual feeding tray or the like as a recording material accommodating portion (recording material stacking portion).

The secondary transfer device 45 as the secondary transfer means is constituted by including the inner secondary transfer roller 45*a* and the outer secondary transfer roller 45*b*. The inner secondary transfer roller 45*a* is a roller-type secondary transfer member, and the outer secondary transfer roller 45*b* is a roller-type opposing member (opposite electrode). The inner secondary transfer roller 45*a* is disposed opposite to the outer secondary transfer roller 45*b* through the intermediary transfer belt 44*b*. To the inner secondary transfer roller 45*a*, a secondary transfer power source (high-voltage circuit) 76 as applying means (FIG. 2) is connected. During the secondary transfer process, the secondary transfer power source 76 applies a DC voltage having a polarity identical to the normal charging polarity of the toner (negative in this embodiment) to the inner secondary transfer roller 45*a* as secondary transfer voltage (secondary transfer bias). To the secondary transfer power source 76, a voltage detection sensor 76*a* for detecting the output voltage and a current detection sensor 76*b* for detecting the output current are connected (FIG. 2). The core metal of the outer secondary transfer roller 45*b* is connected to the ground potential. And, as specifically described later, basically, when the recording material S is supplied to the secondary transfer portion N, a secondary transfer voltage subjected to constant-voltage control having a polarity identical to the normal charging polarity of the toner is applied to the inner secondary transfer roller 45*a*. In this embodiment, for example, a secondary transfer voltage of −1 to −7 kV is applied to the inner secondary transfer roller 45*a*, and a current of −40 to −120 μA is caused to flow, so that the toner image on the intermediary transfer belt 44*b* is secondarily transferred onto the recording material S. Thus, in this embodiment, the outer secondary transfer roller 45*b* is connected to the ground potential, and a voltage is applied from the secondary transfer power source 76 to the inner secondary transfer roller 45*a*.

In this embodiment, the outer secondary transfer roller 45*b* has an elastic layer of ion conductive foam rubber (NBR rubber) and a core metal. The outer diameter of the outer secondary transfer roller 45*b* is, for example, 20 to 25 mm. In addition, as the outer secondary transfer roller 45*b*, a roller having an electric resistance value of $1\times10^5$ to $1\times10^8\Omega$ (measured at N/N (23° C., 50 RH), 2 kV applied) can be preferably used. Further, in this embodiment, the inner secondary transfer roller 45*a* includes a core metal and an elastic layer constituted by an elastic material such as EPDM to which electroconductivity is imparted by adding thereto, as an electroconductive agent, an ion-conductive agent or an electron-conductive agent such as carbon black. An outer diameter of the inner secondary transfer roller 45*a* is, for example, 15-20 mm.

The recording material S onto which the toner image has been transferred is fed to a fixing portion 46 as a fixing means. The fixing portion 46 includes a fixing roller 46*a* and a pressure roller 46*b*. The fixing roller 46*a* includes therein a heater as a heating means. The recording material S carrying the unfixed toner image is heated and pressed by being sandwiched and fed between the fixing roller 46*a* and the pressure roller 46*b*. By this, the toner image is fixed (melted and fixed) on the recording material S. Here, the temperature of the fixing roller 46*a* (fixing temperature) is detected by a fixing temperature sensor 77 (FIG. 2).

The recording material S on which the toner image is fixed is fed through a discharge path in a discharge portion (not shown), is discharged through a discharge port, and then stacked on a discharge tray (not shown) provided outside the apparatus main assembly 10. In addition, between the fixing portion 46 and the discharge opening of the discharge portion, a reverse feeding path (not shown) for turning over the recording material S on which the toner image is fixed on the first surface and for supplying the recording material S to the secondary transfer portion N again, Z). The recording material S re-supplied to the secondary transfer portion N by the operation of the reverse feeding path is discharged onto the outside of the apparatus main assembly 10 after the toner image is transferred and fixed on the second side. As described above, the image forming apparatus 1 of this embodiment is capable of executing double-sided printing (automatic double-sided printing) which forms images on both sides of a single recording material S.

The surface of the photosensitive drum 51 after the primary transfer is electrically discharged by the pre-exposure device 54. In addition, the toner remaining on the photosensitive drum 51 without being transferred onto the intermediary transfer belt 44*b* during the primary transfer process (primary untransferred residual toner) is removed from the surface of the photosensitive drum 51 by the cleaning blade 55 and is collected in a collection container (not shown). The cleaning blade 55 is a plate-like member which is in contact with the photosensitive drum 51 with a predetermined pressing force. The cleaning blade 55 is in contact with the surface of the photosensitive drum 51 in a counter direction in which the outer end portion of the free end portion faces the upstream side in the rotational direction of the photosensitive drum 51. In addition, toner remaining on the intermediary transfer belt 44*b* without being transferred onto the recording material S during the secondary transfer process (secondary untransferred residual toner) or adhering matter such as paper dust is removed and collected from the surface of the intermediary transfer belt 44*b* by the belt cleaning device 60.

At an upper portion of the apparatus main assembly 10, an automatic original feeding device 81 and an image reading portion 80 are provided. The automatic original feeding device 81 automatically feeds, toward the image reading portion 80, a sheet (for example, a chart described later) such as an original or the recording material S on which the image is formed. The image reading portion 80 reads an image on a sheet directly placed on a platen glass 82 or an image on a sheet fed by the automatic original feeding device 81 so as to pass through onto at least part of the platen glass 82. The image reading portion 80 illuminates the sheet placed on the platen glass 82 (including the case where the sheet passes through onto at least a part of the platen glass 82) with light from a light source (not shown). Further, the image reading portion 80 reads the image on the sheet, in terms of a dot density determined in advance, by an image reading element (not shown). That is, the image reading portion 80 optically reads the image on the sheet and covers the read image into an electric signal.

FIG. 2 is a block diagram showing in a schematic structure of a control system of the image forming apparatus 1 of this embodiment. As shown in FIG. 2, the controller 30 is constituted by a computer, and includes, for example, a CPU 31, a ROM 32 for storing a program for controlling each unit, a RAM 33 for temporarily storing data, and an input/output circuit (I/F) 34 for inputting/outputting signals to and from the outside. The CPU 31 is a microprocessor which controls the entire image forming apparatus 1 and is a main part of the system controller. The CPU 31 is connected to the feeding portion 13 (FIG. 1), the image forming portion 40 (FIG. 1), the discharge portion (not shown), and the operation portion 70 via the input/output circuit 34, and exchanges signals with these portions, and controls the operation of each of these portions. The ROM 32 stores an image formation control sequence for forming an image on the recording material S. The controller 30 is connected to the charging power source 73, the developing power source 74, a primary transfer power source 75, and a secondary transfer power source 76, which are controlled by signals from the controller 30, respectively. In addition, to the controller 30, a temperature sensor 71, a humidity sensor 72, a voltage detection sensor 75*a* and a current detection sensor 75*b* of the primary transfer power source 75, a voltage detection sensor 76*a* and a current detection sensor 76*b* of the secondary transfer power source 76, and a fixing temperature sensor 77 are connected. A signal indicating a detection result of each of the sensors is inputted to the controller 30.

The operating portion 70 includes an operation button as input means, and a display portion 70*a* including a liquid crystal panel as display means. Here, in this embodiment, the display unit 70*a* is constituted as a touch panel, and also has a function as input means. The operators such as users and service personal can cause the image forming apparatus 1 to execute a job (a series of operations to form and output an image or images on one or more recording materials S, started by a single start instruction) by operating the operation portion 70. The controller 30 receives the signal from the operating portion 70 and operates various devices of the image forming apparatus 1. The image forming apparatus 1 can also execute the job on the basis of an image forming signal (image data, control command) supplied from an external device 200 such as a personal computer.

In this embodiment, the controller 30 includes an image formation pre-preparation process portion 31*a*, an ATVC process portion 31*b*, an image formation process portion 31*c*, and an adjustment process portion 31*d*. In addition, the controller 30 includes a primary transfer voltage storage/operation portion 31*e*, a secondary transfer voltage storage/operation portion 31*f*, and a secondary transfer current storage/operation portion 31*g*. Here, each of these process portions and storage/operation portions may be provided as a portion or portions of the CPU 31 or the RAM 33. For example, the controller 30 (specifically the image formation process portion 31*c*) can execute a print job as described above. In addition, the controller 30 (specifically the ATVC process portion 31*b*) can execute ATVC (setting mode) for the primary transfer portion 48 and the secondary transfer portion N. Details of the ATVC will be described hereinafter. In addition, the controller 30 (specifically the adjustment process portion 31*d*) can execute an operation in an adjusting mode for adjusting the setting voltage of the secondary transfer voltage. Details of the adjusting mode will be described hereinafter.

Here, the image forming apparatus 1 executes the job (image output operation, print job) which is series of operations to form and output an image or images on a single or a plurality of recording materials S started by one start instruction. The job includes an image forming step, a pre-rotation step, a sheet (paper) interval step in the case where the images are formed on the plurality of recording materials S, and a post-rotation step in general. The image forming step is a period in which formation of an electrostatic image for the image actually formed and outputted on the recording material S, formation of the toner image, primary transfer of the toner image and secondary transfer of the toner image are carried out, in general, and during image formation (image forming period) refers to this period. Specifically, timing during the image formation is different among positions where the respective steps of the formation of the electrostatic image, the toner image formation, the primary transfer of the toner image and the secondary transfer of the toner image are performed. The pre-rotation step is a period in which a preparatory operation, before the image forming step, from an input of the start instruction unit the image is started to be actually formed. The sheet interval step (recording material interval step, image interval step) is a period corresponding to an interval between a recording material S and a subsequent recording material S when the images are continuously formed on a plurality of recording materials S (continuous image formation). The post-rotation step is a period in which a post-operation (preparatory operation) after the image forming step is performed. During non-image formation (non-image formation period) is a period other than the period of the image formation (during image formation) and includes the periods of the pre-rotation step, the sheet interval step, the post-rotation step and further includes a period of a pre-multi-rotation step which is a preparatory operation during turning-on of a main switch (power source) of the image forming apparatus 1 or during restoration from a sleep state.

2. Control of Secondary Transfer Voltage

Figure 3:
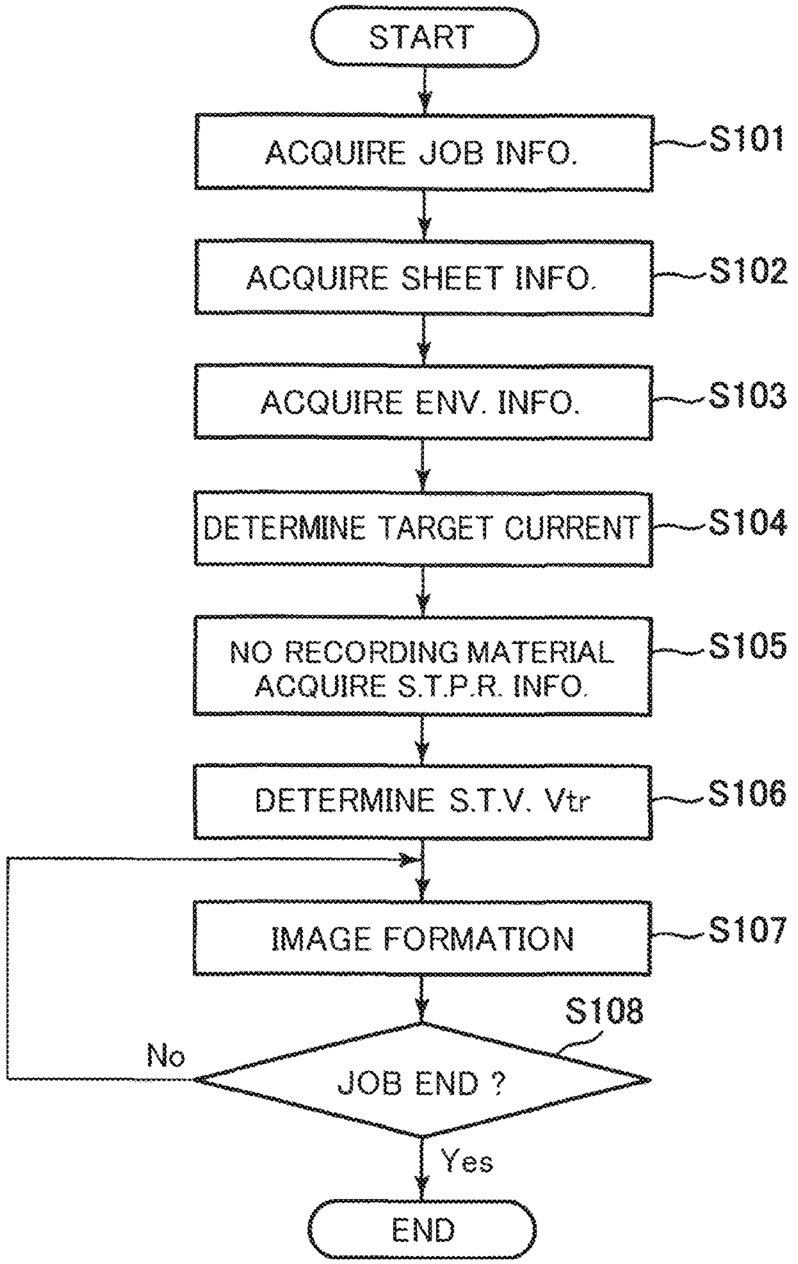
FIG. 3 is a flowchart showing an outline of control of a secondary transfer voltage.

Next, control of the secondary transfer voltage will be described. FIG. 3 is a flow chart showing an outline of a procedure of the control of the secondary transfer voltage in this embodiment. In this embodiment, as the control of the secondary transfer voltage, constant-voltage control and constant-current control can be carried out, but as specifically described later, basically, the constant-voltage control is used. Incidentally, the constant-voltage control is control so that an output of the power source is adjusted so that a voltage applied to an application object becomes substantially constant at a target voltage. Further, the constant-current control is control such that an output of the power source is adjusted so that a current supplied to a supply object becomes substantially constant at a target current.

First, the controller 30 (image formation pre-preparation process portion 31*a*) causes the image forming portion to start an operation of a job when acquires information on the job from the operation portion 70 or the external device 200. In the information on this job, image information designated b an operator and information on the recording material S are included. Further, in this embodiment, the information on the recording material S includes a size (width, length) of the recording material S on the image is to be formed, information (thickness, basis weight and the like) relating to the thickness of the recording material S, information relating to a surface property of the recording material S such that whether or not the recording material S is coated paper, and the like information. Particularly, in this embodiment, the information on the recording material S includes information on the size of the recording material S and information on a kind (corresponding to category of paper kind) of the recording material S such as "thin paper, plain paper, thick paper, . . . " relating to the thickness of the recording material S. Incidentally, the kind of the recording material S includes attributes (so-called paper kind category) based on general characteristics such as plain paper, thick paper, thin paper, glossy paper, coated paper, and any distinguishable information on the recording material S, such as manufacturer, brand, product number, basis weight, thickness. The controller 30 (image formation pre-preparation process portion 31*a*) writes thick job information in the RAM 33 (S102).

Next, the controller 30 (image formation pre-preparation process portion 31*a*) acquires environment information detected by the temperature sensor 71 and the humidity sensor 72 (S103). In the ROM 32, information showing correction between the environment information and a target current Itarget for transferring the toner image from the intermediary transfer belt 44*b* onto the recording material S is stored. The controller 30 (secondary transfer voltage storage/operation portion 31*f*) acquires the target current Itarget corresponding to the environment from the information showing the correlation between the environment information and the target current Itarget, on the basis of the environment information read in S103. Then, the controller 30 (secondary transfer roller storing/operation portion 31*f*) writes this target current Itarget in the RAM 33 (or the secondary transfer voltage storage/operation portion 31*f*) (S104). Incidentally, why the target current Itarget is changed depending on the environment information is that the toner charge amount varies depending on the environment. The information showing the correction between the environment information and the target current Itarget has been acquired in advance by an experiment or the like.

Figure 4:
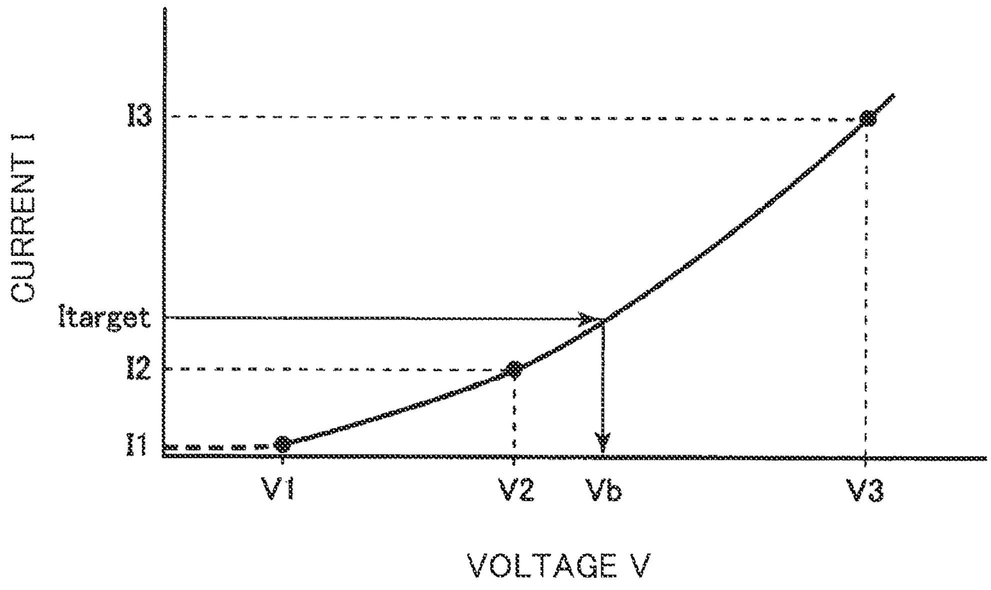
FIG. 4 is a graph showing a voltage-current characteristic acquired in the control of the secondary transfer voltage.

Next, the controller 30 (ATVC process portion 31*b*) acquires information on an electric resistance of the secondary transfer portion N by the ATVC (active transfer voltage control) before the toner image on the intermediary transfer belt 44*b* and the recording material S onto which the toner image is transferred reach the secondary transfer portion N (S105). That is, in a state in which the outer secondary transfer roller 45*a* and the intermediary transfer belt 44*b* are in contact with each other, predetermined voltages of a plurality of levels are applied (supplied) from the secondary transfer power source 76 to the inner secondary transfer roller 45*a*. Then, current values when the predetermined voltages are applied are detected by the current detection sensor 76*b*, so that a relationship between the voltage and the current (voltage-current characteristic) as shown in FIG. 4 is acquired. At this time, predetermined currents of a plurality of levels may be supplied from the secondary transfer power source 76 to the inner secondary transfer roller 45*a*. In that case, a voltage value when a predetermined current is supplied is detected by the voltage detection sensor 76*a*, so that a relationship between the voltage and the current (voltage-current characteristic) as shown in FIG. 4 is acquired. The controller 30 (ATVC process portion 31*b*) writes information on this relationship between the voltage and the current in the RAM 33 (or the secondary transfer voltage storage/operation portion 31*f*). This relationship between the voltage and the current changes depending on the electric resistance of the secondary transfer portion N. In the constitution of this embodiment, the relationship between the voltage and the current is not such that the current changes linearly relative to the voltage (i.e., is linearly proportional to the voltage), but is such that the current changes so as to be represented by a polynomial expression consisting of two or more terms of the voltage. For that reason, in this embodiment, in order that the relationship between the voltage and the current can be represented by the polynomial expression (quadratic expression in this embodiment), the number of predetermined voltages or currents supplied when the information on the electric resistance of the secondary transfer portion N is acquired was three or more (levels). Herein, the voltage-current characteristic (polynomial expression) acquired as described above is also referred to as an "IV curve".

Then, the controller 30 (secondary transfer voltage storage/operation portion 31*f*) acquires a voltage value to be applied during image formation (during the secondary transfer) from the secondary transfer power source 76 to the inner secondary transfer roller 45*a* (S106). The controller 30 (secondary transfer voltage storage/operation portion 31*f*) acquires, on the basis of the following information, a voltage value Vb necessary to cause the target current Itarget to flow in a state in which the recording material S is absent in the secondary transfer portion N. That is, on the basis of the target current Itarget written in the RAM 33 in S104 and the relationship between the voltage and the current acquired in S105, the controller 30 acquires the voltage value Vb. This voltage value Vb corresponds to a secondary transfer portion part voltage (transfer voltage corresponding to the electric resistance of the secondary transfer portion N. Further, in the ROM 32, information for acquiring a recording material part voltage (transfer voltage corresponding to the electric resistance of the recording material S) Vp as shown in FIG. 5. In this embodiment, this information is set as table data indicating a relationship between water content (absolute humidity) and the recording material part voltage Vp in an atmosphere for each of sections (corresponding to paper kind categories) of basis weights of recording materials S. Incidentally, the controller 30 (image formation pre-preparation process portion 31*a*) is capable of acquiring ambient water content on the basis of environment information (temperature, humidity) detected by the temperature sensor 71 and the humidity sensor 72. On the basis of the information on the job acquired in S101 and the environment information acquired in S103, the controller 30 (secondary transfer voltage storage/operation portion 31*f*) acquires the recording material part voltage Vp, corresponding to a kind and an environment of the recording material S, from the above-described table data. Further, in the case where the adjusted value is set by the operation in the adjusting mode, described later, for setting the set voltage of the secondary transfer voltage, an adjustment value ΔV depending on the adjusted value. As described later, this adjustment value ΔV is stored in the RAM 33 (or the secondary transfer voltage storage/operation portion 31*f*) in the case where the adjusted value is set by the operation in the adjusting mode. The controller 30 (secondary transfer voltage storage/operation portion 31*f*) acquires Vb+Vp+ΔV which is the sum of the above-described voltage values Vb, Vp and ΔV, as a secondary transfer voltage Vtr applied from the secondary transfer power source 76 to the inner secondary transfer roller 45*a* when the recording material S passes through the secondary transfer portion N. Then, the controller 30 (secondary transfer voltage storage/operation portion 31*f*) writs this Vtr (=Vb+Vp+ΔV) in the RAM 33 (or the secondary transfer voltage storage/operation portion 31*f*). Incidentally, the table data for acquiring the recording material part voltage Vp as shown in FIG. 5 are acquired in advance by the experiment or the like.

Here, the recording material part voltage Vp also changes depending on a surface property of the recording material S other than the information (thickness, basis weight or the like) relating to the thickness of the recording material S in some instances. For that reason, the table data may also be set so that the recording material part voltage Vp changes also depending on the information relating to the surface property of the recording material S. Further, in this embodiment, the information relating to the thickness of the recording material S (and in addition, the information relating to the surface property of the recording material S) are included in the job information acquired in S101. However, a measuring means or detecting the thickness of the recording material S and the surface property of the recording material S is provided in the image forming apparatus 1, and the recording material part voltage Vp may also be acquired on the basis of information acquired by this measuring means.

Next, the controller 30 (the image formation process portion 31*c*) executes the image formation and sends the recording material S to the secondary transfer portion N and executes the secondary transfer under application of the secondary transfer voltage Vtr determined as described above to the inner secondary transfer roller 45*a* (S107). Thereafter, the controller 30 (the image formation process portion 31*c*) repeats S107 until all the images in the job are transferred and completely outputted on the recording material S (S108).

Incidentally, also as regards the primary transfer portion 48, the ATVC similar to the above-descried ATVC is carried out in a period from a start of the job until the toner image is fed to the primary transfer portion 48, but detailed description will be omitted in this embodiment.

3. Energization Type of Secondary Transfer Voltage

The secondary transfer voltage is generally controlled on the premise that all the currents flow from the transfer roller to the opposite roller which are disposed opposite to each other through the intermediary transfer belt. However, in the case where low-resistance paper such as a recording material including a metal layer is used for the image formation, a phenomenon such that a current which should be originally flowed into the opposite roller flows through the recording material into the contact member, such as the conveying roller or the guiding member, contacting the recording material existing in a recording material conveying passage occurs. In the case where the current from the transfer belt flows into the member other than the opposite roller, a total impedance relating to the secondary transfer changes, and therefore, in the case where the secondary transfer voltage is subjected to the constant-voltage control, the current value largely fluctuates in some instances.

Here, in this embodiment, a reason why an energization type (inner energization type) in which the voltage is applied to the inner secondary transfer roller 75*a* and the output secondary transfer roller 75*b* is electrically grounded is employed will be described.

FIG. 20 is a schematic view showing a current path when the secondary transfer voltage is applied from the outer secondary transfer roller 45*b* side in the case where the low-resistance paper is used for forming the image (herein, also referred to as "during low-resistance paper passing"). In this case, as the low-resistance paper, the case where metallized paper including a metal layer on one side thereof is used and an image is formed on a surface on a metal layer side is described as an example. Incidentally, the "metallized paper" is a recording material which is prepared by providing the metal layer through vacuum vapor deposition on the surface of a base material formed with wood pulp paper (including used (waste) paper) and to which a metallic-tone decoration effect is imparted. In this case, the current flows from the outer secondary transfer roller 45*b* into, for example, the registration roller pair 11 through the metal layer surface. At this time, the current path to the toner layer is not formed, and therefore, transfer of the toner in the neighborhood of the secondary transfer portion N is not performed.

FIG. 21 is a schematic view showing a current path when the secondary transfer voltage is applied from the inner secondary transfer roller 45*a* side during low-resistance paper passing (passing of the metallized paper including the metal layer on one side). Also, in this case, similarly as in the case of FIG. 20, the current flows from the inner secondary transfer roller 45*a* through the metal layer surface of the recording material S to, for example, the registration roller pair 11. However, in the case where the secondary transfer voltage is applied from the inner secondary transfer roller 45*a* side, the current path to the toner layer is formed, and therefore, transfer of the toner to the recording material S is performed.

Incidentally, also, in the case where the image is formed on a base material side where the base material is formed with the paper of the recording material S including the metal layer, an electric resistance of the recording material S is low as a whole and there is a portion where the metal layer is exposed at an end surface or the like, and therefore, as regards the flowing-in of the current, tendency similar to the above-described tendency is shown. Further, the recording material S including the metal layer is subjected to coating with a material (for example, a resin material) other than metal on the metal layer surface in some instances, but in that case, as regards the flowing-in of the current, tendency similar to the above-described tendency is shown.

Further, the contact member which exists in the conveying path of the recording material S and which contacts the recording material S simultaneously with the secondary transfer portion N (the intermediary transfer belt 44*b*, the outer secondary transfer roller 45*b*) is not limited to the above-described registration roller pair 11 in the above-described example. As such a contact member, the following members can be cited. It is possible to cite a guiding member (such as the pre-transfer guiding member 12) for guiding the recording material S on a side upstream or downstream of the secondary transfer portion N with respect to the feeding direction of the recording material S, a discharging (charge-removing member, not shown) provided for removing excessive electric charges of the recording material S on the side downstream of the secondary transfer portion N, and a conveyance belt (not shown) for conveying the recording material S on the side downstream of the secondary transfer portion N. The contact status of the member contacting the recording material S changes in some instances due to various factors such as the feeding position of the recording material S and the rigidity of the recording material S.

Further, in the case where the secondary transfer voltage is applied through the constant-voltage control, the flowing current largely changes every change in portion to which the recording material S is contacted in some instances. For that reason, the transfer current flowing into the toner is not stabilized, and therefore, it is hard to maintain a good transfer property in some instances.

Next, the reason why a basic operation of the secondary transfer voltage is the constant-voltage control will be described.

As regards the current flowing through the secondary transfer portion N under application of the secondary transfer voltage to the inner secondary transfer roller 45*a*, a current flowing through non-sheet-passing portion where the recording material S does not pass and a sheet-passing portion where the recording material S passes exists. Further, depending on a size of the recording material S, a ratio between a current flowing through the non-sheet-passing portion and a current flowing through the sheet-passing-portion changes. Further, also, depending on an electric resistance value of the recording material S, a phenomenon that the ratio between the current flowing through the non-sheet-passing portion and the current flowing through the sheet-passing portion fluctuates occurs. For that reason, in the case where the basic operation of the secondary transfer voltage is the constant-current control, it is very hard to stabilize the current flowing through the recording material S. Therefore, in this embodiment, the current flowing through the recording material S is stabilized by making the basic operation of the secondary transfer voltage the constant-voltage control. Further, as specifically described later, in the case where the low-resistance paper is used in the image formation, the secondary transfer voltage is subjected to the constant-current control, so that even when the current flows into the contact member contacting the recording material S at a portion other than the secondary transfer portion N, a stable secondary transfer property is obtained.

4. Outline of Simple Adjusting Mode

Next, an operation in a simple adjusting mode (hereinafter simply referred to as an "adjusting mode") for setting the set voltage of the secondary transfer voltage will be described. Depending on the type and condition of the recording material S used in image formation, the kind water (moisture) content and electrical resistance value of the recording material S may differ greatly from the standard recording material S. In this case, optimal transfer may not be performed with the set voltage of the secondary transfer voltage using the default recording material part voltage Vp set in advance as described above.

First, the secondary transfer voltage needs to be a voltage necessary for transferring the toner from the intermediary transfer belt 44*b* to the recording material S. In addition, the secondary transfer voltage must be suppressed to a voltage level with which the abnormal discharge does not occur. However, depending on the type and state of the recording material S actually used for image formation, the electrical resistance may be higher than the value assumed as a standard value. In such a case, the voltage required to transfer the toner from the intermediary transfer belt 44*b* to the recording material S may be insufficient with the set secondary transfer voltage using the preset default recording material part voltage Vp. Therefore, in this case, it is desired to increase the set voltage of the secondary transfer voltage by increasing the recording material part voltage Vp.

On the contrary, depending on the type and condition of the recording material S actually used for image formation, the water (moisture) content of the recording material S is increased, with the result that the electrical resistance is lower than the value assumed as a standard value. In this case, with the setting voltage of the secondary transfer voltage using the preset default recording material part voltage Vp, the voltage becomes excessive, so that image defects may occur due to the abnormal discharge. Therefore, in this case, it is desirable to lower the set voltage of the secondary transfer voltage by reducing the recording material part voltage Vp.

For that reason, it is desired that the operator such as a user or a service person can adjust (change) the recording material part voltage Vp depending on the recording material S actually used for image formation, for example, to optimize the setting voltage of the secondary transfer voltage during the execution of the job. In other words, it is only required that an optimum recording material part voltage Vp+ΔV (adjusting amount) depending on the recording material S actually used for image formation is selected. This adjustment would also be considered to be performed by the following method. For example, the operator outputs the images while switching the secondary transfer voltage for each recording material S, and confirms the presence or absence of an image defect occurring in the output image to obtain an optimal secondary transfer voltage, on the basis of which setting voltage (specifically the recording material part voltage Vp+ΔV) of the optimum secondary transfer voltage is determined. However, in this method, since the outputting operation of the image and the adjustment of the setting voltage of the secondary transfer voltage are repeated, the recording material S which is wasted increases, and it takes time in some instances.

In this embodiment, the image forming apparatus 1 is constituted so as to be operable in the adjusting mode in which the setting voltage of the secondary transfer voltage is adjusted. In this operation in the adjusting mode, a chart (adjusting chart) on which a plurality of representative color patches (test image, test patterns, test toner images) are formed is outputted on the recording material S which is actually used for image formation. When the chart is outputted, the setting voltage of the secondary transfer voltage is switched for each patch. And, the optimal setting voltage (more specifically, the recording material part voltage Vp+ΔV of the secondary transfer voltage) is determined by the controller 30 on the basis of a result of reading of the outputted chart by the image reading portion 80. Particularly, in this embodiment, on the basis of brightness information (density information) of a solid patch (solid image patch) on the chart, information on a recommended adjusting amount ΔV of a setting voltage of a secondary transfer voltage for optimizing a solid image density is presented by the controller 30. As a result, necessity that the operator confirms the presence or absence of the image defect by eye observation is reduced, so that it becomes possible to more appropriately adjust setting of the secondary transfer voltage while alleviating an operational load on the operator.

5. Chart

In this embodiment, in the operation in the adjusting mode, on the basis of the brightness information of the patch acquired by reading an outputted chart by the image reading portion 80, the image information (recommended adjusting value described later) on a recommended adjusting amount of the setting voltage of the secondary transfer voltage is presented by the controller 30. Further, in this embodiment, the operator visually recognizes the outputted chart in the operation in the adjusting mode, so that it is also possible to change the adjusting amount presented as described above.

When confirmation of the outputted chart through eye observation by the operator is also taken into consideration, the larger the patch size of the chart that is outputted in the adjusting mode, the more advantageous is since then it is easier to check for image defects. However, if the patch is large, the number of patches which can be formed on one recording material S is reduced. The patch shape can be square and so on. The color of the patch can be determined by the image defect to be checked and by the easiness of checking. For example, when the secondary transfer voltage is increased from a low value, the lower limit of the secondary transfer voltage can be determined from the voltage value at which the secondary color patches such as red, green, and blue can be properly transferred. In addition, for example, in the case where the operator confirms the outputted chart by eye observation, when the secondary transfer voltage is further increased, the upper limit value of the secondary transfer voltage can be determined from the voltage value at which image failure (defect) occurs due to the high secondary transfer voltage in the halftone patch.

Figure 6:
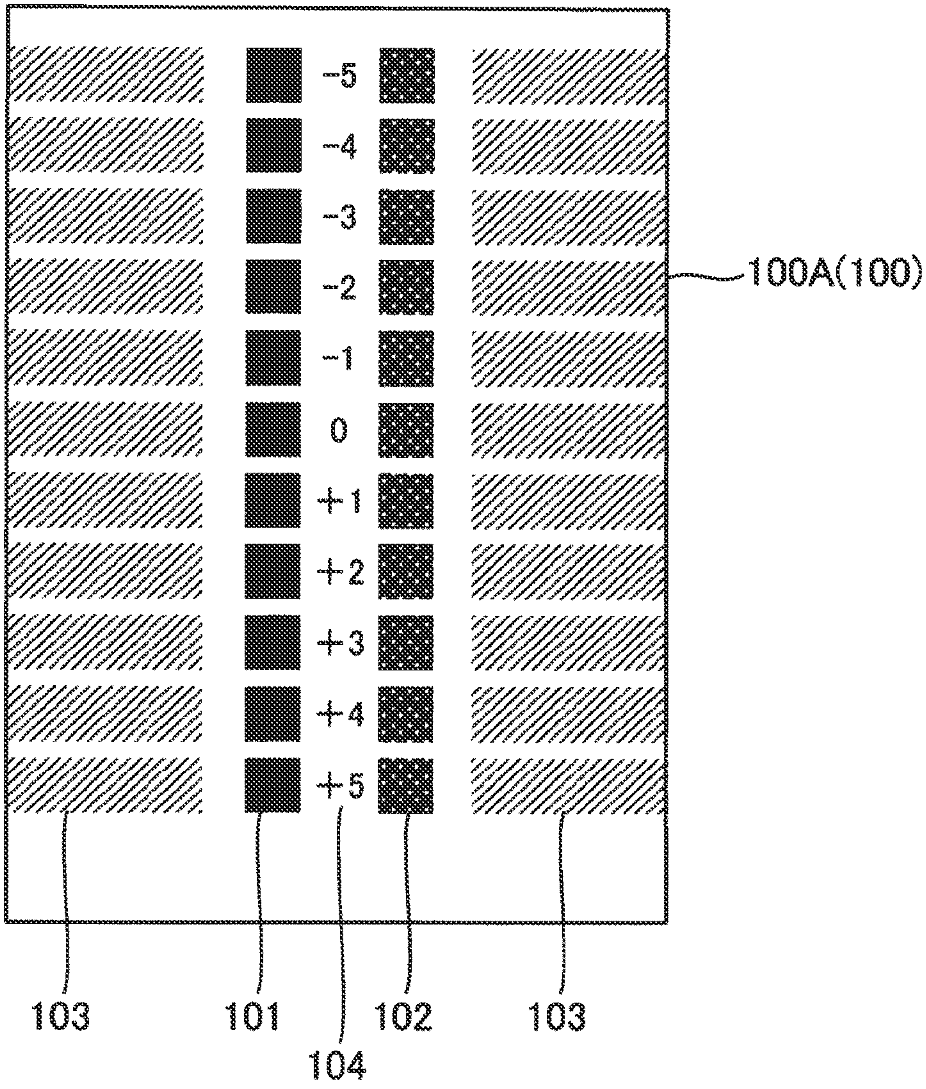
FIG. 6 is a schematic view of chart image data outputted in an operation in an adjusting mode.

A chart usable with the adjusting mode in this embodiment will be described. In the adjusting mode in this embodiment, two types of image data 100A and 100B shown in FIG. 6 and parts (a) and (b) of FIG. 7 are used for output of a chart 100. FIG. 6 shows chart image data (hereinafter also referred to as "large chart data") 100A outputted to the recording material S having a length in the process progression direction of 420 to 487 mm. FIG. 7 shows chart image data (hereinafter also referred to as "small chart data") 100B outputted to the recording material S having a length in the process progression direction of 210 to 419 mm. In this embodiment, as the chart image data, only two types of image data shown in FIGS. 6 and 7 are set. And, in the adjusting mode, the chart corresponding to the image data cut out from any one of the two types of image data shown in FIGS. 6 and 7 depending on the size of the recording material S to be used is outputted on the recording material S. At this time, in this embodiment, image data having a size obtained by subtracting the margins at the end of the recording material S from the image data shown in FIGS. 6 and 7 is cut out.

Here, in this embodiment, the maximum size (maximum sheet passing size) of the recording material S on which the image forming apparatus 1 can form an image is 13 inches×19.2 inches (longitudinal feed). Further, herein, the feeding direction (or surface movement direction of the intermediary transfer belt 44*b*) is also referred to as the "process progression direction". Further, herein, a direction substantially perpendicular to the process progression direction is also referred to a "longitudinal direction". The "longitudinal direction" corresponds to a main scan direction of the exposure device 42 (substantially parallel to a rotational axis direction of the photosensitive drum 51), and the process progression direction corresponds to a sub-scan direction of the exposure device 42 (substantially parallel to the surface movement direction of the photosensitive drum 51).

The large chart data 100A shown in FIG. 6 will be further described. The large chart data 100A corresponds to the maximum sheet passing size of the image forming apparatus 1 of this embodiment, and the image size is approx. (longitudinal direction) 13 inches (≈330 mm) at the short side)×(process progression direction) 19.2 inches (≈487 mm) at the long side. When the size of the recording material S is 13 inches×19.2 inches (vertical feed) or less and more than A3 size (vertical feed), the part to which this large chart data 100A is cut according to the size of the recording material S is outputted. At this time, in this embodiment, the image data is cut out from the large chart data 100A in accordance with the size of the recording material S based on the leading end center. For example, in the case where of the chart 100 is outputted to the recording material S of A3 size (vertical feed) (short side 297 mm×long side 420 mm), the image data having a size of 292 mm (short side)×415 mm long side is cut out from the large chart data 100A. And, the image corresponding to the cut-out image data is outputted on an A3 size recording material S with a margin of 2.5 mm at each end portion with the leading end center being the reference position.

The large chart data 100A includes one blue solid patch 101, one black solid patch 102, and two halftone patches 103 (gray (black halftone) in this embodiment) arrange in the longitudinal direction. And, eleven sets of patches 101 to 103 in the longitudinal direction are arranged in the process progression direction. The blue solid patch 101 and the black solid patch 102 are each 25.7 mm×25.7 mm square (one side is substantially parallel to the longitudinal direction). In addition, each of the halftone patches 103 at both ends has a width of 25.7 mm in the process progression direction, and extends to the end of the large chart data 100A in the longitudinal direction. In addition, the interval between the patch sets 101 to 103 in the process progression direction is 9.5 mm. The secondary transfer voltage is switched at the timing when the portion on the chart corresponding to this interval passes through the secondary transfer portion N. The 11 patch sets 101-103 in the process progression direction of the large chart data 100A are within the range of 387 mm in the process progression direction such that when the size of the recording material S is A3, they are within the length 415 mm of the recording material S in the process progression direction. In addition, in this example, the large chart data 100A includes identification information 104 for identifying the setting of the secondary transfer voltage applied to each patch set in conjunction with each of 11 patch sets 101 to 103 in the process progression direction. In this embodiment, this identification information (patch number) 104 corresponds to an adjusted (adjustment) value described later. In this embodiment, eleven pieces of identification information 104 (−5 to 0 to +5 in this embodiment) corresponding to eleven steps of secondary transfer voltage settings are provided.

When the eye observation by the operator is also taken into consideration, the size of the patch is required to be large enough to permit the operator to easily determine whether there is an image defect or not. For the transferability of blue solid patch 101 and black solid patch 102, if the size of the patch is small, it can be difficult to discriminate the defect, and therefore, the size of the patch is preferably 10 mm square or more, and is 25 mm square or more it is further preferable. The image defects due to abnormal discharge which occur when the secondary transfer voltage is increased in the halftone patch 103 are often in the form of white spots. This image defect tends to be easy to discriminate even in a small size image, compared to the transferability of the solid image. However, it is easier to observe if the image is not too small, and therefore, in this embodiment, the width of the halftone patch 103 in the process progression direction is the same as the width of the blue solid patch 101 and the black solid patch 102 in the process progression direction. In addition, the interval between the patch sets 101 to 103 in the process progression direction may be set so that the secondary transfer voltage can be switched.

Here, it is preferable to prevent patches from being formed in the neighborhood of the leading and trailing ends of the recording material S in the process progression direction (for example, in the range of about 20 to 30 mm inward from the edge). This is because there is a case that an image defect occurs only at the leading end or the trailing end and because it may be difficult to determine whether or not an image defect due to setting of the secondary transfer voltage has occurred.

Incidentally, the solid image is an image with a maximum density level. In addition, in this embodiment, the half-tone image corresponds to an image with a toner application amount of 10% to 80% when the toner application amount of the solid image is 100%. Using the large chart data 100A described above, as the size of the recording material S becomes smaller than 13 inches (A3 size or more), the length, in the longitudinal direction, of the halftone patch 103 at both ends in the longitudinal direction becomes smaller. In addition, using the large chart data 100A as described above, as the size of the recording material S becomes smaller than 13 inches (however, A3 size or more), the margin at the trailing end in the process progression direction becomes smaller.

The small chart data 100B shown in FIG. 7 will be further described. The small chart data 100B corresponds to a size smaller than the A3 size, and the image size is approximately long side (longitudinal direction) 13 inches (≈330 mm)× short side (process progression direction) 210 mm. If the size of the recording material S is A5 (short side 148 mm×long side 210 mm) (longitudinal feed) or more and smaller than A3 size (longitudinal feed), a chart corresponding to the image data cut out of the small chart data 100B depending on the size of the recording material S is outputted. At this time, in this embodiment, the image data is cut out of the small chart data 100B in accordance with the size of the recording material S on the basis of the leading end center. When the small chart data 100B is used, two charts are outputted in order to increase the number of patches (parts (a) and (b) of FIG. 7).

The small chart data 100B has the same patches as those of the large chart data 100A. And, in the small chart data, five sets of patches 101 to 103 in the longitudinal direction are arranged in the process progression direction. The five patch sets 101 to 103 in the process progression direction of the small chart data 100B are arranged in a range of 167 mm in length in the process progression direction. In addition, in this example, the small chart data 100B is provided with identification information 104 for identifying the setting of the secondary transfer voltage applied to each set of patch sets, in association with the respective ones of the five patch sets 101 to 103 in the process progression direction. And, on the first sheet, based on the small chart data 100B shown in part (a) of FIG. 7, five pieces of identification information 104 (−4 to 0 in this embodiment) corresponding to the setting of the lower secondary transfer voltage in five steps are arranged. In addition, on the second sheet, based on the small chart data 100B shown in part (b) of FIG. 7, five (1 to 5 in this embodiment) identification information 104 corresponding to higher five-level secondary transfer voltage settings are arranged.

Using the above small chart data 100B, as the size of the recording material S becomes smaller (however, smaller than the A3 size and larger than the A4 size), the length, in the longitudinal direction, of the halftone patch 103 at both ends in the longitudinal direction becomes smaller. In addition, using the small chart data 100B as described above, as the size of the recording material S becomes smaller (however, smaller than the A3 size and larger than the A5 size), the margin at the trailing end in the process progression direction becomes smaller.

Here, in this embodiment, not only a standard size but also an arbitrary size (A5 size or more, 13 inches×19.2 inches or less) recording material S is usable by an operator inputting and designating on the operation portion 70 or the external device 200.

6. Operation in Adjusting Mode

Next, the operation in the adjusting mode will be described. FIG. 8 is a flowchart showing an outline of the process of the adjusting mode in this embodiment. In addition, part (a) of FIG. 9 is a schematic view showing an example of an adjusting mode setting screen. Part (b) of FIG. 9 is a schematic view showing an example of a setting screen of the recording material S. Here, a case where the operator causes the image forming apparatus 1 to execute the adjusting mode operation using the operation portion 70 of the image forming apparatus 1 will be described as an example.

First, the operator selects the type and size of the recording material S using with the adjusting mode (S1). At this time, the controller 30 (adjustment process portion 31*d*) causes the operation portion 70 to display a recording material S setting screen 110 for setting the type, size and the like of the recording material S as shown in part (b) of FIG. 9. The controller 30 (adjustment process portion 31*d*) acquires information on the type and size of the recording material S designated by using the recording material S setting screen in the operation portion 70. For example, as shown in part (b) of FIG. 9, the recording material S setting screen 110 includes an accommodating portion display portion 111 for displaying a recording material accommodating portion, a kind setting portion 112 for setting the kind (corresponding to the paper kind category) of the recording material S, a size setting portion 113 for setting the size of the recording material S, and the like. Further, the recording material S setting screen 110 includes a recording material selecting portion 114 for selecting a corresponding recording material S as the recording material S used for the image formation, an adjusting mode selecting portion 115 for entering the adjusting mode relating to the corresponding recording material S. Further, the recording material S setting screen 110 includes a confirmation portion (OK button) 116 for confirming the setting, a canceling portion (cancel button) 117 for canceling a change in setting. The operator is capable of making setting in the controller 30 by inputting (including selection from a plurality of choices) the kind and the size of the recording material S in the kind setting portion 112 and the size setting portion 113 for each of the recording material accommodating portions (cassette 114 and the like). The controller 30 causes the RAM 33 (or the image formation process portion 31*c*) or the like to store information such as the kind or the size of the recording material S for each of selected recording material accommodating portions. Further, the operator operates the recording material selecting portion 114 and thus is capable of setting, in the controller 30, the recording material S used for the image formation (specifically, information on the kind and the size of the recording material S). Further, the operates the adjusting mode selecting portion 115 and thus is capable of providing an instruction to the controller 30 so as to call up the adjusting mode setting screen descried later in order to execute the operation in the adjusting mode relating to the corresponding recording material S. Further, the operator operates the OK button 116 and thus is capable of confirming the change or the selection made in the kind setting portion 112, the size setting portion 113, the recording material selecting portion 114, and the like. Further, the operator operates the cancel button 117 and thus is capable of canceling the change or the selection made in the kind setting portion 112, the size setting portion 113, the recording material selecting portion 114, and the like.

Next, the operator sets the central voltage value of the secondary transfer voltage applied at the time of chart output, and whether to output the chart to one side or both sides of the recording material S (S2). Incidentally, in this embodiment, in order to be able to adjust the secondary transfer voltage during secondary transfer to the front side (first side) and back side (second side) in double-sided printing (double-sided printing), the chart can be outputted on both sides of the recording material S also in the adjusting mode. In order to make the above-described setting, the controller 30 (adjustment process portion 31*d*) causes the operation portion 70 to display an adjusting mode setting screen 90 as shown in part (a) of FIG. 9. The setting screen 90 has a voltage setting portion 91 for setting the center voltage value of the secondary transfer voltage for the front and back sides of the recording material S. In addition, the setting screen 90 has an output side selection portion 92 for selecting whether to output the chart to one side or both sides of the recording material S. Furthermore, the setting screen 90 includes an output instruction portion (test page output button) 93 for instructing chart output, a confirmation portion 94 (OK button 94*a* or the apply button 94*b*) for confirming the setting, and a cancel button 95 for canceling the setting change. When adjustment value 0 is selected in voltage setting portion 91, a preset voltage (more specifically, the recording material part voltage Vp) set in advance for the currently selected recording material S is selected. And, when an adjusting value 0 is selected, using the above-described setting voltage corresponding to the adjusting value 0 as a center voltage, 11 sets of patches from −5 to 0 to +5 in terms of the adjusting value when the large chart data 100A is used are switched and outputted as the secondary transfer voltages. Further, 10 sets of patches from −4 to 0 to +5 when the small chart data 100B is used are switched and outputted as the secondary transfer voltage. In this embodiment, description will be made on assumption that the large chart data 100A is used and the chart including the 11 sets of patches is outputted. In this embodiment, the difference in secondary transfer voltage for one level of the adjusting value is 150 V. The controller 30 (adjustment process portion 31*d*) acquires information relating to the setting such as the center voltage value set by way of the setting screen 90 in the operation portion 70.

Next, when the output instruction portion 93 on the setting screen 90 is operated by the operator, the controller 30 (adjustment process portion 31*d*) acquires information on the electric resistance of the secondary transfer portion N when the recording material S is absent in the secondary transfer portion N (S3). In this embodiment, the controller 30 (adjustment process portion 31*d*) acquires a polynomial expression (quadratic expression in this embodiment) of two or more terms (terms of the second degree or more) with respect to a voltage-current relationship (IV curve) depending on the electric resistance of the secondary transfer portion N in the absence of the recording material S in the secondary transfer portion N by an operation similar to the operation in the above-described ATVC. The controller 30 (adjustment process portion 31*d*) writes information on this voltage-current relationship in the RAM 33 (or adjustment process portion 31*d*).

Then, the controller 30 (adjustment process portion 31*d*) controls the image forming apparatus so as to output the chart (S4). At this time, the controller 30 (adjustment process portion 31*d*) cuts out the chart data as described above on the basis of the size information of the recording material S acquired in S1 and controls the image forming apparatus so as to output the chart on which the 11 sets of patches are transferred while changing the secondary transfer voltage every 150 V. For example, the adjusting value 0 is selected and it is assumed that the recording material per voltage in the present environment is 900 V, and the secondary transfer portion part voltage Vb acquired from the result of the ATVC is 1000 V. In this case, from 1150 V to 2650 V, the chart on which the 11 sets of patches are transferred while changing the secondary transfer voltage every 150 V.

Next, the controller 30 (adjustment process portion 31*d*) discriminates whether or not the recording material S is the low-resistance paper (S5). In this embodiment, the controller 30 (adjusting process portion 31*d*) causes the current detection sensor 76*b* to detect a value of a current flowing under voltage application of each of the voltage levels when the chart is outputted. By this, the controller 30 (adjustment process portion 31*d*) acquires information on the electric resistances of the secondary transfer portion N and the recording material S when the recording material S is present in the secondary transfer portion N. In other words, the controller 30 (adjustment process portion 31*d*) acquires the polynomial expression (quadratic expression in this embodiment) of two or more terms with respect to the voltage-current relationship (IV curve) depending on low electric resistances of the secondary transfer portion N and the recording material S when the recording material S is present in the secondary transfer portion N. The controller 30 (adjustment process portion 31*d*) writes the information on the voltage-current relationship in the RAM 33 (or adjustment process portion 31*d*).

Further, the controller 30 (adjustment process portion 31*d*) acquires the value of the current corresponding to the voltage of each of the voltage levels during output of the chart in the IV curve acquired in S3 when the recording material S is absent in the secondary transfer portion N. Then, the controller 30 (adjustment process portion 31*d*) discriminates whether or not of current values detected at the patch portions under the voltage application of the voltage levels when the chart is outputted, one or more (at least one) current value which is 1.2 times or more a current value corresponding to the same voltage acquired from the IV curve acquired when the recording material S is absent in the secondary transfer portion N exists. That is, the controller 30 (adjustment process portion 31*d*) discriminates whether or not the value of the current flowing at the same voltage value becomes higher when the recording material S is absent than during the transfer of the patch by a certain level. Incidentally, for simplification, the above-described discrimination is referred to as "discrimination as the whether or not the recording material S is the low-resistance paper" or the like in some instances. Further, in the case where the controller 30 (adjustment process portion 31*d*) discriminated in S5 that the recording material S is the low-resistance paper ("Yes"), the process goes to process of S14' described later. On the other hand, in the case where the controller 30 (adjustment process portion 31*d*) discriminated in S5 that the recording material S is not the low-resistance paper ("No"), the process goes to process of S6.

Discrimination in S5 will be further described. FIG. 17 shows the following IV curves. First, the IV curve acquired when the recording material S is absent in the secondary transfer portion N (herein, also referred to as "during ATVC" is shown. Further, the IV curve acquired when normal paper (typically plain paper) is passed through the secondary transfer portion N is shown. Further, the IV curve in the case where the flowing of the current into the contact member contacting the recording material S at a portion other than the secondary transfer portion N when the low-resistance paper (typically, the recording material S including the metal layer) is passed through the secondary transfer portion N is shown.

In the case where the IV curve acquired during ATVC and the IV curve acquired during passing of the normal paper are compared with each other, a voltage Vp corresponding to an electric resistance of the paper is added, and therefore, a voltage value necessary to cause a target current Itarget to flow is increased during ATVC than during passing of the normal paper. On the other hand, during passing of the normal paper such that the flowing of the current into the contact member occurs, as described above, total impedance relating to the secondary transfer becomes relatively low. By this, the voltage value necessary to cause the same target current Itarget to flow becomes low. That is, under application of the same voltage, in the case where the current value lower than the current value acquired from the IV curve acquired during ATVC is detected, discrimination that the recording material S is the normal paper can be made. On the other hand, under application of the same voltage, in the case where the current value higher than the current value acquired from the IV curve acquired during ATVC is detected, discrimination that the recording material S is the low-resistance paper can be made.

In this embodiment, the recording material S is discriminated as the low-resistance paper in the case where the current value which is 1.2 times the current value acquired from the IV curve acquired during ATVC is detected, but the present invention is not limited thereto. The multiple is not limited to 1.2, but for example, an arbitrary multiple of 1.0 time or more can be appropriately used. As described above, as it is desired that the secondary transfer voltage is subjected to the constant-current control, whether or not the recording material S is the low-resistance paper capable of causing the flowing of the current into the contact member may only be required to be capable of being discriminated with sufficient accuracy.

Further, in the case where the current value of not less than a predetermined value set in advance is detected, the recording material S may be discriminated as the low-resistance paper. Further, in this embodiment, the case where the current value not less than a predetermined times the current value when the recording material S is absent (or in the case where the current value not less than the above-described predetermined value) is detected at one or more patch is employed, but the case where the current value is detected at a predetermined single or a plurality of predetermined patch sections (adjusting values, patch numbers) designated in advance may be employed. Similarly as described above, as described later, as it is desired that whether or not the recording material S is the low-resistance paper capable of causing the flowing of the current into the contact member may only be required to be capable of being discriminated with sufficient accuracy.

Next, processes of S6 and subsequent steps in the case where the recording material S is discriminated in S5 as being not the low-resistance paper ("No") will be described. Incidentally, processes of S14' and subsequent steps in the case where the recording material S is discriminated in S5 as being the low-resistance paper ("Yes") will be described later.

As described above, from a detection result of the currents for the voltages of 11 levels, the controller 30 (adjustment process portion 31*d*) acquires the polynomial expression of two or more terms (quadratic expression in this embodiment) with respect to the voltage-current relationship (IV curves) depending on the electric resistances of the secondary transfer portion N and the recording material S (S5). The controller 30 (adjustment process portion 31*d*) writes information on this voltage-current relationship in the RAM 33 (or the adjustment process portion 31*d*). Incidentally, the current when the recording material S is present in the secondary transfer portion N may typically be detected during transfer of the patch (at the patch portion), but may also be detected at a portion of the recording material S where there is no toner before and after the patch for each voltage level.

Then, the controller 30 (adjustment process portion 31*d*) acquires the recording material part voltage Vp(n) at each of the voltage levels from the following relationships (S6). That is, the controller acquires the recording material part voltage Vp(n) from the relationship (quadratic expression) between the voltage and the current, when the recording material S is present in the secondary transfer portion N, acquired in S5 and from the relationship (quadratic expression) between the voltage and the current, when the recording material S is absent in the secondary transfer portion N, acquired in S3. Here, n represents each of the voltage levels, and in this embodiment, n ranges from 1 to 11 corresponding to the 11 levels (11 sets of patches). Further, the voltage value of each voltage level is represented by Vtr(n). Further, the voltage value calculated by applying each level to the relationship (quadratic expression) between the voltage and the current, when the recording material S is absent in the secondary transfer portion N, acquired in S3 is represented by Vb(n). At this time, recording material part voltage Vp(n) at each voltage level is represented by the following equation: $Vp(n)=Vtr(n)-Vb(n)$.

Then, the outputted chart is supplied to the image reading portion 80 by using the automatic original feeding device 81, for example, so that the chart is read by the image reading portion 80 (S7). At this time, the image reading portion 80 is controlled by the controller 30 (adjustment process portion 31*d*), and in this embodiment, RGB brightness data (8 bit) of each of the solid blue patches on the chart are acquired. Incidentally, when the chart is outputted, the controller 30 (adjustment process portion 31*d*) is capable of causing the operation portion 70 to display a message prompting the operator to supply the outputted chart to the image reading portion 80. Next, the controller 30 (adjustment process portion 31*d*) acquires an average of values of the brightness (average brightness value) of the respective solid blue patches by using the brightness data (density data) acquired in S7 (S8). By this process of S8, as an example, the average brightness values of the solid blue patches corresponding to the respective voltage levels as shown in FIG. 10 are acquired. In FIG. 10, the abscissa represents the adjusting values (−5 to 0 and 0 to +5) showing the respective voltage levels, and the ordinate represents the average of the values of the brightness of the solid blue patches. Incidentally, as regards the solid blue patches, brightness data of B are used.

Subsequent to the average brightness value of the solid blue patch 101, the controller 30 (adjustment process portion 31*d*) calculates a brightness dispersion value of a solid black patch 102 (S9). FIG. 11 is a schematic view showing a brightness data acquiring method for calculating the brightness dispersion value. In an image region of each of the solid black patches 102, a reading region K is set. In this embodiment, a size of the reading region was set at 10 mm×10 mm at a center of the patch. In order to calculate the brightness dispersion value, an inside of the reading region is divided into N regions from K(1) to K(N), and brightness data at corresponding portions of the chart read in S7 are stored as B1 to B(N) in the RAM 33. A size of each of the divided regions K(1) to K(N) may be a minimum unit of resolution readable by the image reading portion 80, and may be about 300 dpi to 1200 dpi, for example. Further, in this embodiment, as regards the solid black patches, brightness data of G was used. A formula for calculating the brightness dispersion value of the solid black patches is shown below.

D(n): brightness dispersion value

Kave: average brightness value of solid patches $$D(n)=1/N\times\Sigma\{B(m)-\mathrm{Kave}\}^2$$

$$\mathrm{Kave}=1/N\times\Sigma\{B(m)\}$$

Next, the controller 30 (adjustment process portion 31*d*) calculates an adjusting value Na at which the average brightness value of the solid blue patches acquired in S8 becomes minimum (S10). In the case of a relationship between the adjusting value and the average brightness value of the solid blue patches in FIG. 10, the brightness becomes smaller with an increasing adjusting value from −5 to +2. In this range of the adjusting value, an electric field necessary to transfer the solid blue patch is insufficient, so that a transfer property of the solid blue patch is improved with an increasing adjusting value. Further, the average brightness values at the adjusting value of +3 to +4 which are further increased are minimum. When the secondary transfer voltage is large move than necessary, a risk of the image defect due to a discharge phenomenon such as "penetration" described later increases, and therefore, in this embodiment, of the adjusting values of +3 to +4, a smaller adjusting value of +3 is selected as the adjusting value Na at which the average brightness value becomes minimum.

Then, the controller 30 (adjustment process (portion 31*d*) discriminates whether or not the "penetration" occurs at the adjusting value selected in S10 (S11). A method for discriminating occurrence or non-occurrence of the "penetration" will be described using FIGS. 12 and 13. FIG. 12 is a graph showing a relationship between an occurrence status of the "penetration" and the brightness dispersion value of the solid black patch when the image is outputted using the image forming apparatus 1 of this embodiment while changing the secondary transfer voltage. The brightness dispersion value of the solid black patch was calculated by the above-described method in S9. Recording materials (1) to (6) are plain paper or recycled paper which are available in the market and which has a basis weight of about 80 gsm. The "penetration rank" of the abscissa represents numerical values by which the occurrence status of the "penetration" is expressed at 5 levels through eye observation, in which the occurrence status of the "penetration" becomes worse with a decreasing numerical value and the worst occurrence status of the "penetration" is represented by rank 1. From FIG. 12, it is understood that although an absolute value of the brightness dispersion value is different depending on the paper kind, the brightness dispersion value increases as the occurrence status of the "penetration" becomes worse. By utilizing this characteristic, as a threshold, an inclination of a rectilinear line L showing a relationship between the adjusting value and the brightness dispersion value of the solid black patch is calculated. Information on this threshold is stored in advance in the ROM 32. Further, the controller 30 (adjustment process portion 31*d*) discriminates that the "penetration" occurs when the inclination of the relationship between the adjusting value calculated on the basis of the reading result of the chart and the brightness dispersion value of the solid black patch. Incidentally, in this embodiment, on the basis of the data of FIG. 12, the inclination of the rectilinear line L, which is 1 is used as the threshold.

Using FIG. 13, the discrimination of the occurrence or non-occurrence of the "penetration" in S11 will be further described. The inclination of the relationship between the adjusting value based on the reading result of the chart and the brightness dispersion value of the solid black patch is calculated in the neighborhood of the adjusting value Na at which the average brightness value of the solid black patches becomes minimum. Specifically, in this embodiment, the following adjusting values are used. First, an "adjusting value (Na) at which the average brightness value of the solid black patches calculated in S10 becomes minimum is used. Further, an "adjusting value (Na-1) smaller by 1 than the adjusting value (Na) calculated in S10" is used. Further, an "adjusting value (Na+1) larger by 1 than the adjusting value (Na) calculated in S10". The controller 30 (adjustment process portion 31*d*) calculates an inclination of an approximate rectilinear line 1 showing a relationship between the adjusting value and the brightness dispersion value of the solid black patch in the above-described adjusting value range by the least-squares method. Then, when the inclination of this approximate rectilinear line 1 is larger than the inclination of the above-described rectilinear line L as the threshold, the controller 30 discriminates that the "penetration" occurs. In the case of FIG. 13, the inclination of the rectilinear line 1 is 2.25 which is larger than the inclination of 1 for the rectilinear line L as the threshold, and therefore, discrimination that the "penetration" occurs is made. Incidentally, in this embodiment, the occurrence or non-occurrence of the "penetration" is discriminated by the inclination of the brightness dispersion relative to the adjusting value, and therefore, specifically, "worsening of the penetration rank by −1 for the adjusting value of +1" is set at the threshold of "penetration occurrence".

Next, in the case where the controller 30 (adjustment process portion 31*d*) discriminated in S11 that the "penetration" occurs ("Yes"), the controller makes correction of the adjusting value (S12). FIG. 14 is a graph showing a relationship between a recording material part voltage of the secondary transfer voltage and the occurrence or non-occurrence of the "penetration" in the case where the image formed on the recording material S by the image forming apparatus 1 in an NL environment (temperature: 23° C., relative humidity: 5% RH) was checked. As shown in FIG. 14, it turns out that as the thickness of the recording material S becomes thick, the absolute value of the recording material part voltage at which the "penetration" occurs becomes larger. According to study by the present inventor, the recording material part voltage at which the "white void" is liable to occur well coincides with an electric discharge start voltage acquired from the Paschen curve in the case where the thickness of the recording material S is regarded as air (gap). That is, the relationships shown in FIG. 14 coincides with cause of occurrence of the "penetration" such that the recording material S is discharged during the secondary transfer and the toner at the discharged portion is reversed in charge polarity and thus is not transferred onto the recording material S. Therefore, in this embodiment, by utilizing the above-described correlation, an upper limit of the recording material part voltage is provided depending on the information on the thickness of the recording material S. As a result, it becomes possible to select the adjusting value of the setting voltage of the secondary transfer voltage within a range in which the occurrence of the "penetration" can be suppressed.

Specifically, in this embodiment, the controller 30 (adjustment process portion 31*d*) extracts, from the recording material part voltage Vp(n) acquired in S6, a value which does not exceed the upper limit set depending on the information on the thickness of the recording material S. In this embodiment, every kind (corresponding to paper category) of the recording material S such as "thin paper, plain paper, thick paper 1, thick paper 2, . . . ", a relationship between the information (basis weight in this embodiment) on the thickness of the recording material S in the market and the upper limit of the recording material part voltage Vp(n) is acquired in advance. The relationship between the kind of the recording material S and the recording material part voltage Vp(n) is stored, as the table data as shown in FIG. 15, in the ROM 32. The controller 30 (adjustment process portion 31*d*) makes reference to the table data of FIG. 15 and acquires the upper limit of the recording material part voltage Vp(n) corresponding to the kind of the recording material S acquired in S1. An image of correction of the adjusting value in the case where discrimination that the "penetration" occurs ("Yes") is made in S11 is shown in FIG. 16. In the case of FIG. 16, the adjusting value Na calculated on the assumption that the average brightness value of the solid blue patches is a minimum value is +3, but a range of the adjusting value at which the recording material part voltage Vp(n) is the upper-limit voltage or less is +2 or less. In this case, the controller 30 (adjustment process portion 31*d*) employs the adjusting value of +2 at which the average brightness value of the solid blue patches is smallest in the range of +2 or less, as a finally recommended adjusting value which is an adjusting value Na' after correction of the adjusting value Na. Incidentally, in the case where discrimination that the "penetration" does not occur ("No") is made in S11, the controller 30 (adjustment process portion 31*d*) employs the adjusting value Na calculated in S10 as the recommended adjusting value as it is.

Next, the controller 30 (adjustment process portion 31*d*) controls the operation portion 70 so as to display the adjusting value Na or Na' calculated as described above at the setting screen 90 (voltage setting portion 91) as shown in FIG. 9 (S13). The operator is capable of discriminating whether or not the displayed adjusting value is appropriate, on the basis of the display contents of the setting screen 90 and the outputted chart (S14). The operator operates a finalizing portion 94 (OK button 94*a*, application button 94*b*) of the setting screen 90 as it is in the case where the displayed adjusting value is not changed. On the other hand, the operator inputs the changed adjusting value to the voltage setting portion 91 of the setting screen 90 in the case where the operator desires that the adjusting value is changed from the displayed adjusting value, and then operates the finalizing portion 94 (OK button 94*a* or application button 94*b*). In the case where the adjusting value is changed in S14, the controller 30 (adjustment process portion 31*d*) causes the RAM 33 (or the secondary transfer voltage storage/operation portion 31*f*) to store the secondary transfer voltage corresponding to the adjusting value inputted by the operator (S15). On the other hand, in the case where the adjusting value is not changed and the finalizing portion 94 (OC button 94*a* or application button 94*b* is operated, the controller 30 (adjustment process portion 31*d*) performs the following operation. That is, the controller 30 (adjustment process portion 31*d*) causes the RAM 33 (or secondary transfer voltage storage/operation portion 31*f*) to store the secondary transfer voltage corresponding to the adjusting value Na or Na' determined as described above (S16). The controller 30 (adjustment process portion 31*d*) sets the secondary transfer voltage, applied in the constant-voltage control, depending on the adjusting value stored in S15 or S16 during the image formation (during the secondary transfer) of a subsequent job in which the recording material S of the kind with which the operation in the adjusting mode is performed is used. The controller 30 (adjustment process portion 31*d*) sets the secondary transfer voltage on the basis of a result of the operation in the last adjusting mode as described above until the operation in a subsequent adjusting mode using the recording material S of the kind is executed. That is, the controller 30 (secondary transfer voltage storage/operation portion 31*f*) calculates an adjusting value ΔV as ΔV=(adjusting value)×150 V, and uses the calculated adjusting value in calculation of the secondary transfer voltage Vtr during normal image formation.

Next, processes of S14' and later in the case where the recording material S is discriminated as the low-resistance paper in S5 ("Yes") will be described.

In this embodiment, on the basis of the display contents of the setting screen 90 and the outputted chart, the operator is capable of discriminating whether or not the adjusting value may be a displayed adjusting value (S14'). In this case, on the voltage setting portion 91 of the setting screen 90, setting before the output of the chart is displayed. In the case where the operator does not change the displayed adjusting value, the operator operates the finalizing portion 94 (OK button 94*a* or application button 94*b*) of the setting screen 90 as it is. On the other hand, in the case where the operator intends to change the adjusting value from the displayed adjusting value, the operator inputs the changed adjusting value to the voltage setting portion 91 of the setting screen 90, and operates the finalizing portion 94 (OK button 94*a* or application button 94*b*).

In the case where the adjusting value is changed, the controller 30 (adjustment process portion 31*d*) performs the following operation. That is, the controller 30 (adjustment process portion 31*d*) causes the RAM 33 (or image formation process portion 31*c*) to store information for providing an instruction to switch the control of the secondary transfer voltage during image formation (during secondary transfer) in a subsequent job in which the recording material S of the kind with which the operation in the adjusting mode is performed is used, from the constant-voltage control to the constant-current control. At the same time, the current value which corresponds to the adjusting value inputted by the operator and which is detected by the patch portion is stored as a target current in the constant-current control in the RAM 33 (or secondary transfer current storage/operation portion 31*g*) (S15'). On the other hand, in the case where the adjusting value is not changed and the finalizing portion 94 is operated, the controller 30 (adjustment process portion 31*d*) performs the following operation. That is, the controller 30 (adjustment process portion 31*d*) causes the RAM 33 (or image formation process portion 31*c*) to store the information for providing the instruction to switch the control of the secondary transfer voltage during image formation (during secondary transfer) in the subsequent job in which the recording material S of the kind with which the operation in the adjusting mode is performed is used, from the constant-voltage control to the constant-current control. At the same time, the controller 30 (adjustment process portion 30*d*) causes the RAM 33 (or secondary transfer current storage/operation portion 31*g*) to store the information for providing the instruction to change the target current in the constant-current control to a predetermined target current Itarget (S16'). This target current Itarget is a target current Itarget which is determined from information on the recording material S and environmental information detected by the temperature sensor 71 and the humidity sensor 72 and which is acquired by an experiment in advance. The operation in the adjusting mode is thus ended.

An effect by changing the control of the secondary transfer voltage during the low-resistance paper passing from the constant-voltage control to the constant-current control will be specifically described later.

Here, in this embodiment, the control of the secondary transfer voltage is automatically changed from the constant-voltage control to the constant-current control in the case where the controller 30 discriminated as described above that the recording material S is the low-resistance paper, but the controller 30 may also carry out the following control. For example, in the case where the controller 30 discriminated in the operation in the adjusting mode that the recording material S is the low-resistance paper, in order to meet special paper, the controller 30 may carry out control so as to cause the setting screen 90 to display a message to the effect that the control of the secondary transfer voltage is changed from the constant-voltage control to the constant-current control. Further, for example, in the case where the controller 30 discriminated in the operation in the adjusting mode that the recording material S is the low-resistance paper, in order to meet the special paper, the controller 30 may carry out control so as to cause the setting screen 90 to display a message (display) for permitting the operator to select whether or not the control of the secondary transfer voltage is changed from the constant-voltage control to the constant-current control.

Incidentally, in the case where the adjusting amount of the secondary transfer voltage is determined on the basis of only the average brightness value of the patches, the average brightness value of the patches becomes minimum in some instances at a value which is the upper-limit value or more of the recording material part voltage, so that there is a liability that the adjusting value at which there is a possibility of the occurrence of the "penetration" is determined. On the other hand, according to this embodiment, the adjusting value at which there is a possibility of the occurrence of the "penetration" is avoided, and a proper adjusting value can be determined.

Incidentally, the information on the upper-limit value of the recording material part voltage Vp(n) used in S12 described above is not limited to use in setting as the table data as in this embodiment. For example, a relationship expression showing a relationship between the information on the thickness of the recording material S and the recording material part voltage Vp(n) at which the "penetration" is liable to occur is acquired in advance and can be stored in the ROM 32. In this case, the information on the thickness is acquired and the upper-limit value of the recording material part voltage Vp(n) can be acquired from the above-described relational expression.

Further, the information on the thickness of the recording material S is not limited to classification by the kind of the recording material S. For example, in the above-described S1, the operator is capable of directly inputting a value relating to the thickness of the recording material S, such as the thickness or the basis weight. Further, in the step corresponding to S1, the value relating to the thickness of the recording material S, such as the thickness or the basis weight may also be acquired by a measuring means for measuring the value relating to the thickness of the recording material S. As the measuring means, for example, a known thickness sensor using ultrasonic wave can be provided on a side upstream of the secondary transfer portion N with respect to the process progression direction of the recording material S.

In this embodiment, as the patches for acquiring the average brightness value and the brightness dispersion value, the solid blue patches and the solid black patches were used but are not limited thereto. For example, instead of the solid blue patch, a solid patch of red or green which is a secondary color can be used, and a solid patch of a single color of yellow, magenta, cyan or black can be used.

In this embodiment, the case where the operation by the operator is performed through the operation portion 70 of the image forming apparatus 1 and thus the operation in the adjusting mode is executed was described as an example, but the operation in the adjusting mode may also be executed by operation through the external device 200 such a personal computer. In this case, it is possible to make setting similar to the above-described setting, through the setting screen displayed at the display portion of the external device 200, by a driver program for the image forming apparatus 1 installed in the external device 200.

In this embodiment, the information on the electric resistance of the secondary transfer portion N from a start of the operation in the adjusting mode when the recording material S is absent in the secondary transfer portion N was acquired. As a result, the information on the electric resistance of the secondary transfer portion N in conformity with a situation when the adjusting amount for setting of the secondary transfer voltage is acquired can be acquired. However, if allowed from the viewpoint of accuracy or the like, as the information on the electric resistance of the secondary transfer portion N, for example, a result of ATVC at the time of a start of the last job in which the operation in the adjusting mode is executed may also be used.

In this embodiment, in the operation in the adjusting mode, control using display of the adjusting value corresponding to the adjusting amount ΔV was carried out, but control more directly using the display of the adjusting value ΔV may also be carried out.

In this embodiment, when the voltage-current relationship is acquired, the value of the current flowing during supply of the predetermined voltage was detected, but a value of the voltage generating during supply of a predetermined current value may also be detected.

Further, the rank itself used for discriminating the occurrence or non-occurrence of the "penetration" is based on evaluation through eye observation by the present inventor, and may be on a different basis. Further, the discriminating method of the occurrence or non-occurrence of the "penetration" using the brightness dispersion value is not limited to the above-described method in this embodiment, but for example, it is also possible to make the discrimination with a difference in brightness dispersion between the adjusting values before and after the change without using the inclination. Further, in this embodiment, as the adjusting values used for the discrimination, the adjusting values Na−1, Na, and Na+1 were used, but it is also possible to use adjusting values other than these three adjusting values.

Thus, according to this embodiment, in a constitution in which the operation in the adjusting mode such that the chart on which the patches are formed is outputted and then the setting of the secondary transfer voltage is adjusted is performed, it becomes possible to more appropriately adjust the setting of the secondary transfer voltage.

7. Effect by Switching to Constant-Current Control During Low-Resistance Paper Passing Next, an effect by switching of the control of the secondary transfer voltage during the low-resistance paper passing from the constant-voltage control to the constant-current control will be described.

FIG. 22 is a graph showing an applied voltage, a current flowing through the inner secondary transfer roller 45*a*, and a current flowing through the output flowing through the outer secondary transfer roller 45*b* in the case where the control of the secondary transfer voltage during the low-resistance paper passing is the constant-voltage control ("during constant-voltage application"). First, it is understood that the current hardly flows into the outer secondary transfer roller 45*b*. This would be considered because the current supplied to the inner secondary transfer roller 45*a* passes through the recording material S into the contact member, such as the registration roller pair 11, the conveying guide, or the like, contacting the recording material S at a portion other than the secondary transfer portion N. At this time, impedance change occurs due to a change in portion to which the recording material S is contacted. As a result, the current flowing through the inner secondary transfer roller 45*a* is not stabilized and is largely fluctuated, and therefore, formation of an optimum electric field for the toner is not made, so that there is a possibility that a secondary transfer property becomes unstable and thus an image defect such as a lowering in image density occurs.

On the other hand, FIG. 23 is a graph showing an applied voltage, a current flowing through the inner secondary transfer roller 45*a*, and a current flowing through the outer secondary transfer roller 45*b* in the case where the control of the secondary transfer voltage during the low-resistance paper passing is the constant-current control ("during constant-current application"). First, it is understood that the current hardly flows into the outer secondary transfer roller 45*b*. This would be considered because similarly as during the constant-voltage application, the current supplied to the inner secondary transfer roller 45*a* passes through the recording material S into the contact member, such as the registration roller pair 11, the conveying guide, or the like, contacting the recording material S at a portion other than the secondary transfer portion N. However, although the impedance change occurs similarly as described above due to the change in portion to which the recording material S is contacted, the secondary transfer voltage is subjected to the constant-current control, and therefore, a certain current is continuously supplied to the inner secondary transfer roller 45*a*. For that reason, even when the above-described flowing-in of the current occurs, it becomes possible to continuously supply the certain current to the toner. As a result, even when the flowing of the secondary transfer current into the contact member contacting the recording material S at a portion other than the secondary transfer portion N during the low-resistance paper passing, the secondary transfer property is maintained, so that good image formation can be carried out.

Incidentally, as a representative paper kind section in which the control of the secondary transfer voltage is the constant-voltage control, it is possible to cite thin paper, plain paper, thick paper, coated paper, colored paper, Japanese paper, recycled paper, tab paper, postcard, envelope, embossed paper, and the like. Further, as a representative paper kind section desired to switch the control of the secondary transfer voltage to the constant-current control, it is possible to cite special paper (such as metallized paper) including a metal layer, paper containing carbon black, and the like.

Thus, in this embodiment, the image forming apparatus 1 includes the image bearing member 51 for bearing the toner image, the intermediary transfer belt 44*b* onto which the toner image is transferred from the image bearing member 51, the outer roller 45*b* for forming the transfer portion N in contact with the outer peripheral surface of the intermediary transfer belt 44*b*, the inner roller 45*a* which is disposed opposite to the outer roller 45*b* through the intermediary transfer belt 44*b* and which is for forming the transfer portion N in cooperation with the outer roller 45*a* in contact with the inner peripheral surface of the intermediary transfer belt 44*b*, the power source 76 for applying, to the inner roller 45*a*, the transfer voltage for transferring the toner image from the intermediary transfer belt 44*b* onto the recording material S passing through the secondary transfer portion N, the detecting portion (for example, the current detection sensor) 76*b* for detecting the value of the current or the value of the voltage applied when the voltage is applied to the inner roller 45*a* by the power source 76, and the controller 30 capable of carrying out control so as to execute the operation in the adjusting mode for forming the chart 100 prepared by transferring the plurality of test images onto the recording material S under application of a plurality of test voltages to the inner roller 45*a* by the power source 76 in order to adjust the transfer voltage. On the basis of a detection result of the detecting portion 76*b* when the voltage is applied to the inner roller 45*a* by the power source 76 in order to form the chart 100 on the recording material S of a predetermined kind in the operation in the adjusting mode, the controller 30 determines whether the transfer voltage when the toner image is transferred onto the recording material S of the above-described predetermined kind is subjected to the constant-voltage control so that the voltage applied to the inner roller 45 by the power source 76 becomes a target value or is subjected to the constant-current control so that the current supplied to the inner roller 45*a* by the power source 76 becomes a target value.

In this embodiment, on the basis of a result of detection by the detecting portion 76*b* when there is no recording material S in the transfer portion N and a result of detection by the detecting portion 76*b* when the recording material S of the predetermined kind exists in the transfer portion N in the operation in the adjusting mode, the controller 30 determines whether the transfer voltage when the toner image is transferred onto the recording material S of the predetermined kind is subjected to the constant-voltage control or the constant-current control. Particularly, in this embodiment, the controller 30 determines that the transfer voltage when the toner image is transferred onto the recording material S of the predetermined kind is subjected to the constant-voltage control in a case that a value of a current detected by the detecting portion 76*b* when a voltage of a predetermined value is applied to the inner roller 45*a* when the toner image is transferred onto the recording material S of the predetermined kind is smaller than a value of a current detected by the detecting portion 76*b* when the voltage of the predetermined value is applied to the inner roller 45*a* when there is no recording material S in the transfer portion N, and wherein the controller 30 determines that the transfer voltage when the toner image is transferred onto the recording material S of the predetermined kind is subjected to the constant-current control in a case that the value of the current detected by the detecting portion 76*b* when a voltage of a predetermined value is applied to the inner roller 45*a* when the toner image is transferred onto the recording material S of the predetermined kind is larger than a value of a current detected by the detecting portion 76*b* when the voltage of the predetermined value is applied to the inner roller 45*a* when there is no recording material S in the transfer portion N. Further, in this embodiment, in a case that the controller 30 determines that the transfer voltage when the toner image is transferred onto the recording material S of the predetermined kind is subjected to the constant-current control, the controller carries out control so that a target value in the constant-current control is a predetermined value set in advance. Here, the electric resistance value, in the transfer portion N, of the recording material S for which determination that the transfer voltage is subjected to the constant-current control is made is smaller than the electric resistance value, in the transfer portion, of the recording material S for which determination that the transfer voltage is subjected to the constant-voltage control is made. Further, the recording material S for which the determination that the transfer voltage is subjected to the constant-voltage control is made is the plain paper, and the recording material S for which the determination that the transfer voltage is subjected to the constant-current control is the recording material S including the metal layer.

As described above, according to this embodiment, even in the case where the recording material S used in the image formation is the low-resistance paper such that the transfer current leaks through the recording material S, by executing the operation in the adjusting mode, the control of the secondary transfer voltage for the recording material S can be simply switched to the constant-current control suitable for the low-resistance paper. Accordingly, after the execution of the operation in the adjusting mode, it is possible to improve the secondary transfer property for the low-resistance paper. Therefore, according to this embodiment, it becomes possible to set the control of the transfer voltage advantageous in transfer property for the low-resistance paper which can cause flowing of the transfer current into the member existing in the conveying passage of the recording material S, simply without increasing the operation load on the operator.

Embodiment 2

Next, another embodiment of the present invention will be described.

The basic structure and operation of the image forming apparatus of this embodiment are the same as those of the image forming apparatus of the embodiment 1. Therefore, as to the image forming apparatus of this embodiment, elements including the same or corresponding functions or structures as those of the image forming apparatus of the embodiment 1 are denoted by the same reference numerals or symbols as those of the embodiment 1, and detailed description thereof is omitted.

In the embodiment 1, in the case where the recording material S is discriminated as the low-resistance paper in the operation in the adjusting mode, the recommended adjusting value determining process such as the reading of the chart is omitted, and for the associated recording material S, the process for switching the control of the secondary transfer voltage from the constant-voltage control to the constant-current control was performed. Further, the target current of the constant-current control was the value set in advance depending on the kind or the like of the recording material S (however, this value is capable of being changed on the basis of the chart by the operator). However, there is a possibility that an optimum secondary transfer current value is somewhat at different depending on the paper kind, the environment, or the like. Therefore, in this embodiment, in the operation in the adjusting mode, the optimum transfer current value for the low-resistance paper is determined and presented to the operator, so that setting of the target current in the constant-current control of the secondary transfer voltage is enabled more appropriately.

FIG. 18 is a flow chart showing an outline of a procedure of the operation in the adjusting mode in this embodiment. Incidentally, in the procedure shown in FIG. 18, processes similar to those in the procedure of the adjusting mode in the embodiment 1 shown in FIG. 8 will be omitted from description appropriately by adding step numbers identical to those in FIG. 8.

Similarly as in the embodiment 1, from a detection result of the current with respect to the voltages of 11 levels, the controller 30 (adjustment process portion 31*d*) acquires a polynomial expression (quadratic expression in this embodiment) of two or more terms (terms of the second degree or more) with respect to a voltage-current relationship (IV curve) depending on the electric resistance of the secondary transfer portion N and the recording material S (S5). The controller 30 (adjustment process portion 31*d*) writes information on this voltage-current relationship in the RAM 33 (or adjustment process portion 31*d*).

However, in this embodiment, at this time, the controller 30 (adjustment process portion 31*d*) writes only the following information. That is, the relationship is a relationship between of current values detected at the patch portions under the voltage application of the voltage levels when the chart is outputted, one or more (at least one) current values which are less than 1.2 times a current value corresponding to the same voltage acquired from the IV curve acquired when the recording material S is absent in the secondary transfer portion N exists, and corresponding voltage values. That is, the controller 30 (adjustment process portion 31*d*) writes only information indicating a relationship between a voltage and a current, which relates to a voltage level (patch) section of the voltage detected when the flowing of the current into the contact member contacting the recording material S at the portion other than the secondary transfer portion N does not occur. As regards information of a voltage and a current, which relate to a voltage level (patch) section in which a current value which is 1.2 times or more the current value when the recording material S is absent, the controller 30 (adjustment process portion 31*d*) generates the information by making a complement with use of linear interpolation or the like on the basis of the above-written information on the voltage and the current.

Incidentally, the current when the recording material S is present in the secondary transfer portion N may typically be detected during transfer of the patch (at the patch portion), but may also be detected at a portion of the recording material S where there is no toner before and after the patch for each voltage level.

Then, the controller 30 (adjustment process portion 31*d*) acquires the recording material part voltage Vp(n) at each of the voltage levels from the following relationships (S6'). That is, the controller acquires the recording material part voltage Vp(n) from the relationship (quadratic expression) between the voltage and the current, when the recording material S is present in the secondary transfer portion N, acquired in S5 and from the relationship (quadratic expression) between the voltage and the current, when the recording material S is present in the secondary transfer portion N, acquired in S3. As described above, in this embodiment, the relationship (quadratic expression) between the voltage and the current, when the recording material S is present in the secondary transfer portion N, acquired in S5 includes the detection result (the above-described section of less than 1.2 times when the recording material S is absent) and the interpolation result (the above-described section of not less than 1.2 times when the recording material S is absent). Here, n represents each of the voltage levels, and in this embodiment, n ranges from 1 to 11 corresponding to the 11 levels (11 sets of patches). Further, the voltage value of each voltage level is represented by Vtr(n). Further, the voltage value calculated by applying each level to the relationship (quadratic expression) between the voltage and the current, when the recording material S is absent in the secondary transfer portion N, acquired in S3 is represented by Vb(n). At this time, recording material part voltage Vp(n) at each voltage level is represented by the following equation: $Vp(n)=Vtr(n)-Vb(n)$.

Then, the outputted chart is supplied to the image reading portion 80 by using the automatic original feeding device 81, for example, so that the chart is read by the image reading portion 80 (S7'). At this time, the image reading portion 80 is controlled by the controller 30 (adjustment process portion 31*d*), and in this embodiment, RGB brightness data (8 bit) of each of the solid blue patches on the chart are acquired. Incidentally, when the chart is outputted, the controller 30 (adjustment process portion 31*d*) is capable of causing the operation portion 70 to display a message prompting the operator to supply the outputted chart to the image reading portion 80. Next, the controller 30 (adjustment process portion 31*d*) acquires an average of values of the brightness (average brightness value) of the respective solid blue patches by using the brightness data (density data) acquired in S7 (S8'). By this process of S8', as an example, as shown in FIG. 19, average brightness values of the solid blue patches (graph of part (c) of FIG. 19) corresponding to the voltage levels, respectively. Parts (a) and 8*b*) of FIG. 19 show detection result of applied voltages and current values, respectively. Incidentally, of the detection results acquired as shown in FIG. 19, analysis is conducted using only brightness data excluding brightness data of the voltage level (patch) section in which the current value which is 1.2 times or more the current value when the recording material S is absent is detected. Further, as regards the voltage level (patch) section in which the current value which is 1.2 times or more the current value when the recording material S is absent is detected, the analysis is conducted using brightness data (○) complemented by the linear interpolation. An average brightness value of patches corresponding to respective voltage levels is acquired by the process of S8'.

Processes of S9' to S13' of FIG. 18 are similar to the processes 9 to 13 in the case of the normal paper described in the embodiment 1 with use of FIG. 8, and therefore, will be omitted from description.

The operator is capable of discriminating whether or not the displayed adjusting value is appropriate, on the basis of the display contents of the setting screen 90 and the outputted chart (S14'). The operator operates a finalizing portion 94 (OK button 94*a*, application button 94*b*) of the setting screen 90 as it is in the case where the displayed adjusting value is not changed. On the other hand, the operator inputs the changed adjusting value to the voltage setting portion 91 of the setting screen 90 in the case where the operator desires that the adjusting value is changed from the displayed adjusting value, and then operates the finalizing portion 94 (OK button 94*a* or application button 94*b*).

In the case where the adjusting value is changed, the controller 30 (adjustment process portion 31*d*) performs the following operation. That is, the controller 30 (adjustment process portion 31*d*) causes the RAM 33 (or image formation process portion 31*c*) to store information for providing an instruction to switch the control of the secondary transfer voltage during image formation (during secondary transfer) in a subsequent job in which the recording material S of the kind with which the operation in the adjusting mode is performed is used, from the constant-voltage control to the constant-current control. At the same time, the current value (or complemented current value) which corresponds to the adjusting value inputted by the operator and which is detected by the patch portion is stored as a target current in the constant-current control in the RAM 33 (or secondary transfer current storage/operation portion 31*g*) (S15'). On the other hand, in the case where the adjusting value is not changed and the finalizing portion 94 is operated, the controller 30 (adjustment process portion 31*d*) performs the following operation. That is, the controller 30 (adjustment process portion 31*d*) causes the RAM 33 (or image formation process portion 31*c*) to store the information for providing the instruction to switch the control of the secondary transfer voltage during image formation (during secondary transfer) in the subsequent job in which the recording material S of the kind with which the operation in the adjusting mode is performed is used, from the constant-voltage control to the constant-current control. At the same time, the controller 30 (adjustment process portion 30*d*) causes the RAM 33 (or secondary transfer current storage/operation portion 31*g*) to store, as the target current in the constant-current control, a current value detected at the patch portion where the average brightness value calculated in S8' is smallest (S16'). In the above-described manner, the operation in the adjusting mode is ended.

Incidentally, the controller 30 may perform the following operation in the case where the controller 30 discriminated in S5 that the recording material S is the low-resistance paper. That is, on the basis of the number of the voltage level (patch) sections in which the current value of 1.2 times or more when the recording material S is absent, the controller 30 may switch whether to execute the processes of S6' to S16' of FIG. 18 or to execute the processes of S14' to S16' of FIG. 8 described in the embodiment 1. For example, in the case where of the 11 voltage level (patch) sections, the current value of 1.2 times or more when the recording material S is absent is detected in not less than a predetermined number (for example 3 to 5 sections or more) of sections, the controller 30 is capable of executing the processes of S14' to S16' of FIG. 8 described in the embodiment 1. On the other hand, in the case of less than the predetermined number of sections, the controller 30 is capable of executing the processes of S6' to S16'. By this, accuracy of the adjusting value determined by the controller 30 can be maintained.

Thus, in this embodiment, in the case where the controller 30 determines that the transfer voltage when the toner image is transferred onto the recording material S of the predetermined kind is subjected to the constant-current control, the controller 30 control a target value in the constant-current control so as to become a value set on the basis of a detection result by the detecting portion 76*b* when test voltages are applied to the inner roller 45*a* in the operation in the adjusting mode. Particularly, in this embodiment, in the case where the controller 30 determines that the transfer voltage when the toner image is transferred onto the recording material S of the predetermined kind is subjected to the constant-current control, the controller 30 controls the target value in the constant-current control so as to become a value set on the basis of a detection result excluding at least one detection result, out of a predetermined range, of a plurality of detection results detected by the detecting portion 76*b* when a plurality of test voltages are applied to the inner roller 45*a* in the operation in the adjusting mode.

As described above, according to this embodiment, an effect similar to the effect of the embodiment 1. Further, according to this embodiment, an optimum transfer current value for the low-resistance paper is determined and presented to the operator in the operation in the adjusting mode, so that it becomes possible to set the target current in the constant-current control of the secondary transfer voltage more appropriately.

Other Embodiments

In the above, the present invention was described on the basis of the specific embodiments, but the present invention is not limited to the above-described embodiments.

The constant-current control of the secondary transfer voltage when the toner image is transferred not only includes execution of the constant-current control in a full period in which the recording material passes through the secondary transfer portion but also includes execution of the constant-current control in a part of the period during passing of the recording material through the secondary transfer portion. For example, the period in which the secondary transfer voltage is subjected to the constant-voltage control may also exist during passing, through the secondary transfer portion, a region (for example, a marginal region) other than an image forming region with respect to the recording material feeding direction or during passing, through the secondary transfer portion, a part of a region in the image forming region.

Further, the low-resistance paper discriminating method in the operation in the adjusting mode is not limited to the methods in the above-described embodiments. For example, in the operation in the adjusting mode, the low-resistance paper can be discriminated on the basis of the current value or the voltage value when the voltage is applied to the secondary transfer portion in the case where the recording material on which the chart is formed is present in the secondary transfer portion and on the basis of the electric resistance value of the recording material acquired on the basis of these values.

The low-resistance paper discriminating method in the operation in the adjusting mode will be further described. For example, the controller 30 is capable of detecting information on the electric resistance value of the recording material S from the relationship between the voltage value and the current value acquired by applying the voltage from the secondary transfer power source 76 to the inner secondary transfer roller 45*a* when the recording material S passes through the secondary transfer portion N during the operation in the adjusting mode. That is, a current value when a predetermined voltage is applied to the inner secondary transfer roller 45*a* when the recording material S is absent in the secondary transfer portion N and a current value when the predetermined voltage is applied to the inner secondary transfer roller 45*a* when the recording material S passes through the secondary transfer portion N during the operation in the adjusting mode are subtracted from each other. By this, it is possible to acquire the electric resistance value of the recording material S. Further, in the case where the electric resistance value of the recording material S is a predetermined threshold or less, the recording material S can be discriminated as the low-resistance paper. For example, in the case where the electric resistance value of the recording material S in the secondary transfer portion N is detected as being $1\times10^{6}\Omega$ or less, the recording material S can be discriminated as the low-resistance paper. However, the above-described threshold is not limited to $1\times10^{6}\Omega$, but can be appropriately set depending on the electric resistance value of the low-resistance paper described to suppress the image defect due to the flowing of the current into the contact member, on the basis of appropriately a constitution of the apparatus or the like.

Further, when the flowing of the current into the contact member through the low-resistance paper (typically, the recording material S including the metal layer) occurs, the current (absolute value) of the current detected in the case where the predetermined voltage is applied to the inner secondary transfer roller 45*a* becomes higher when the recording material S is present in the secondary transfer portion N than when the recording material S is absent in the secondary transfer portion N. In the case where the normal paper (typically, the plain paper) is used, the current (absolute value) detected in the case where the predetermined voltage is applied to the inner secondary transfer roller 45*a* is lower when the recording material S is present in the secondary transfer portion N than when the recording material S is absent in the secondary transfer portion N. For that reason, as the information on the electric resistance value of the recording material S, instead of discrimination that the recording material S is the low-resistance paper through acquisition of the electric resistance value itself, the following discrimination can be made. That is, the recording material S can be discriminated as the low-resistance paper in the case where the current value detected in the case where the predetermined voltage is applied when the recording material S is present in the secondary transfer portion N is the predetermined threshold or more. Further, the recording material S can be discriminated a the low-resistance paper in the case where the voltage value detected in the case where a predetermined current is supplied when the recording material S is present in the secondary transfer portion N is the predetermined threshold or less. Further, the recording material S can be discriminated as the low-resistance paper in the case where the current value detected by applying the predetermined voltage when the recording material S is present in the secondary transfer portion N is higher than the current value detected by applying the predetermined voltage when the recording material S is absent in the secondary transfer portion N. Further, the recording material S can be discriminated as the low-resistance paper in the case where the voltage value detected by supplying the predetermined current when the recording material S is present in the secondary transfer portion N is lower than the voltage value detected by supplying the predetermined current when the recording material S is absent in the secondary transfer portion N.

Further, as shown in FIG. 24, detection of the low-resistance paper is not limited to detection of the low-resistance paper by detecting the current flowing through the inner secondary transfer roller 45*a* by a current detecting portion 151 (corresponding to the above-described current detecting sensor 76*b*). For example, the current flowing into the contact member, such as the registration roller pair 11, contacting the recording material S at a portion other than the secondary transfer portion N is detected by a current detecting portion 152, so that the low-resistance paper can be detected. In this case, for example, the recording material S can be discriminated as the low-resistance paper in the case where the value of the current which is detected by the current detecting portion 152 and which flows into the contact member becomes a predetermined value or more. Further, for example, the current flows into the contact member, such as the registration roller pair 11, contacting the recording material S at the portion other than the secondary transfer portion N, and a decrease in current flowing into the outer secondary transfer roller 45*b* is detected by a current detecting portion 153, so that the low-resistance paper can be detected. In this case, for example, the recording material S can be discriminated as the low-resistance paper in the case where the current flowing into the outer secondary transfer roller 45*b* detected by the current detecting portion 153 becomes predetermined threshold or less.

Incidentally, in the methods in the above-described embodiments, instead of or in addition to the detection that the recording material S is the low-resistance paper, by appropriately changing a discrimination condition of a magnitude relationship of the detection result with respect to the threshold, it is also possible to detect that the recording material S is the normal paper (plain paper or the like) (not the low-resistance paper).

Further, in the above-described embodiments, the adjusting value presented by the controller 30 can be made changeable by the operator, but may also be unable to be changed by the operator.

Further, in the above-described embodiments, in the operation in the adjusting mode, the chart outputted from the image forming apparatus was set in the image reading apparatus by the operator and then was read by the image reading apparatus, but the present invention is not limited thereto. For example, when the chart is outputted from the image reading apparatus, reading of the chart may also be made by an in-line image reading means.

Further, the control of the secondary transfer voltage is not limited to setting to the constant-voltage control or the constant-current control for each of jobs. For example, in a job in which a plurality of paper kinds are exist in mixture, depending on each of the paper kinds of the recording materials, the control of the secondary transfer voltage can be changed to the constant-current control or the constant-voltage control in the job.

In the following, the image forming apparatus according to the present invention will be described in more detail with reference to the drawings.

Embodiment 3

1. Structure of Image Forming Apparatus

FIG. 25 is a schematic cross-sectional view of an image forming apparatus 1001 of this embodiment. The image forming apparatus 1001 of this embodiment is a tandem type full-color printer capable of forming a full-color image by using an electrophotographic type and employing an intermediary transfer type.

The image forming apparatus 1001 includes four image forming portions (stations) Sa, Sb, Sc, and Sd arranged in a line with certain intervals. The image forming portions Sa, Sb, Sc, and Sd form yellow (y), magenta (m), cyan (c), and black (k) images, respectively. Elements having the same or corresponding functions or structures provided for these portions for the respective colors may be referred to, with a, b, c and d omitted, in the case that the description applies to all colors.

The image forming portion S includes, as a movable (rotatable) image bearing member, a photosensitive drum 1050 which is a drum-type (cylindrical) electrophotographic photosensitive member. The photosensitive drum 1050 is rotationally driven in an arrow R1 direction (clockwise direction) in FIG. 25. The image forming portion S include the following means disposed around the photosensitive drum 1050 along a rotational direction of the photosensitive drum 1050 is a named order. First, a charging roller 1051 which is a roller-shaped charging member as a charging means is disposed. Next, an exposure device 1052 as an exposure means (image forming means) is disposed. Next, a developing device 1053 as a developing means is disposed. Next, a primary transfer roller 1054 which is a roller-shaped primary transfer member as a primary transfer means is disposed. Next, a drum cleaning device 1055 as an image bearing member cleaning means is disposed.

Further, as a movable (rotatable) intermediary transfer member, an intermediary transfer belt 1056 constituted by an endless belt is provided opposite to the four photosensitive drums 1050*a*, 1050*b*, 1050*c*, and 1050*d*. The intermediary transfer belt 1056 is supported at an inner peripheral surface thereof by a plurality of stretching rollers (supporting rollers) constituting of a driving roller 1063, a tension roller 1060, an auxiliary roller 1067, a pre-transfer roller 1061, and an inner secondary transfer roller 1062, and is stretched under a predetermined tension. The intermediary transfer belt 1056 is rotated (moved and circulated) in an arrow R2 direction (counterclockwise direction) in FIG. 25 by rotationally driving the driving roller 1063. On an inner peripheral surface side of the intermediary transfer belt 1056, the above-described primary transfer rollers 1054 are provided corresponding to the photosensitive drums 1050, respectively. In this embodiment, each primary transfer roller 1054 is disposed opposite to the associated photosensitive drum 1050 while sandwiching the intermediary transfer belt 1056 therebetween.

The primary transfer roller 1054 is pressed toward the photosensitive drum 1050 through the intermediary transfer belt 1056, and forms a primary transfer portion (primary transfer nip) N1 where the intermediary transfer belt 1056 and the photosensitive drum 1050 are in contact with each other. Further, on an output peripheral surface side of the intermediary transfer belt 1056, at a position opposing the inner secondary transfer roller 1062, an output secondary transfer roller 1064 is provided. The output secondary transfer roller 1064 is pressed toward the inner secondary transfer roller 1062 through the intermediary transfer belt 1056, and forms a secondary transfer portion (secondary transfer nip) N2 where the intermediary transfer belt 1056 and the output secondary transfer roller 1064 are in contact with each other. The inner secondary transfer roller 1062 is a roller-shaped secondary transfer member, and the output secondary transfer roller 1064 is a roller-shaped opposite member (opposite electrode). Of the plurality of stretching rollers, the stretching rollers other than the driving roller 1063, and the primary transfer rollers 1054 are rotated with rotation of the intermediary transfer belt 1056.

Further, on the outer peripheral surface side of the intermediary transfer belt 1056, at a position opposing the driving roller 1063, a belt cleaning device 1065 as an intermediary transfer cleaning means is disposed.

Incidentally, in each image forming portion S, the photosensitive drum 1050 and, as process means actable on the photosensitive drum 1050, the charging roller 1051, the developing device 1053, and the drum cleaning device 1055 integrally constitute a process cartridge detachably mountable to an apparatus main assembly of the image forming apparatus 1001.

During image formation, a surface of the photosensitive drum 1050 is electrically charged substantially uniformly to a predetermined polarity (negative in this embodiment) and a predetermined potential by the charging roller 1051. During the charging process, to the charging roller 1051, by a charging power source (not shown) as a charging voltage applying means, a predetermined charging voltage (charging bias) is applied. Then, the surface of the charged photosensitive drum 1050 is scanned and exposed by the exposure device 1052 depending on image information charging to the associated image forming portion S, so that an electrostatic image (electrostatic latent image) is formed on the surface of the photosensitive drum 1050. Then, the electrostatic image formed on the photosensitive drum 1051 is developed (visualized) by supplying toner of a color corresponding to the image forming portion S by the developing device 1053, so that a toner image is formed on the surface of the photosensitive drum 1050. In this embodiment, the toner charged to the same polarity (negative in this embodiment) as a charge polarity of the photosensitive drum 1050 is deposited on an exposure portion (image portion) on the photosensitive drum 1050 where an absolute value of the potential is lowered by exposure to light depending on the image information after being charged uniformly (reverse development type). In this embodiment, a normal charge polarity of the toner which is a principal charge polarity of the toner during development is the negative polarity.

The toner image formed on the photosensitive drum 1050 is transferred (primarily transferred) onto the intermediary transfer belt 1056 as a rotating toner image receiving member by the action of the primary transfer roller 1054 in the primary transfer portion N. During primary transfer, by a primary transfer power source (not shown) as a primary transfer voltage applying means, primary transfer voltage (primary transfer bias) which is a DC voltage of the opposite polarity (positive in this embodiment) to the normal charge polarity of the T is applied to the primary transfer roller 1054. For example, during full-color image formation, the yellow, magenta, cyan, and black toner images formed on the photosensitive drums 1050 are successively (primarily transferred) superposedly onto the intermediary transfer belt 1056 in the primary transfer portions N1.

The toner image transferred on the intermediary transfer belt 1056 is transferred (secondarily transferred) onto a recording material (transfer material, sheet, recording medium, form) P such as a recording sheet as a toner image receiving member in a secondary transfer portion N2 by the action of the inner secondary transfer roller 1062 and the output secondary transfer roller 1064. During secondary transfer, to the inner secondary transfer roller 1062, a secondary transfer voltage (secondary transfer bias) which is a DC voltage of the same polarity as the normal charge polarity of the toner by a secondary transfer power source E2 (FIG. 26) as a secondary transfer voltage applying means is applied. The output secondary transfer roller 1064 is connected to a ground potential (electrically grounded). The recording material P is fed from the feeding portion 1013 in parallel with the above-described toner image forming operation, and the toner image on the intermediary transfer belt 1056 is fed by a registration roller pair 1011 provided in the feeding path at the timing of the toner image. The recording material P is then fed to the secondary transfer portion N2. The feeding portion 1013 is constituted by including a cassette 1014 as a recording material accommodating portion for accommodating the recording material(s) P, a feeding roller 1015 as a feeding member for feeding the recording material P, and the like. The recording materials P accommodated in the cassette 1014 are separated and fed one by one from the cassette 1014 by the feeding roller 1015 or the like. This recording material P is conveyed to a registration roller pair 1011 as a conveying member (conveying roller pair), and oblique movement of the recording material P is corrected by the registration roller pair 1011. In addition, the recording material P is supplied to the secondary transfer portion N2 by controlling a conveying timing as described above. The recording material P conveyed by the registration roller pair 1011 is guided to the secondary transfer portion N2 by a pre-transfer guiding member 1012 as a guiding member (conveying guide). Incidentally, although omitted from illustration, a plurality of cassettes 1014 are provided, and a recording material P designated in job information descried later may be fed from a corresponding cassette 1014.

Further, the image forming apparatus 1001 is not limited to an image forming apparatus in which the recording material P is fed from the cassette 1014 as the recording material accommodating portion, but for example, the recording material P may also be made feedable from a manual feeding tray or the like as a recording material accommodating portion (recording material stacking portion).

The recording material P on which the toner image is transferred and which is separated from the intermediary transfer belt 1056 is conveyed to a fixing device (not shown) as a fixing means. The fixing device passes and heats the recording material P carrying thereon an unfixed toner image, in a fixing portion (fixing nip) between a fixing roller and a pressing roller, so that the toner image is fixed (melted, sticked) on the recording material P. The recording material P on which the toner image is fixed is discharged (outputted) to an outside of the apparatus main assembly of the image forming apparatus 1001.

Further, toner (primary transfer residual toner) remaining on the photosensitive drum 1050 without being transferred onto the intermediary transfer belt 1056 in the primary transfer portion N1 is removed and collected from the photosensitive drum 1050 by the drum cleaning device 1055. The drum cleaning device 1055 scrapes off and removes the primary transfer residual toner from the surface of the rotating photosensitive drum 1050 by a cleaning blade as a cleaning member. Further, toner (secondary transfer residual toner) remaining on the intermediary transfer belt 1056 without being transferred onto the recording material P in the secondary transfer portion N2 is removed and collected from the intermediary transfer belt 1056 by the belt cleaning device 1065. The belt cleaning device 1065 scrapes off and removes the secondary transfer residual toner from the surface of the rotating intermediary transfer belt 1056 by a cleaning blade as a cleaning means.

Incidentally, the image forming apparatus 1001 may be provided with a reverse feeding path (not shown) for turning over the recording material P on which the toner image is fixed on the first surface and for supplying the recording material P to the secondary transfer portion N2 again. The recording material P re-supplied to the secondary transfer portion N2 by the operation of the reverse feeding path is discharged onto the outside of the apparatus main assembly of the image forming apparatus 1001 after the toner image is transferred and fixed on the second side. As described above, the image forming apparatus 1001 is capable of executing double-sided printing (automatic double-sided printing) which forms images on both sides of a single recording material P.

In this embodiment, as the exposure device 1052, a laser scanner device for scanning the surface of the photosensitive drum 1050 along a longitudinal direction (rotational axis direction) of the photosensitive drum 1050 with laser light modulated depending on the image information was used.

Further, in this embodiment, as the developing device 1053, a two-component developing device employing a two-component development type in which a two-component developer principally including non-magnetic toner particles (toner) and magnetic carrier particles (carrier) is used as a developer was used. The developing device 1053 conveys the developer to an opposing portion (developing portion) to the photosensitive drum 1050 by a developing sleeve as a rotatable developer carrying member. Then, by applying a developing voltage (developing bias) to the developing sleeve, depending on the electrostatic image on the photosensitive drum 1050, the toner is moved from the developer on the developing sleeve to the surface of the photosensitive drum 1050. To the developing sleeve, by a developing power source (not shown) as a developing voltage applying means, the developing voltage in which a negative DC voltage component and an AC voltage component are superposed with each other is applied. In the developing devices **1053*a*, 1053*b*, 1053*c*, and 1053*d***, yellow toner, magenta toner, cyan toner, and black toner are accommodated, respectively.

2. Control Mode

FIG. 26 is a schematic view showing a schematic control mode of a principal portion of the image forming apparatus 1001 of this embodiment. A controller (control portion) 1100 is constituted by including a CPU 1111 as a calculation (operation) control means which is a central element for performing calculation (operation) processing, a memory (storing medium) 1112 such as ROM, RAM, or non-volatile memory as a storing means, input/output portion (not shown), and the like. In the RAM, which is a rewritable memory, information inputted to the controller 1100, detected information, an operation result, and the like are stored. In the ROM, a control program, table data acquired in advance, and the like are stored. The CPU 1111 and the memory 1112 such as the RAM are capable of performing data transfer and reading therebetween. The input/output portion transfers signals between the controller 1100 and an external device for the controller 1100.

To the inner secondary transfer roller 1062, the secondary transfer power source (high-voltage circuit) E2 is connected. Further, the secondary transfer power source E2 is provided with a voltage control circuit (voltage controller) 1120 for subjecting, to constant-voltage control, a voltage applied from the secondary transfer power source E2 to the inner secondary transfer roller 1062 under control of the controller 1100. Further, the secondary transfer power source E2 is provided with a current control circuit (current controller) 1122 for subjecting, to constant-current control, the voltage applied from the secondary transfer power source E2 to the inner secondary transfer roller 1062 under control of the controller 1100. To the voltage control circuit 1120 and the current control circuit 1122, a current detecting circuit (current detecting portion) 1121 and a voltage detecting circuit (voltage detecting portion) 1123 are connected, respectively. The secondary transfer power source E2 is capable of applying, to the inner secondary transfer roller 1062 in a switching manner, a voltage subjected to the constant-voltage control and the voltage subjected to the constant-current control under the control of the controller 1100 as schematically shown in FIG. 26. Incidentally, the constant-voltage control is control so that an output of the power source is adjusted so that a voltage applied to an application object becomes substantially constant at a target voltage. Further, the constant-current control is control such that an output of the power source is adjusted so that a current supplied to a supply object becomes substantially constant at a target current.

The controller 1100 integrally controls the respective portions of the image forming apparatus 1001 and causes the image forming apparatus 1001 to perform a sequence operation. To the image forming apparatus 1001, an image forming signal (image data, control instruction) and the like are inputted from an image reading device (not shown) or an external host device (external equipment) 1200. In accordance with this image forming signal, the controller 1100 controls the respective portions of the image forming apparatus 1001 and causes the image forming apparatus 1001 to execute an image forming operation.

Here, the image forming apparatus 1001 executes the job (image output operation, print job) which is series of operations to form and output an image or images on a single or a plurality of recording materials P started by one start instruction. The job includes an image forming step, a pre-rotation step, a sheet (paper) interval step in the case where the images are formed on the plurality of recording materials P, and a post-rotation step in general. The image forming step is a period in which formation of an electrostatic image for the image actually formed and outputted on the recording material P, formation of the toner image, primary transfer of the toner image and secondary transfer of the toner image are carried out, in general, and during image formation (image forming period) refers to this period. Specifically, timing during the image formation is different among positions where the respective steps of the formation of the electrostatic image, the toner image formation, the primary transfer of the toner image and the secondary transfer of the toner image are performed. The pre-rotation step is a period in which a preparatory operation, before the image forming step, from an input of the start instruction unit the image is started to be actually formed. The sheet interval step (recording material interval step, image interval step) is a period corresponding to an interval between a recording material P and a subsequent recording material P when the images are continuously formed on a plurality of recording materials P (continuous image formation). The post-rotation step is a period in which a post-operation (preparatory operation) after the image forming step is performed. During non-image formation (non-image formation period) is a period other than the period of the image formation (during image formation) and includes the periods of the pre-rotation step, the sheet interval step, the post-rotation step and further includes a period of a pre-multi-rotation step which is a preparatory operation during turning-on of a main switch (power source) of the image forming apparatus 1001 or during restoration from a sleep state.

3. Constitution of Inner Secondary Transfer Roller and Output Secondary Transfer Roller The output secondary transfer roller 1064 includes an axial core (electroconductive shaft) having electroconductivity and an elastic layer (output between layer) formed at an outer periphery of the axial core is a cylindrical member comprising an electroconductive member such as stainless steel. The elastic layer is formed with, for example, a 4 mm-thick sponge-like or solid elastic material, and is constituted so that an entire diameter (roller diameter) of the output secondary transfer roller 1064 is about 20 mm. As the elastic material constituting the elastic layer, it is possible to use elastomers such as NBR (acrylonitrile-butadiene rubber) and EPDM (ethylene propylene diene monomer (rubber)), and other synthetic resin materials. To the elastic layer, an ion-conductive agent such as a metal complex is added, and thus proper electroconductivity (semiconductivity) is imparted. Incidentally, as the ion-conductive agent, a semiconductive polymer such as epichlorohydrin may be kneaded in a base material of the elastic layer, or the semiconductive polymer and the metal complex or the like may be used in combination. Further, an electron-conductive agent such as carbon black or a metal oxide, and the ion-conductive agent may be dispersed in the elastic layer.

The inner secondary transfer roller 1062 opposing the output secondary transfer roller 1064 while sandwiching the intermediary transfer belt 1056 therebetween includes an about 0.5 mm-thick elastic layer comprising an elastic material such as EPDM, and an axial core made of metal. The inner secondary transfer roller 1062 is constituted so that a diameter (roller diameter) is about 16 mm, for example. To the elastic layer, the above-described ion-conductive agent or the electroconductive agent such as the carbon black is added, and thus proper electroconductivity is imparted. Further, hardness of the elastic layer may suitably be set at, for example, 70° as measured by Asker-C measuring device.

4. Secondary Transfer Power Source

Next, an electric constitution of the secondary transfer roller N2 will be further described. FIG. 27 is a schematic view for illustrating the electrical constitution of the secondary transfer portion N2.

As shown in FIG. 27, the image forming apparatus 1001 is provided with the secondary transfer power source E2 as a high-voltage power source for supplying electric power to the inner secondary transfer roller 1062. The secondary transfer power source E2 for forming a transfer electric field at the secondary transfer portion N2 is a constant-voltage source for applying, to the inner secondary transfer roller 1062, a voltage of the same polarity (positive in this embodiment) as the normal charge polarity of the toner. The secondary transfer power source E2 is capable of subjecting an output voltage to the constant-voltage control so that a magnitude of the voltage (transfer voltage) applied to the secondary transfer portion N2 approaches a target value. Further, the secondary transfer power source E2 is capable of subjecting an output voltage to the constant-current control so that a magnitude of a current (transfer current) flowing between the intermediary transfer belt 1056 and the output secondary transfer roller 1064 in the secondary transfer portion N2 approaches a target value. In this embodiment, as the control of the secondary transfer voltage, it is possible to carry out the constant-voltage control and the constant-current control, but basically, the constant-voltage control is used as specifically described later.

The secondary transfer power source E2 is constituted so as to be capable of measuring the magnitudes of the transfer current and the transfer voltage (current detecting circuit 1121, voltage detecting circuit 1123). As specifically described later the controller 1110 makes reference to the transfer current measured under a condition such that for example, the recording material P is absent in the secondary transfer portion N2 before the image forming operation, and sets an applied voltage by the secondary transfer power source during the image formation depending on a kind (basis weight, material, or the like) of the recording material P. Incidentally, in this embodiment, a maximum output (maximum value of an applicable voltage in terms of absolute value) of the secondary transfer power source E2 is set at 6500 [V].

5. Reason why Basic Operation is Constant-Voltage Control

Next, the reason why a basic operation of the secondary transfer voltage is the constant-voltage control will be described.

As regards a current flowing through the secondary transfer portion N2 under application of the secondary transfer voltage to the inner secondary transfer roller 1062, a current flowing through a non-sheet-passing portion through which the recording material P does not pass and a current flowing through a sheet-passing portion through which the recording material P passes exist. Further, depending on a size of the recording material P, a ratio between the current flowing through the non-sheet-passing portion and the current flowing through the sheet-passing portion changes. Further, depending on an electric resistance value of the recording material P, a phenomenon that the ratio between the current flowing through the non-sheet-passing portion and the current flowing through the sheet-passing portion fluctuate occurs. For that reason, in the case where the basic operation of the secondary transfer voltage is the constant-current control, it is very difficult to stabilize the current flowing through the recording material P. Therefore, in this embodiment, the basic operation of the secondary transfer voltage is the constant-voltage control, so that the current flowing through the recording material P is stabilized. further, as specifically described later, in the case where low-resistance paper is used in the image formation, the secondary transfer voltage is subjected to the constant-current control, so that even when flowing of the current into a contact member contacting the recording material P at a portion other than the secondary transfer portion N2, a stabilized secondary transfer property can be obtained.

6. Secondary Transfer ATVC

The image forming apparatus 1001 of this embodiment executes secondary transfer ATVC which is control for determining, before the image formation, a target value (target voltage of the constant-voltage control) of the secondary transfer voltage during the image formation (hereinafter, this control is also simply referred to as “ATVC”).

First, a basic concept to an optimum value of a voltage applied to the secondary transfer portion N2 will be described.

In order to supply a target current Itarget to the secondary transfer portion N2, it is desired that a total impedance relating to the secondary transfer is grasped and a voltage with an optimum value is applied to the secondary transfer portion N2. As an assumed total impedance relating to the secondary transfer, an electric resistance of the inner secondary transfer roller 1062, an electric resistance of the intermediary transfer belt 1056, an electric resistance of the recording material P, and an electric resistance of the output secondary transfer roller 1064 are included. The ATVC is carried out for the purpose of providing an optimum constant-voltage output value for this total impedance.

Next, the ATVC will be described. When job information is inputted, the controller 1110 carries out the ATVC. The ATVC is carried out after drive of the photosensitive drum 1050, the intermediary transfer belt 1056, and the like is stabilized and before the recording material P is conveyed to the secondary transfer portion N2 (during a pre-rotation step, during a pre-multi-rotation step). When the ATVC is started, the controller 1110 causes the secondary transfer power source E2 to apply a voltage, subjected to the constant-current control by the current control circuit 1122, to the inner secondary transfer roller 1062 so that the target current Itg set in advance is supplied to the secondary transfer portion N2 (inner secondary transfer roller 1062). The controller 1110 causes the voltage detecting circuit 1123 to detect a value of the voltage generated in the secondary transfer power source E2 (applied to the inner secondary transfer roller 1062) at this time. That is, the voltage detecting circuit 1123 detects the value of the voltage generated in the secondary transfer power source E2 (applied to the inner secondary transfer roller 1062) in a state in which the target current Itg is supplied to the inner secondary transfer roller 1062 by the constant-current control. This detection of the voltage value is made for a time corresponding to about one-full circumference of the output secondary transfer roller 1064, for example. The controller 1110 calculates an average of detection voltages in the above-described time, and causes the memory 1112 to store the calculated average as Vb (base voltage). This Vb corresponds to a secondary transfer portion part voltage (transfer voltage corresponding to the electric resistance of the secondary transfer portion N2), and changes depending on an environment or a use history of the output secondary transfer roller 1064 or the like.

Thereafter, when image formation is started and the recording material P enters the secondary transfer portion N2, the controller 1110 causes the secondary transfer power source E2 to apply a voltage, subjected to the constant-voltage control by the voltage control circuit 1121, to the inner secondary transfer roller 1062 so that a voltage value Vtr=Vb+Vp of a voltage obtained by adding a recording material part voltage Vp set on the basis of a kind of the recording material P (herein, also referred to as a "paper kind") or an environment, to the above-described base voltage Vb is applied to the secondary transfer portion N2 (inner secondary transfer roller 1062). That is, when the recording material P passes through the secondary transfer portion N2, the above-described voltage value Vtr is outputted from the secondary transfer power source E2 in a constant-voltage output manner. By carrying out such control, for example, even in the case where the electric resistance of the output secondary transfer roller 1064 or the like is changed due to a temperature/humidity environment or repetitive use, a proper secondary transfer voltage can be applied to the secondary transfer portion N2.

Incidentally, the image forming apparatus 1001 is provided with, for example, an unshown temperature sensor and an unshown humidity sensor for detecting a temperature and a humidity, respectively, inside the image forming apparatus 1001, as an environment detecting means for detecting at least one of the temperature and the humidity in at least one of an inside and an outside of the image forming apparatus 1001. Further, in the memory 1112, information indicating a relationship, acquired in advance, between the environmental information (such as ambient water content) and the target current Itg is stored as table data or the like. On the basis of this information, the controller 1110 is capable of acquiring the target output Itg corresponding to a detection result of the environmental information. The controller 1110 is capable of acquiring ambient water content (absolute humidity) on the basis of the environmental information (temperature, humidity) detected by the temperature sensor and the humidity sensor. The reason why the target current Itg is changed depending on the environmental information is that an electric charge amount of the toner is changed by the environment or the like.

Further, in the memory 1112, information indicating a relationship, acquired in advance, between the environmental information (such as ambient water content) for each kind of the recording material P and the recording material part voltage Vp is stored as table data or the like. On the basis of this information, the controller 1110 is capable of acquiring the recording material part voltage Vp corresponding to information on the recording material P included in the job information and to a detection result of the environmental information. The controller 1110 is capable of acquiring ambient water content (absolute humidity) on the basis of the environmental information (temperature, humidity) detected by the temperature sensor and the humidity sensor. The recording material part voltage Vp may be set so as to be different depending on information (thickness, basis weight or the like) relating to the thickness of the recording material P, information (whether or not the recording material P is coated paper or the like) relating to a surface property of the recording material P, or the like information.

Here, in this embodiment, the job information acquired by the controller 1110 includes the image information and the information on the recording material P. The information on the recording material P includes information on the kind (paper kind) of the recording material P used in the image formation, information on a size (width, length) of the recording material P, and the like information.

Incidentally, the kind (paper kind) of the recording material P includes attributes (so-called paper kind category) based on general characteristics such as plain paper, thick paper, thin paper, glossy paper, coated paper, special paper (metallized paper), and any distinguishable information on the recording material P, such as manufacturer, brand, product number, basis weight, thickness. The job information is inputted, to the controller 1110, from an operating portion 1130 (FIG. 2) provided on the image forming apparatus 1001 or an external device 200 such as a personal computer connected to the image forming apparatus 1001. The operating portion 1130 is constituted by including an input portion such as keys as an inner means, and a display portion such as a liquid crystal panel as a display means. Further, the operating portion 1130 may also be constituted as a touch panel having functions of the display portion and the input portion.

7. Change of Control of Secondary Transfer Voltage by Paper Kind

The secondary transfer voltage is generally controlled on the premise that all the currents flow from the transfer roller to the opposite roller which are disposed opposite to each other through the intermediary transfer belt. However, in the case where low-resistance paper such as a recording material including a metal layer is used for the image formation, a phenomenon such that a current which should be originally flowed into the opposite roller flows through the recording material into the contact member, such as the conveying roller or the guiding member, contacting the recording material existing in a recording material conveying passage occurs. In the case where the current from the transfer belt flows into the member other than the opposite roller, a total impedance relating to the secondary transfer changes, and therefore, in the case where the secondary transfer voltage is subjected to the constant-voltage control, the current value largely fluctuates in some instances.

Therefore, in this embodiment, in the case where low-resistance paper set in advance as the recording material P with which flowing of the current into the contact member, such as a conveying roller or a guiding member, through the recording material P occurs is used in the image formation, the controller 1110 executes an operation for switching the control of the secondary transfer voltage from the constant-voltage control to the constant-current control.

FIG. 28 is a flow chart showing an outline of a procedure of the job in this embodiment. Using FIG. 28, switching of the control of the secondary transfer voltage performed depending on a paper kind setting condition in this embodiment will be described.

For example, when a job start instruction is inputted by an operator through the operating portion 1130, the controller 1110 acquires the job information including the information on the recording material P (S1101). FIG. 29 is a schematic view showing an example of a setting screen (paper kind setting screen) of the recording material P which is displayed at, for example, the operating portion 1130 and in which the kind, the size, and the like of the recording material P are set. For example, as shown in FIG. 29, a recording material P setting screen 1140 includes an accommodating portion display portion 1141 for displaying a recording material accommodating portion, a kind setting portion 1142 for setting the kind (corresponding to the paper kind category) of the recording material P, a size setting portion 1143 for setting the size of the recording material P, and the like. Further, the recording material P setting screen 1140 includes a recording material selecting portion 1144 for selecting a corresponding recording material P as the recording material P used for the image formation, a confirmation portion (OK button) 1145 for confirming the setting, a canceling portion (cancel button) 1146 for canceling a change in setting. The operator such as a user or a service person is capable of making setting in the controller 1110 by inputting (including selection from a plurality of choices) the kind and the size of the recording material P in the kind setting portion 1142 and the size setting portion 1143 for each of the recording material accommodating portions (cassette 1014 and the like). The controller 1110 causes the memory 1112 to store information such as the kind or the size of the recording material P for each of selected recording material accommodating portions. Further, the operator operates the recording material selecting portion 1144 and thus is capable of setting, in the controller 1110, the recording material P used for the image formation (specifically, information on the kind and the size of the recording material P). Further, the operator operates the OK button 1145 and thus is capable of confirming the change or the selection made in the kind setting portion 1142, the size setting portion 1143, the recording material selecting portion 1144, and the like. Further, the operator operates the cancel button 1146 and thus is capable of canceling the change or the selection made in the kind setting portion 1142, the size setting portion 1143, the recording material selecting portion 1144, and the like.

Next, the controller 1110 checks the paper kind setting of the recording material P selected for the job by the operator and discriminates whether or not the paper kind setting under a condition in which the recording material P including the metal layer as predetermined low-resistance paper is conveyed (S1102). Then, in the case where the controller 1110 discriminated that the predetermined low-resistance paper is selected ("Yes"), the controller 1110 determines that the control of the secondary transfer voltage during the image formation (during the secondary transfer) is the constant-current control (S1103). On the other hand, in the case where a condition other than the above-described condition is met, i.e., in the case where the controller 1110 determines that the predetermined low-resistance paper is not selected ("No"), the controller 1110 determines that the control of the secondary transfer voltage during the image formation (during the secondary transfer) is the constant-voltage control (S1104). Then, the controller 1110 inputs a signal to the secondary transfer power source E2 so that the secondary transfer voltage is applied under control of the secondary transfer voltage (under the constant-current control or the constant-voltage control) determined in S1103 or S1104, and then the image forming operation is executed (S1105). Thereafter, when formation of all the images designated in the job is ended, the controller 1110 ends the operation of the job (S1106).

Incidentally, the setting of the target current Itg of the secondary transfer voltage will be further described later.

Further, in FIG. 28, although illustration is omitted, every formation of the image on a single recording material P, the paper kind setting of a subsequent recording material P on which the image is to be formed is checked, and then depending on the paper kind of the associated recording material P in a job in which a plurality of paper kinds exist in mixture, the control of the secondary transfer voltage can be set at the constant-current control or the constant-voltage control.

Incidentally, as a representative paper kind section in which the control of the secondary transfer voltage is the constant-voltage control, it is possible to cite thin paper, plain paper, thick paper, coated paper, colored paper, Japanese paper, recycled paper, tab paper, postcard, envelope, embossed paper, and the like. Further, as a representative paper kind section desired to switch the control of the secondary transfer voltage to the constant-current control, it is possible to cite special paper (such as metallized paper) including a metal layer, paper containing carbon black, and the like.

8. Effect on Transfer Property During Passing of Low-Resistance Paper Depending on Energization Portion Next, the reason why in this embodiment, an energization type (inner energization type in which the voltage is applied to the inner secondary transfer roller 1062 and the output secondary transfer roller 1064 is electrically grounded is employed will be described.

FIG. 30 is a schematic view showing a current path when the secondary transfer voltage is applied from the output secondary transfer roller 1064 side in the case where the low-resistance paper is used in the image formation (herein, also referred to as "during low-resistance paper passing"). In this embodiment, the case where metallized paper including a metal layer on one side thereof is used as the low-resistance paper and an image is formed on the metal layer-side surface will be described as an example. Incidentally, the "metallized paper" is a recording material which is prepared through vacuum deposition by providing the metal layer on a surface of a base material formed with wood pulp paper (including old (recycled) paper) and to which a metallic decoration effect is imparted. In this case, the current flows from the output secondary transfer roller 1064 into, for example, the registration roller pair 1011 through the metal layer of the recording material P. At this time, a current path to the toner layer is not formed, and therefore, transfer of the toner in the neighborhood of the secondary transfer portion N2 is not performed.

FIG. 31 is a schematic view showing a current path when the secondary transfer voltage is applied from the inner secondary transfer roller 1062 side during the low-resistance paper passing (during passing of the metallized paper including the metal layer on one side. Also, in this case, similarly as in the case of FIG. 30, the current flows from the inner secondary transfer roller 1062 to, for example, the registration roller pair 1011 through the metal layer surface of the recording material P. However, in the case where the secondary transfer voltage is applied from the inner secondary transfer roller 1062 side, the current path to the toner layer is formed, and therefore, transfer of the toner onto the recording material P is performed.

Incidentally, also, in the case where the image is formed on the base material side formed with paper consisting of the recording material P including the metal layer, the electric resistance of the recording material P is low as a whole and a portion where the metal layer is exposed at an end surface or the like exists, so that as regards the flowing-into of the current, there is a tendency similar to the above-described tendency. Further, the recording material P including the metal layer is coated with a material (for example, a resin material) other than the metal on a surface of the metal layer in some instances, but in that case, as regards the flowing-in of the control, there is a tendency similar to the above-described tendency.

Further, the contact member which exists in the conveying path of the recording material P and which contacts the recording material P simultaneously with the secondary transfer portion N2 (intermediary transfer belt 1056, output secondary transfer roller 1064) is not limited to the registration roller pair 1011 in the above-described example. As the contact member, it is possible to cite the following members. The guiding member (such as a pre-transfer guiding member 1112) for guiding the recording material P on a side upstream or downstream of the secondary transfer portion N2 with respect to a recording material P feeding (conveying) direction, a charge-removing member (not shown) provided for removing excessive electric charges of the recording material P on a side downstream of the secondary transfer portion N2, a conveying belt (not shown) for conveying the recording material P on the side downstream of the secondary transfer portion N2, and the like member are cited. Further, due to various factors, such as a conveying (feeding) position of the recording material P, rigidity of the recording material P, and the like, a contact status of the member contacting the recording material P changes in some instances. Further, as described above, in the case where the secondary transfer voltage is applied under the constant-voltage control, every change in portion to which the recording material P is contacted, the flowing current largely changes in some instances. For that reason, the transfer current flowing into the toner is not stabilized, and therefore, it is hard to maintain a good transfer property in some instances.

9. Effect by Switching to Constant-Current Control During Low-Resistance Paper Passing Next, an effect of switching of the control of the secondary transfer voltage from the constant-voltage control to the constant-current control during the low-resistance paper passing will be described.

FIG. 32 is a graph showing an applied voltage, a current flowing into the inner secondary transfer roller 1062, and a current flowing into the current secondary transfer roller 1064 in the case where the control of the secondary transfer voltage during the low-resistance paper passing is the constant-voltage control ("during constant-voltage application (constant-voltage control)". First, it is understood that substantially no current flows into the output secondary transfer roller 1064. This would be considered because the current supplied to the inner secondary transfer roller 1062 flows into the contact member, such as the registration roller pair 1011 or the conveying guide, contacting the recording material P at a portion other than the secondary transfer portion N2. At this time, a change in impedance occurs due to a change of the portion to which the recording material P is contacted. As a result, the current flowing into the inner secondary transfer roller 1062 is not stabilized and is largely fluctuated, and therefore, formation of an optimum electric field to the toner is not made, so that there is a liability that a secondary transfer property becomes unstable and thus an image defect such as a lowering in image density occurs.

On the other hand, FIG. 33 is a graph showing an applied voltage, a current flowing into the inner secondary transfer roller 1062, and a current flowing into the current secondary transfer roller 1064 in the case where the control of the secondary transfer voltage during the low-resistance paper passing is the constant-current control ("during constant-current application (constant-current control)". First, it is understood that substantially no current flows into the output secondary transfer roller 1064. This would be considered because similarly as during the constant-voltage application, the current supplied to the inner secondary transfer roller 1062 flows into the contact member, such as the registration roller pair 1011 or the conveying guide, contacting the recording material P at a portion other than the secondary transfer portion N2. However, similarly as described above, the change in impedance occurs due to the change of the portion to which the recording material P is contacted, but the secondary transfer voltage is subjected to the constant-current control, and therefore, a certain current is continuously supplied to the inner secondary transfer roller 1062. For that reason, even when the above-described flowing-in of the current occurs, it becomes possible to continuously supplying the certain current to the toner. As a result, even when during the low-resistance paper passing, the flowing of the transfer current into the contact member contacting the recording material P at the portion other than the secondary transfer portion N2, the secondary transfer property is maintained, so that good image formation can be carried out.

10. Current Value During Execution of Constant-Current Control

In the case where normal paper (typically, plain paper) is used in the image formation, if the secondary transfer voltage is subjected to the constant-current control, in order to stabilize the current supplied to the paper, the following is desired. That is, it is desired that a relationship between a current flowing through a non-sheet-passing portion and a current flowing through a sheet-passing portion of the output secondary transfer roller 1064 during the image formation (during the secondary transfer is assumed and then a target control is set at an optimum current value. As an electric model relating to the secondary transfer in this case, a parallel circuit as shown in FIG. 34 is assumed. In the case of a paper size almost equivalent to a size of the output secondary transfer roller 1064 with respect to a longitudinal direction (rotational axis direction, direction substantially perpendicular to the recording material P feeding direction), a current flowing-in amount into the non-sheet-passing portion is small. On the other hand, as shown in FIG. 35, it is assumed that as the recording material P becomes small-size paper and high-resistance paper, the current flowing-in amount into the non-sheet-passing portion becomes large. For that reason, during the normal paper passing, in order to supply an optimum current to the recording material P, it is desired that the target current Itg is made higher with a decreasing length of the recording material P (smaller-size paper) with respect to the longitudinal direction of the output secondary transfer roller 1064. Further, during the normal paper passing, in order to apply the optimum current to the recording material P, it is desired that the target current Itg is made higher with an increasing electric resistance of the recording material P (higher-resistance paper).

On the other hand, in the case where the low-resistance paper (typically, the recording material P including the metal layer) is used in the image formation, a situation is different from the above-described situation. That is, during the low-resistance paper passing, as described above, a phenomenon such that the current which should originally flows into the output secondary transfer roller 1064 flows into various contact members, for example, the registration roller pair 1011 through the recording material P, existing in the feeding path of the recording material P occurs. Thus, in the case of a state in which the current flows into the contact members, as shown in FIG. 36, impedance relating to the secondary transfer is in a state the impedance is constituted only by electric resistances of the contact members such as the inner secondary transfer roller 1062, the intermediary transfer belt 1056, the recording material P, and the registration roller pair 1011. In the case where the flowing of the current into the output secondary transfer roller 1064 does not occur but the flowing of the current into the contact member such as the registration roller pair 1011 occurs, the current flowing amount into the recording material P becomes larger with a smaller paper size. For that reason, during the low-resistance paper passing, different from the above-described control during the normal paper passing, in order to supply the optimum current to the recording material P, it is desired that the following operation is performed. That is, it is desired that the target current Itg is made low since the current flowing into the paper itself becomes higher with a shorter length of the recording material P (smaller-size paper) with respect to the longitudinal direction of the output secondary transfer roller 1064.

Therefore, in this embodiment, in the case where the control of the secondary transfer voltage for the low-resistance paper is subjected to the constant-current control, the controller 1110 carries out control so that the target current Itg (absolute value) is made lower with a shorter length of the recording material P (smaller-size paper) with respect to the longitudinal direction of the output secondary transfer roller 1064. Information indicating this relationship between the size of the recording material P and the target output Itg is acquired in advance and is stored in the memory 1112. Further, the controller 1100 is capable of acquiring the size information of the recording material P from the job information as described above.

Thus, in this embodiment, the image forming apparatus 1001 includes the image bearing member 1050 for bearing the toner image, the intermediary transfer belt 1056 onto which the toner image is transferred from the image bearing member 1050, the outer roller 1064 for forming the transfer portion N2 in contact with the outer peripheral surface of the intermediary transfer belt 1056, the inner roller 1062 disposed opposite to the outer roller 1064 while sandwiching the intermediary transfer belt 1056 therebetween and for forming the transfer portion N2 in cooperation with the outer roller 1064 in contact with the inner peripheral surface of the intermediary transfer belt 1056, and the power source E2 for applying, to the inner roller 1062, the transfer voltage for transferring the toner image from the intermediary transfer belt 1056 onto the recording material P passing through the transfer portion N2, and the controller 1110 carries out control in a manner such that the transfer voltage when the toner image is transferred onto the plain paper as the recording material P is subjected to the constant-voltage control so that the voltage applied to the inner roller 1062 by the power source E2 becomes a target value and that the transfer voltage when the toner image is transferred onto the recording material P including the metal layer is subjected to the constant-current control so that the current supplied to the inner roller 1062 by the power source E2 becomes a target value. In this embodiment, the image forming apparatus 1001 includes the input means (such as the operating portion 1130 or the input/output portion for inputting the signal from the external device 1200 to the controller 1110) for inputting, to the controller 1110, recording material information on the recording material P onto which the toner image is transferred, depending on the operation by the operator, and the controller 1110 carries out control so as to execute the constant-current control of the transfer voltage on the basis of the recording material information inputted by the input means 1130. Further, in this embodiment, in the case where the toner image is transferred onto the predetermined recording material of which length is a first length or a second length shorter than the first length in a direction substantially perpendicular to a feeding direction of the predetermined recording material, the controller carries out control so that the target value in the constant-current control in a case that the length of the predetermined recording material is the second length is smaller than the target value in the constant-current control in a case that the length of the predetermined recording material is the first length.

As described above, according to this embodiment in the case where the normal paper (typically, the plain paper) is used in the image formation, the secondary transfer voltage is subjected to the constant-voltage control, so that it becomes easy to obtain a stable transfer property irrespective of the size of the recording material P or the presence or the absence of the toner (the image to be formed). On the other hand, in the case where the low-resistance paper (typically, the recording material P including the metal layer) is used in the image formation, the secondary transfer voltage is subjected to the constant-current control, so that the influence of the flowing-in current changing depending on the contact status of the recording material P to the contact member contacting the recording material P at the portion other than the secondary transfer portion N2 can be suppressed. By this, even in the case where the low-resistance paper is used in the image formation, the current is stably supplied to the toner at the secondary transfer portion N2, so that the stable transfer property can be obtained. Thus, according to this embodiment, it is possible to improve the transfer property for the low-resistance paper which can cause flowing of the transfer current into the member existing in the conveying passage of the recording material P.

Embodiment 4

Next, another embodiment of the present invention will be described.

The basic structure and operation of the image forming apparatus of this embodiment are the same as those of the image forming apparatus of the embodiment 3. Therefore, as to the image forming apparatus of this embodiment, elements including the same or corresponding functions or structures as those of the image forming apparatus of the embodiment 3 are denoted by the same reference numerals or symbols as those of the embodiment 3, and detailed description thereof is omitted.

In this embodiment, on the basis of a detection result of the low-resistance paper by the detecting means, in the case where the low-resistance paper satisfying a predetermined condition is used in the image formation, the controller 1110 executes an operation for switching the control of the secondary transfer voltage from the constant-voltage control to the constant-current control.

For example, in this embodiment, on the basis of a detection result of information on the electric resistance value of the recording material P by a resistance detecting means, the controller 1110 switches the control of the secondary transfer voltage from the constant-voltage control to the constant-current control in the case where the low-resistance paper satisfying the predetermined condition is used in the image formation. As the resistance detecting means, the secondary transfer power source E2 (current detecting circuit 1121, voltage detecting circuit 1123) can be used. That is, in this embodiment, the controller 1110 is capable of detecting information on the electric resistance value of the recording material P from the relationship between the voltage value and the current value acquired by applying the voltage from the secondary transfer power source E2 to the inner secondary transfer roller 1062 when the recording material P passes through the secondary transfer portion N2.

Thus, in this embodiment, using the secondary transfer power source, from the above-described relationship between the current value and the voltage value, the controller 1110 is capable of indirectly detecting the electric resistance value. The relationship between the current value and the voltage value may be acquired by detecting either one of a current value when a predetermined voltage is applied or a voltage value when a predetermined current is supplied.

For example, a current value when a predetermined voltage is applied to the inner secondary transfer roller 1062 when the recording material P is absent in the secondary transfer portion N2 and a current value when the predetermined voltage is applied to the inner secondary transfer roller 1062 when the recording material P passes through the secondary transfer portion N2 are subtracted from each other. By this, it is possible to acquire the electric resistance value of the recording material P. Further, in the case where the electric resistance value of the recording material P is a predetermined threshold or less, the control of the secondary transfer voltage is switched from the constant-voltage control to the constant-current control. For example, in the case where the electric resistance value of the recording material P in the secondary transfer portion N2 is detected as being $1\times10^{6}\Omega$ or less, the control of the secondary transfer voltage can be switched from the constant-voltage control to the constant-current control. However, the above-described threshold is not limited to $1\times10^{6}\Omega$, but can be appropriately set depending on the electric resistance value of the low-resistance paper described to suppress the image defect due to the flowing of the current into the contact member, on the basis of flows from a constitution of the apparatus or the like.

Further, when the flowing of the current into the contact member through the low-resistance paper (typically, the recording material P including the metal layer) occurs, the current (absolute value) of the current detected in the case where the predetermined voltage is applied to the inner secondary transfer roller 1062 becomes higher when the recording material P is present in the secondary transfer portion N2 than when the recording material P is absent in the secondary transfer portion N2. In the case where the normal paper (typically, the plain paper) is used, the current (absolute value) detected in the case where the predetermined voltage is applied to the inner secondary transfer roller 1062 is lower when the recording material P is present in the secondary transfer portion N2 than when the recording material P is absent in the secondary transfer portion N2. For that reason, as the information on the electric resistance value of the recording material P, instead of discrimination that the recording material P is the low-resistance paper through acquisition of the electric resistance value itself, the following discrimination can be made. That is, the recording material P can be discriminated as the low-resistance paper in the case where the current value detected in the case where the predetermined voltage is applied when the recording material P is present in the secondary transfer portion N2 is the predetermined threshold or more. Further, the recording material P can be discriminated a the low-resistance paper in the case where the voltage value detected in the case where a predetermined current is supplied when the recording material P is present in the secondary transfer portion N2 is the predetermined threshold or less. Further, the recording material P can be discriminated as the low-resistance paper in the case where the current value detected by applying the predetermined voltage when the recording material P is present in the secondary transfer portion N2 is higher than the current value detected by applying the predetermined voltage when the recording material P is absent in the secondary transfer portion N2. Further, the recording material P can be discriminated as the low-resistance paper in the case where the voltage value detected by supplying the predetermined current when the recording material S is present in the secondary transfer portion N2 is lower than the voltage value detected by supplying the predetermined current when the recording material S is absent in the secondary transfer portion N2.

Here, the detection of the information on the electric resistance value of the recording material P can be made, for example, when a predetermined region (for example, a margin portion) of the recording material P on a leading end side with respect to the feeding direction. In the case where the electric resistance value of the secondary transfer portion N2 when the recording material P is absent in the secondary transfer portion N2 is detected, the detection can be made before the recording material P reaches the secondary transfer portion N2. Further, in the case where the recording material P is discriminated as the low-resistance paper, from a timing during passing of the recording material P through the secondary transfer portion N2, the control of the secondary transfer voltage can be switched from the constant-voltage control to the constant-current control.

Further, when the job is a continuous image forming job in which images are formed on a plurality of recording materials P, from a leading end of the recording material P subsequent to an associated recording material P and later, the control of the secondary transfer voltage can be switched to the constant-current control.

This is effective in the case where it is known from the job information that the recording material P used in the job is not changed in an intermediary portion of the job.

Incidentally, as shown in FIG. 37, detection of the low-resistance paper is not limited to detection of the low-resistance paper by detecting the current flowing through the inner secondary transfer roller 1062 (secondary transfer power source E2) by a current detecting portion 1151 (corresponding to the above-described current detecting circuit 1121).

For example, as shown in FIG. 37, the current flowing into the contact member, such as the registration roller pair 1011, contacting the recording material P at a portion other than the secondary transfer portion N2 is detected by a current detecting portion 152, so that the low-resistance paper can be detected. In this case, for example, the recording material S can be discriminated as the low-resistance paper in the case where the value of the current which is detected by the current detecting portion 1152 and which flows into the contact member becomes a predetermined through or more. Incidentally, in this case, it would be considered that detection is made at a timing when for example, a first recording material P of the job simultaneously contacts the secondary transfer portion N2 and the contact member, and depending on a detection result, the control of the secondary transfer voltage is switched to the constant-current control from for a second recording material P and later.

Further, for example, as shown in FIG. 37, the current flows into the contact member, such as the registration roller pair 1011, contacting the recording material P at the portion other than the secondary transfer portion N2, and a decrease in current flowing into the output secondary transfer roller 1064 is detected by a current detecting portion 1153, so that the low-resistance paper can be detected. In this case, for example, the recording material P can be discriminated as the low-resistance paper in the case where the current flowing into the output secondary transfer roller 1064 detected by the current detecting portion 1153 becomes predetermined threshold or less. Incidentally, it would be considered that the detection timing of this case can be made the same as the detection timing in this embodiment.

Incidentally, in the case where the low-resistance paper is detected and the control of the secondary transfer voltage is automatically switched to the constant-current control, the size of the recording material P is detected by a detecting means and the controller 1110 is capable of changing the target current of the constant-current control depending on the size of the recording material P as described in the embodiment 3. The controller 1110 is capable of acquiring the information on the size of the recording material P on the basis of the job information or the detection result of the sensor for detecting the size of the recording material P. Further, in the methods in the above-described embodiments, instead of or in addition to the detection that the recording material S is the low-resistance paper, by appropriately changing a discrimination condition of a magnitude relationship of the detection result with respect to the threshold, it is also possible to detect that the recording material S is the normal paper (plain paper or the like) (not the low-resistance paper).

Thus, the image forming apparatus 1001 may include the detecting portion 1151 for detecting the current flowing through the inner secondary transfer roller 1062 when the voltage is applied to the inner roller 1062 by the power source E2, and on the basis of the current value detected by the detecting portion 1151 when the recording material P is present in the transfer portion N2, the controller 1110 is capable of carrying out control so that the constant-current control of the transfer voltage is performed. In this case, when the current value detected by the detecting portion 1151 is the predetermined threshold or more, the controller 1110 is capable of carrying out control so that the constant-current control of the transfer voltage is performed. Further, the image forming apparatus 1001 may include the detecting portion 1152 for detecting the current flowing through the contact member 111 contactable to the recording material P at the portion other than the transfer portion N2 when the voltage is applied to the inner roller 1062 by the power source E2, and on the basis of the current value detected by the detecting portion 1152 when the recording material P is present in a position contactable to the transfer portion N2 and the contact member 1111, the controller 1110 is capable of carrying out control so that the constant-current control of the transfer voltage is performed. In this case, when the current value detected by the detecting portion 1152 is the predetermined threshold or more, the controller 1110 is capable of carrying out control so that the constant-current control of the transfer voltage is performed. Further, the image forming apparatus 1001 may include the detecting portion 1153 for detecting the current flowing through the inner secondary transfer roller 1062 when the voltage is applied to the outer roller 1064 by the power source E2, and on the basis of the current value detected by the detecting portion 1153 when the recording material P is present in the transfer portion N2, the controller 1110 is capable of carrying out control so that the constant-current control of the transfer voltage is performed. In this case, when the current value detected by the detecting portion 1153 is the predetermined threshold or less, the controller 1110 is capable of carrying out control so that the constant-current control of the transfer voltage is performed. Further, the image forming apparatus 1001 may include the detecting portion E2 (1121, 1123) for detecting the information on the electric resistance value of the recording material P, and on the basis of the detection result by the detecting portion E2, the controller 1110 is capable of carrying out control so that the constant-current control of the transfer voltage is performed. In this case, when the electric resistance value of the recording material P indicated by the detection result of the detecting portion E2 is the predetermined threshold or less, the controller 1110 is capable of carrying out control so that the constant-current control of the transfer voltage is performed.

As described above, according to this embodiment, an effect similar to the effect of the embodiment 3 can be obtained, and in addition, it is possible to alleviate an operation load on the operator by automatically discriminating the recording material P as being the low-resistance paper.

Other Embodiments

As described above, the present invention was described based on the specific embodiments, but the present invention is not limited to the above-described embodiments.

In this embodiment, the output secondary transfer roller was used, but a secondary transfer belt may be used. That is, a constitution in which the output secondary transfer roller is contacted to the intermediary transfer belt through the secondary transfer belt and forms a secondary transfer portion may be employed.

The constant-current control of the secondary transfer voltage when the toner image is transferred not only includes execution of the constant-current control in a full period in which the recording material passes through the secondary transfer portion but also includes execution of the constant-current control in a part of a period during passing of the recording material through the secondary transfer portion. For example, in a period in which a region (for example, a margin region) other than the image forming region with respect to the recording material feeding direction passes through the secondary transfer portion or in a period in which the first recording material of the job passes through the secondary transfer portion as described in the embodiment 4, a period in which the secondary transfer voltage is subjected to the constant-voltage control may be provided.

Further, the operation performed at the operating portion of the image forming apparatus in the above-described embodiments may also be performed in the external device such as a personal computer connected to the image forming apparatus.

Further, in the embodiment 4, the method for discriminating the low-resistance paper on the basis of the electric resistance value detected at the secondary transfer portion as described, but a method for discriminating the low-resistance paper from a media discriminating reader or a media brand may also be used.

Further, the image forming apparatus is not limited to the image forming apparatus capable of forming a full-color image, but may also be an image forming apparatus capable of forming only a monochromatic (white/black or monocolor) image. Further, the image forming apparatus may also be one of image forming apparatuses for various uses, such as printers, various printing machines, copying machines, facsimile machines, multi-function machines, and the like.

According to the present invention, simply without increasing the operation load on the operator, it becomes possible to set the transfer voltage control advantageous in transfer property to the low-resistance paper capable of causing the flowing of the transfer current into the member existing in the recording material conveying path.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-130820 filed on Aug. 18, 2022, and 2022-130821 filed on Aug. 18, 2022, which are hereby incorporated by reference herein in their entirety.

What is claimed is:

1. An image forming apparatus comprising:

an image bearing member configured to bear a toner image;

a rotatable endless intermediary transfer belt configured to receive the toner image transferred from the image bearing member;

an inner roller configured to form a transfer portion in contact with an inner peripheral surface of the intermediary transfer belt;

an outer roller provided so as to nip the intermediary transfer belt between the out roller and the inner roller and configured to form the transfer portion in cooperation with the inner roller;

a power source configured to apply, to the inner roller, a transfer voltage for transferring the toner image onto a recording material;

a detecting portion configured to detect a value of a current supplied when a voltage is applied to the inner roller by the power source; and a controller capable of carrying out control so that an operation in an adjusting mode in which a chart prepared by transferring a plurality of test images onto a recording material under application of a plurality of test voltages to the inner roller by the power source is formed is executed to adjust the transfer voltage, wherein on the basis of a result of detection by the detecting portion when the voltage is applied to the inner roller by the power source so as to form the chart on a recording material of a predetermined kind in the operation in the adjusting mode, the controller determines whether the transfer voltage when the toner image is transferred onto the recording material of the predetermined kind is subjected to constant-voltage control so that the voltage applied to the inner roller by the power source becomes a target value or is subjected to constant-current control so that a current supplied to the inner roller by the power source becomes a target value.

2. An image forming apparatus according to claim 1, wherein on the basis of a result of detection by the detecting portion when there is no recording material in the transfer portion and a result of detection by the detecting portion when the recording material of the predetermined kind exists in the transfer portion in the operation in the adjusting mode, the controller determines whether the transfer voltage when the toner image is transferred onto the recording material of the predetermined kind is subjected to the constant-voltage control or the constant-current control.

3. An image forming apparatus according to claim 2, wherein the controller determines that the transfer voltage when the toner image is transferred onto the recording material of the predetermined kind is subjected to the constant-voltage control in a case that a value of a current detected by the detecting portion when a voltage of a predetermined value is applied to the inner roller when the toner image is transferred onto the recording material of the predetermined kind is less than a value of a current detected by the detecting portion when the voltage of the predetermined value is applied to the inner roller when there is no recording material in the transfer portion, and wherein the controller determines that the transfer voltage when the toner image is transferred onto the recording material of the predetermined kind is subjected to the constant-current control in a case that the value of the current detected by the detecting portion when a voltage of a predetermined value is applied to the inner roller when the toner image is transferred onto the recording material of the predetermined kind is greater than a value of a current detected by the detecting portion when the voltage of the predetermined value is applied to the inner roller when there is no recording material in the transfer portion.

4. An image forming apparatus according to claim 1, wherein in a case that the controller determines that the transfer voltage when the toner image is transferred onto the recording material of the predetermined kind is subjected to the constant-current control, the controller carries out control so that a target value in the constant-current control is a predetermined value set in advance.

5. An image forming apparatus according to claim 1, wherein in a case that the controller determines that the transfer voltage when the toner image is transferred onto the recording material of the predetermined kind is subjected to the constant-current control, the controller carries out control so that a target value in the constant-current control is a value set on the basis of a result of detection by the detecting portion when the test voltages are applied to the inner roller in the operation in the adjusting mode.

6. An image forming apparatus according to claim 1, wherein in a case that the controller determines that the transfer voltage when the toner image is transferred onto the recording material of the predetermined kind is subjected to the constant-current control, the controller carries out control so that a target value in the constant-current control is a value set on the basis of a result of detection, of a plurality of results of detection by the detecting portion, excluding at least one result of detection out of a predetermined range when the test voltages are applied to the inner roller in the operation in the adjusting mode.

7. An image forming apparatus comprising:

an image bearing member configured to bear a toner image;

a rotatable endless intermediary transfer belt configured to receive the toner image transferred from the image bearing member;

an inner roller configured to form a transfer portion in contact with an inner peripheral surface of the intermediary transfer belt;

an outer roller provided so as to nip the intermediary transfer belt between the outer roller and the inner roller and configured to form the transfer portion in cooperation with the inner roller;

a power source configured to apply, to the inner roller, a transfer voltage for transferring the toner image onto a recording material; and a controller configured to carry out control so that a voltage applied to the inner roller by the power source is subjected to constant-voltage control so as to become a target value in a case that the toner image is transferred onto plain paper and so that a current supplied to the inner roller by the power source is subjected to constant-current control so as to become a target value in a case that the toner image is transferred onto a predetermined recording material including a metal layer, wherein in the case that the toner image is transferred onto the predetermined recording material of which length is a first length or a second length shorter than the first length in a direction substantially perpendicular to a feeding direction of the predetermined recording material, the controller carries out control so that the target value in the constant-current control in a case that the length of the predetermined recording material is the second length is lower than the target value in the constant-current control in a case that the length of the predetermined recording material is the first length.

8. An image forming apparatus according to claim 7, further comprising an operating portion capable of inputting, to the controller, recording material information on the recording material onto which the toner image is transferred, wherein on the basis of the recording material information inputted through the operating portion, the controller carries out control so that the transfer voltage is subjected to the constant-current control.

9. An image forming apparatus according to claim 7, further comprising a detecting portion configured to detect a current flowing through the inner roller when the voltage is applied to the inner roller by the power source, wherein on the basis of a value of the current detected by the detecting portion when the recording material exists in the transfer portion, the controller carries out control so that the transfer voltage is subjected to the constant-current control.

10. An image forming apparatus according to claim 9, wherein in a case that the value of the current detected by the detecting portion is a predetermined threshold or more, the controller carries out control so that the transfer voltage is subjected to the constant-current control.

* * * * *